United States Patent
Bharadwaj et al.

(10) Patent No.: US 10,402,177 B2
(45) Date of Patent: Sep. 3, 2019

(54) METHODS AND SYSTEMS TO VECTORIZE SCALAR COMPUTER PROGRAM LOOPS HAVING LOOP-CARRIED DEPENDENCES

(71) Applicant: Intel Corporation, Santa Clara, CA (US)

(72) Inventors: Jayashankar Bharadwaj, Saratoga, CA (US); Nalini Vasudevan, Sunnyvale, CA (US); Albert Hartono, Santa Clara, CA (US); Sara S. Baghsorkhi, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/660,603

(22) Filed: Jul. 26, 2017

(65) Prior Publication Data

US 2017/0322786 A1 Nov. 9, 2017

Related U.S. Application Data

(63) Continuation of application No. 15/018,445, filed on Feb. 8, 2016, now Pat. No. 9,733,913, which is a
(Continued)

(51) Int. Cl.
 *G06F 9/45* (2006.01)
 *G06F 8/41* (2018.01)
(Continued)

(52) U.S. Cl.
 CPC ............ *G06F 8/4441* (2013.01); *G06F 8/443* (2013.01); *G06F 8/452* (2013.01); *G06F 9/06* (2013.01); *G06F 9/30* (2013.01); *G06F 9/44* (2013.01)

(58) Field of Classification Search
 None
 See application file for complete search history.

(56) References Cited

U.S. PATENT DOCUMENTS

| 4,833,606 A | 5/1989 | Iwasawa et al. |
| 5,247,696 A | 9/1993 | Booth |

(Continued)

FOREIGN PATENT DOCUMENTS

CN 102576318 7/2012

OTHER PUBLICATIONS

State Intellectual Property Office of People's Republic of China, "Office action," issued in connection with Chinese patent application No. 2013800739078.X., dated Nov. 6, 2017 (17 pages).
(Continued)

*Primary Examiner* — Matthew J Brophy
(74) *Attorney, Agent, or Firm* — Hanley, Flight & Zimmerman, LLC

(57) ABSTRACT

Methods and systems to convert a scalar computer program loop having loop-carried dependences into a vector computer program loop are disclosed. One such method includes, at runtime, identifying, by executing an instruction with one or more processors, a first loop iteration that cannot be executed in parallel with a second loop iteration due to a set of conflicting scalar loop operations. The first loop iteration is executed after the second loop iteration. The method also includes sectioning, by executing an instruction with one or more processors, a vector loop into vector partitions including a first vector partition. The first vector partition executes consecutive loop iterations in parallel and the consecutive loop iterations start at the second loop iteration and end before the first loop iteration.

29 Claims, 39 Drawing Sheets

Related U.S. Application Data continuation of application No. 13/994,062, filed as application No. PCT/US2013/032111 on Mar. 15, 2013, now Pat. No. 9,268,541.

(51) Int. Cl.
    *G06F 9/06* (2006.01)
    *G06F 9/30* (2018.01)
    *G06F 9/44* (2018.01)

(56) References Cited

U.S. PATENT DOCUMENTS

| | | | |
|---|---|---|---|
| 5,225,385 A | 10/1993 | Kikuchi | |
| 5,274,812 A | 12/1993 | Inoue | |
| 5,790,866 A * | 8/1998 | Robison | G06F 8/433 |
| | | | 717/141 |
| 5,802,375 A | 9/1998 | Ngo et al. | |
| 5,958,048 A * | 9/1999 | Babaian | G06F 8/441 |
| | | | 712/241 |
| 6,438,747 B1 | 8/2002 | Schreiber et al. | |
| 6,507,947 B1 * | 1/2003 | Schreiber | G06F 8/452 |
| | | | 717/159 |
| 6,772,415 B1 | 8/2004 | Danckaert et al. | |
| 7,334,110 B1 * | 2/2008 | Faanes | G06F 9/384 |
| | | | 712/3 |
| 7,395,419 B1 * | 7/2008 | Gonion | G06F 8/443 |
| | | | 712/241 |
| 7,478,377 B2 | 1/2009 | Eichenberger et al. | |
| 8,087,010 B2 * | 12/2011 | Eichenberger | G06F 8/4452 |
| | | | 717/144 |
| 8,087,101 B2 | 1/2012 | Ferguson | |
| 8,131,979 B2 | 3/2012 | Gonion et al. | |
| 8,136,107 B2 | 3/2012 | Zaks | |
| 8,141,068 B1 | 3/2012 | Thompson | |
| 8,176,299 B2 | 5/2012 | Gonion et al. | |
| 8,196,124 B2 | 6/2012 | Eichenberger et al. | |
| 8,245,208 B2 | 8/2012 | Eichenberger et al. | |
| 8,549,501 B2 | 10/2013 | Eichenberger et al. | |
| 8,640,112 B2 | 1/2014 | Yi et al. | |
| 9,043,769 B2 * | 5/2015 | Vorbach | G06F 8/4441 |
| | | | 717/149 |
| 9,268,541 B2 * | 2/2016 | Bharadwaj | G06F 9/06 |
| 9,733,913 B2 * | 8/2017 | Bharadwaj | G06F 9/06 |
| 9,898,266 B2 | 2/2018 | Vasudevan et al. | |
| 2002/0091996 A1 * | 7/2002 | Topham | G06F 8/452 |
| | | | 717/124 |
| 2002/0120923 A1 * | 8/2002 | Granston | G06F 8/4452 |
| | | | 717/160 |
| 2002/0133813 A1 * | 9/2002 | Ostanevich | G06F 8/452 |
| | | | 717/150 |
| 2004/0001066 A1 | 1/2004 | Bik et al. | |
| 2004/0006667 A1 | 1/2004 | Bik et al. | |
| 2004/0068718 A1 * | 4/2004 | Cronquist | G06F 8/443 |
| | | | 717/151 |
| 2004/0098713 A1 * | 5/2004 | Ogawa | G06F 8/443 |
| | | | 717/160 |
| 2005/0039167 A1 * | 2/2005 | Fernandes | G06F 8/4441 |
| | | | 717/116 |
| 2005/0131977 A1 | 6/2005 | Bera | |
| 2006/0004996 A1 * | 1/2006 | Gonion | G06F 8/441 |
| | | | 712/241 |
| 2007/0074195 A1 * | 3/2007 | Liao | G06F 8/443 |
| | | | 717/160 |
| 2007/0157184 A1 | 7/2007 | Liu et al. | |
| 2007/0169061 A1 | 7/2007 | Bera et al. | |
| 2007/0226723 A1 * | 9/2007 | Eichenberger | G06F 8/44 |
| | | | 717/159 |
| 2008/0034360 A1 | 2/2008 | Bodin et al. | |
| 2008/0114970 A1 * | 5/2008 | Colavin | G06F 9/30076 |
| | | | 712/226 |
| 2009/0064120 A1 | 3/2009 | Liu et al. | |
| 2009/0077545 A1 | 3/2009 | Silvera et al. | |
| 2009/0113404 A1 | 4/2009 | Takayama et al. | |
| 2010/0077180 A1 | 3/2010 | Gonion et al. | |
| 2010/0077182 A1 * | 3/2010 | Gonion | G06F 9/30036 |
| | | | 712/216 |
| 2010/0115233 A1 | 5/2010 | Brewer et al. | |
| 2010/0199257 A1 * | 8/2010 | Biggerstaff | G06F 8/456 |
| | | | 717/104 |
| 2010/0318979 A1 | 12/2010 | Greyzck | |
| 2011/0029962 A1 | 2/2011 | Nuzman et al. | |
| 2011/0035568 A1 * | 2/2011 | Gonion | G06F 8/4441 |
| | | | 712/7 |
| 2011/0113217 A1 | 5/2011 | Gonion et al. | |
| 2011/0161944 A1 * | 6/2011 | Cho | G06F 8/433 |
| | | | 717/149 |
| 2011/0238948 A1 * | 9/2011 | Vorbach | G06F 15/7867 |
| | | | 712/15 |
| 2011/0283092 A1 * | 11/2011 | Gonion | G06F 8/4441 |
| | | | 712/222 |
| 2012/0079466 A1 | 3/2012 | Gonion | |
| 2012/0079469 A1 | 3/2012 | Gonion | |
| 2012/0102301 A1 | 4/2012 | Gonion | |
| 2012/0167069 A1 * | 6/2012 | Lin | G06F 8/456 |
| | | | 717/160 |
| 2012/0192167 A1 | 7/2012 | Eichenberger et al. | |
| 2012/0254845 A1 | 10/2012 | Yi et al. | |
| 2013/0007422 A1 * | 1/2013 | Gonion | G06F 8/4441 |
| | | | 712/222 |
| 2013/0024671 A1 | 1/2013 | Gonion | |
| 2013/0074059 A1 | 3/2013 | Emani et al. | |
| 2013/0125097 A1 * | 5/2013 | Ebcioglu | G06F 17/5045 |
| | | | 717/136 |
| 2013/0191817 A1 * | 7/2013 | Vorbach | G06F 8/4441 |
| | | | 717/150 |
| 2013/0290943 A1 | 10/2013 | Uliel et al. | |
| 2014/0007061 A1 | 1/2014 | Perkins et al. | |
| 2014/0053129 A1 * | 2/2014 | Von Platen | G06F 9/4494 |
| | | | 717/110 |
| 2014/0096119 A1 | 4/2014 | Vasudevan et al. | |
| 2014/0122832 A1 * | 5/2014 | Ngai | G06F 9/30036 |
| | | | 712/7 |
| 2015/0007154 A1 * | 1/2015 | Bharadwaj | G06F 9/06 |
| | | | 717/160 |
| 2016/0139897 A1 | 5/2016 | Vasudevan et al. | |
| 2016/0154638 A1 * | 6/2016 | Bharadwaj | G06F 9/06 |
| | | | 717/160 |
| 2017/0322786 A1 * | 11/2017 | Bharadwaj | G06F 9/06 |

OTHER PUBLICATIONS

United States Patent and Trademark Office, "Corrected Notice of Allowability," issued in connection with U.S. Appl. No. 15/005,781, dated Dec. 6, 2017 (6 pages).

Petersen et al., "Automatic SIMID Vectorization for Haskell", ACM SIGPLAN Notices, vol. 48, No. 9, Mar. 28, 2013 (12 pages).

Horwitz et al., "Dependence analysis for pointer variables", ResearchGate, ACM SIGPLAN Notices, vol. 24, No. 7, Jul. 1989 (14 pages).

Larsen et al., "Exploiting Vector Parallelism in Software Pipelined Loops", Proceedings of the $38^{th}$ annual IEEE/ACM International Symposium on Microarchitecture, IEEE Computer Society, Jun. 3, 2005 (16 pages).

Udupa et al., "Alter: Exploiting Breakable Dependences for Parallelization", PLDI'11, Jun. 4-8, 2011 (12 pages).

United States Patent and Trademark Office, "Non-Final Office Action," issued in connection with U.S. Appl. No. 13/630,147, dated Apr. 23, 2014, 24 pages.

Patent Cooperation Treaty, "International Search Report," issued in connection with International Patent Application No. PCT/US2013/032111, dated Nov. 26, 2013 (3 pages).

Patent Cooperation Treaty, "Written Opinion of the International Searching Authority" issued in connection with International Patent Application No. PCT/US2013/032111, dated Nov. 26, 2013 (5 pages).

United States Patent and Trademark Office, "Final Office Action," issued in connection with U.S. Appl. No. 13/630,147, dated Nov. 20, 2014, 14 pages.

(56) References Cited

OTHER PUBLICATIONS

United States Patent and Trademark Office, "Notice of Allowance", issued in connection with U.S. Appl. No. 13/630,147, dated Aug. 18, 2015 (14 pages).
Krall et al., "Compilation Techniques for Multimedia Processors", International Journal of Parallel Programming, Aug. 2000, vol. 28, Issue 4, (pp. 347-361).
Bik et al., "Efficient Exploitation of Parallelism on Pentium III and Pentium 4 Processor-Based Systems", 2001 (9 pages).
Nuzman et al., "Outer-loop vectorization: revisited for short SIMD architectures", Proceedings of the 17th international conference on Parallel architecture and compilation techniques, 2008 (pp. 2-11).
International Searching Authority, "International Preliminary Report on Patentability", issued in connection with International Patent Application No. PCT/US2013/032111, dated Sep. 15, 2015 (6 pages).
United States Patent and Trademark Office, "Non-Final Office Action", issued in connection with U.S. Appl. No. 13/994,062, dated Apr. 9, 2015 (17 pages).
United States Patent and Trademark Office, "Notice of Allowance", issued in connection with U.S. Appl. No. 13/994,062, dated Oct. 13, 2015 (9 pages).
European Patent Office, "European Search Report", issued in connection with European Patent Application No. 13877658.8, dated Sep. 16, 2016 (12 pages).
Smith et al., "Vector Instruction Set Support for Conditional Operations", Proceedings of the $27^{th}$ International Symposium on IEEE, 2000 (10 pages).
Rauchwerger et al., "Run-Time Methods for Parallelizing Partially Parallel Loops", Proceedings of the International Conference on Supercomputing, Jul. 3, 1995 (10 pages).
United States Patent and Trademark Office, "Non-Final Office Action", issued in connection with U.S. Appl. No. 15/018,445, dated Nov. 18, 2016 (16 pages).
United States Patent and Trademark Office, "Notice of Allowance", issued in connection with U.S. Appl. No. 15/018,445, dated Apr. 20, 2017 (9 pages).
United States Patent and Trademark Office, "Notice of Allowance", issued in connection with U.S. Appl. No. 15/018,445, dated Jun. 7, 2017 (6 pages).
United States Patent and Trademark Office, "Non-Final Office Action", issued in connection with U.S. Appl. No. 15/005,781, dated Mar. 17, 2017 (20 pages).
United States Patent and Trademark Office, "Notice of Allowance," issued in connection with U.S. Appl. No. 15/005,781, dated Oct. 6, 2017 (71 pages).
Allen, et al., "Automatic Loop Interchange", ACM SIGPLAN, Jun. 1984 (16 pages).
Jang, et al., "Data Transformations Enabling Loop Vectorization on Mulithreaded Data Parallel Architectures", Jan. 9-14, 2010 (2 pages).
Song, et al. "What Can We gain by Unfolding Loops?", ACM SIGPLAN, vol. 39 (2), Feb. 2004 (8 pages).
State Intellectual Property Office of People's Republic of China, "Second Office Action," issued in connection with Chinese patent application No. 201380073078.X, dated Jul. 4, 2018 (19 pages).
State Intellectual Property Office of People's Republic of China, "Third Office Action," issued in connection with Chinese patent application No. 201380073078.X, dated Dec. 5, 2018 (20 pages).
European Patent Office, "Examination Report," issued in connection with European Application No. 13877658.8 dated Mar. 8, 2018 (6 pages).

\* cited by examiner

```
202 int j = a[0];
204 for (i=1; i<N; i++) {
206   if (a[i] < b[i]) {    // Predicate p1 = a[i] < b[i]
208       j = a[i];          // Stmt W1
210   }
212   if (c[i] < b[i]) {    // Predicate p2 = c[i] < b[i]
214       j = c[i];          // Stmt W2
216   }
218   if (b[i] > 0) {       // Predicate p4 = b[i] > 0
220       b[i] = j;          // Stmt R1
222   }
224 }
226 return j;
```

FIG. 2

```
302    vj = broadcast(a[0]);
304    for (i=1; i<N-VL+1; i+= VL) {
306        p1 = a[i:i+VL-1] < b[i:i+VL-1];
308        (p1) vj = a[i:i+VL-1];   // W1
310        // vj = PropagatePostTrue(vj, p1); // Note this can be deleted since it is dead
312        p2 = c[i:i+VL-1] < b[i:i+VL-1];
314        (p2) vj = c[i:i+VL-1]; // W2
316        p3 = p1 | p2;
318        vj = PropagatePostTrue(vj, p3);
320        p4 = b[i:i+VL-1] > Broadcast(0);
322        (p4) b[i:i+VL-1] = vj; // R1
324        vj = SelectLast(vj, TRUE_Predicate);
325    }
326 //Remainder Code
```

FIG. 3 v1 = {1, 2, 3, 4, 5, 6, 7, 8}
va = {2, 4, 6, 8, 10, 12, 14, 16}
p = {F, F, T, T, F, F, F, T}

Then
vsa1 = {1, 2, 9, 17, 17, 17, 17, 33} for RunningPostAdd
and
vsa2 = {1, 2, 3, 9, 17, 17, 17, 17} for RunningPreAdd

```
502    sum = 0;
504    for (i=1; i<=N; i++) {
506        tally1[i] = sum;   // Stmt R1 reads sum
508        if (a[i] < K1) {   // Predicate p1 = a[i] < K1
510            sum = sum + a[i];   // Stmt W1 is a recurrence that reads and writes sum
512        }
514        tally2[i] = sum;   // Stmt R2 reads sum
516        if (b[i] < K2) {   // Predicate p2 = b[i] < K2
518            sum = sum + b[i];   // Stmt W2 is a recurrence that reads and writes sum
520        }
522        tally3[i] = sum;   // Stmt R3 reads sum
524    }
```

500

```
602  p0 = Broadcast(1);
604  vzero = Broadcast(0);
606  vsum = Broadcast(0);
608  for (i=1; i<=N-VL+1; i += VL) {
610      va = a[i:i+VL-1];
612      p1 = va < Broadcast(K1);
614      vb = b[i:i+VL-1];
616      p2 = vb < Broadcast(K2);
618      vsa = RunningPreAdd(vzero, va, p1);
620      vsb = RunningPreAdd(vzero, vb, p2);
622      vsum1 = vsum + vsa + vsb;
624      tally1[i:i+VL-1] = vsum1;      //R1 reads (PreAdd of W1) + (PreAdd of W2)
626      vsa = RunningPostAdd(vzero, va, p1)
628      vsum = vsum + vsa;    //W1 adds RunningPostAdd to vsum
630      vsum2 = vsum + vsb;
632      tally2[i:i+VL-1] = vsum2;      //R2 reads (PostAdd of W1) + (PreAdd of W2)
634      vsb = RunningPostAdd(vzero, vb, p2);
636      vsum = vsum + vsb;    //W2 adds RunningPostAdd to vsum
638      tally3[i:i+VL-1] = vsum;      //R3 reads (PostAdd of W1) + (PostAdd of W2)
640      vsum = SelectLast(vsum, p0);    //Select and broadcast last value of vsum
642  }
```

```
702   for (i = 0; i < N; i++) {
704     if (b[i] < FACTOR) {
706       t = a[b[i]];    // R
708       a[i] = t;       // W
710     }
712   }
```

```
802  start = 0;
804  for (i = 0; i < N; i +=VL){
806      start = i;
808      dependences = checkConflict(b[i], i, True, True); // Returns iteration conflict
809      points between the indices of a[b[i]] and a[i] from i to min (N, i+=VL-1)
810  vpl: // Vector Partitioning Loop
812      divide = getNextDependence (dependences, start); // Gets next conflict point
813      (divide is represented as a predicate)
814      Do partial vectorization of t = a[b[i]] and a[i] = t, from start...divide; //start...
815      divide is operates as predicate
816      Set start = divide + 1;
818      if (start < min(N,i+VL))
820          goto vpl; //branch b1
822  } // end for
```

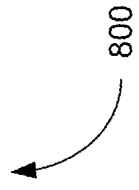

FIG. 8

```
902  for (i=0; i<N; i++)
904  {
906      if (a[i] < FACTOR)
908      {
910          r = a[i+r];    // Statement A
912      }
914      ...
916  }
```

```
1002  for (i =0 ; i < N; i+=VL) {
1004      start = i;
1006      vpl: // Vector partitioning loop
1008      p = a[i..min(N+VL)] < vector(FACTOR)
1010      divide = ConditionalPairStop(p,p)
1012      Do partial vectorization of r = a[i+r] from start..divide; // start .. divide is
1013      represented by a predicate
1014      vector(r) = SelectLast(vector(r),p);
1015      Set start = divide + 1;
1016      if (start < min(N, i+VL))
1018          goto vpl;  // branch b1
1020  } // end for
```

```
1102   last = 10;
1104   for (i=1; i<=N; i++) {
1106       j = a[i];
1108       if (j < last) {        // Stmt R1 reads last. Predicate p1 = j < last
1110           b[i] = last;       // Stmt R2 reads last
1112       }
1114       if (j < 0) {           // Predicate p2 = j < 0
1116           last = j;          // Stmt W defines last
1118       }
1120   }
1122   return last;
```

```
1202    last = 10;
1204    for (i=1; i<=N-VL+1; i += VL) {
1206        vj = a[i:i+VL-1];
1208        p2 = vj < 0;
1210        (p2) vlast1 = vj;
1212        vlast1 = PropagateShift(last, vlast1, p2);
1214        p1 = (vj < vlast1); //statement R1 in vector form
1216        (p1) b[i:i+VL-1] = vlast1; //statement R2 in vector form
1218        (p2) vlast = vj;
1219        last = SelectLastElement(vlast, p2)
1220    }
1221    // Remainder Code
```

```
1402 // Algorithm to enable vectorization with scalar expansion by handling cycle causing
1404 // loop-carried anti and output dependences with horizontal propagation instructions for
1406   each instruction S {
1408       if (S defines scalar J) {
1410           set PredDefSet(S, J) = {Predicate(S)};
1412           set PredUseSet(S, J) = {}; // empty set
1414       }
1416   }

1418 for each dependence edge E in the graph {
1420     if (E is not part of a cycle)
1422         continue;
1424     if (E is a loop-carried lexically backward edge (i.e. directi on is (<))) {
1426         if (E is an anti-dependence on a scalar J) { W = Sink(E); R = Src(E);
1428             set PredUseSet(W, J) = Union(PredUseSet(W, J), Predicate(R))
1430         }
1432         else if (E is aAn output-dependence on a scalar J) {
1434             W1 = Sink(E); W2 = Src(E);
1436             set PredDefSet(W2, J) = Union(PredDefSet(W2, J), Predicate(W1))
1438         }
1440     }
1442     else if (another analysis technique can be used to eliminate E) {apply that
1444         technique}
1446     }
1448 }
```

```
1450 if (dependence graph does not contain any cycle) {
1452   Generate vector code for the loop
1454   for each instruction S {
1456     if (S defines a scalar J) {
1458       if (PredUseSet(S, J) is not subset of PredDefSet(S,J) {
1460         Insert Macroscalar instruction J = PropagatePostTrue(J, PredDefSet(S, J)) after S in
1462         vector loop
1464         Insert J = SelectLast(J, TRUEPredicate) at the bottom of the loop body
1466       }
1468     }
1470   }
1472 }
```

```
1601 // Algorithm to enable vectorization by eliminating certain intra-iteration anti dependences
1602 // and certain loop-carried dependences with horizontal recurrence instructions
1603 for (each instruction S of the form t = t + addend or t = t – addend) {
1604     RecurrenceSet(t) = Union(RecurrenceSet(t), S);
1605     EdgesToRemove(t) = {};
1606 }
1607 for (each non-empty RecurrenceSet RS) {
1608     t = Operand for RS;
1609     for (each anti-dependence edge A with direction (=) on operand t) {
1610         R = Source(A); W = Sink(A);
1611         if (Contains(RS(t), W) && !Contains(RS(t), R))
1612             { EdgesToRemove(t) = Union(A, EdgesToRemove(t));
1613             PreAdd(R) = {}; // empty set
1614         }
1615 }
1616 for (each edge A in EdgesToRemove(t)) {
1617     R = Source(A); W = Sink(A);
1618     for (each path P from R to W constructed using edges with direction (=)) {
1619         if (P passes thru an edge in EdgesToRemove(t))
1620             continue;
1621         Try to eliminate an edge on path P using partial vectorization techniques;
1622         If (no edge could be eliminated) {
1623             Remove W from RecurrenceSet(t);
1624             EdgesToRemove(t) = {};
1625             goto STEP2;
1626         }
1627 }
```

FIG. 16A

```
1628 for (each edge A in EdgesToRemove(t)) {
1629   R = Source(A); W = Sink(A); PreAdd(R) =
1630   Union(PreAdd(R), W).
1631 }
1632 Remove edges in EdgesToRemove(t) from the dependence graph for
1633 (each dependence edge E with direction (<) on variable t) {
1634   if (E is an anti dependence edge && Sink(E) is in RecurrenceSet(t)){
1635     Remove E from dependence graph;
1636   }
1637   if (E is a flow or output dependence edge && Source(E) is in RecurrenceSet(t) &&
1638       && Sink(E) is in RecurrenceSet(t)) {
1639     Remove E from dependence graph;
1640   }
1641 }
1642 Apply other disclosed techniques or
1643 conventional vectorization techniques to eliminate cycles in the dependence graph
```

FIG. 16B

```
1644 if (there are no cycles in the dependence graph) { // Loop is vectorizable
1645   Generate vector code for the loop;
1646   for (each operand t where RecurrenceSet(t) is non-empty) {
1647     for (each instruction S in RecurrenceSet(t)) {
1648       Add vt = Broadcast(t) at the entry to the loop if this has not already been added;
1649       Insert vt = SelectLast(vt, pTRUE) at the bottom of the loop body if not already added if
1650       (S is of the form t = t + z) {
1651         Replace vector code for S with "vy = RunningPostAdd(0, vz, p1); vt = vt + vy;"
1652       }
1653       else { // S is of the form t = t – z
1654         Replace vector code for S with "vy = RunningPostAdd(0, vz, p1); vt = vt - vy;"
1655       }
1656     }
1657     for (each instruction R with a non-empty  set PreAdd(R)) {
1658       Add the instruction "vtk = vt;" before R;
1659       Rename the references to vt with vtk in R
1660       for (each instruction W in PreAdd(R)) {
1661         if (S is of the form t = t + z) {
1662           Insert "vya = RunningPreAdd(0, vz, p1); vtk = vtk + vya" before R;
1663         }
1664         else { // S is of the form t = t – z
1665           Insert "vya = RunningPreAdd(0, vz, p1); vtk = vtk – vya" before R;
1666         }
1667     }
1668   }
1669 }
```

FIG. 16C

```
1802  // Algorithm to enable vectorization with memory conflict checking instructions by handling cycle
1804  causing loop-carried memory dependences.
1806  Mark loop as vectorizable;
1808  for each dependence edge E in the graph {
1810    if (E is not part of a cycle)
1812      continue;
1814    if ( E is a memory flow, anti, or output dependence edge from statement A to B with single direction
1816      (<)) {
1818      Add (A, B) to the conflict set C;
1820      Remove E;
1822      Mark all instructions that were in the cycle eliminated by removal of E as IN_VPL
1824    }
1826    else if (other disclosed techniques or conventional techniques can be used to remove E) {
1828      Apply those techniques
1832    }
1834    else {
1836      Mark loop as non-vectorizable
1838    }
1840 }
```

1800

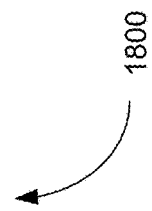

FIG. 18A

```
1842  if (loop is vectorizable and set C is not empty) {
1844    Generate the VPL and place instructions marked IN_VPL into the VPL.
1846    For each pair of instructions (A, B) in C {
1848      {
1850        Insert a corresponding "checkconflict" instruction
1852        CheckConflict(MemoryAddress(B),MemoryAddress(A), pB, pA) before the VPL
1854        where pA is the predicate controlling A and pB is the predicate controlling B.
1856      }
1858      Generate code to "OR" the results of the CheckConflict instructions to dynamically determine
1860      the earliest next conflict point and using this, generate the predicate to control execution of
1862      the VPL (Vector Partitioning Loop).
1864    }
1866  }
```

1800

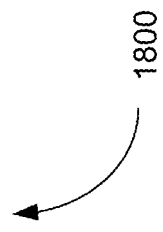

FIG. 18B

```
2002 // Algorithm to enable vectorization with hazard checking instructions by handling cycle causing
2004 loop-carried flow dependences.
2006 Mark loop as vectorizable;
2008     for each dependence edge E in the graph {
2010         if (E is not part of a cycle)
2012             continue;
2014         if (E is a memory flow, anti, or output dependence edge from statement A to B with single direction (<))
2016         where either statement A or B or both are conditionally executed)
2018             Add (A, B) to the ConditionalPairStop set CPS;
2020             Remove E;
2022             Mark all instructions that were in the cycle eliminated by removal of E as IN_VPL
2024         }
2026         else if (other disclosed conventional vectorization techniques can be used to remove E) {
2028             Apply those techniques
2032         }
2034         else {
2036             Mark loop as non-vectorizable
2038         }
2040 }
```

```
2042 if (loop is vectorizable and set CPS is non-empty) {
2044    Generate a VPL and put instructions marked IN_VPL into the VPL.
2046    for each pair of instructions (A, B) in CPS
2048    {
2050        Insert "checkconflict" instruction such as "ConditionalPairStop(pB, pA)" into the VPL before the
2052 conditionally executed statement to determine which consecutive iterations can be vectorized at once,
2054 where pA is the predicate controlling A and pB is the predicate controlling B.
2056        If (statement A writes to a scalar variable r){
2058            Insert a horizontal propagation instruction after the vector instruction A
2060 to propagate the value of vr from elements where pA is TRUE to successive
2062 elements where pA is FALSE.
2064            Insert an instruction after the VPL to select the last element of vr and broadcast it to
2066 the entire vector vr
2068        }
2070    }
2072    Generate the predicate mask for the VPL from the results of the ConditionalPairStop
2074 instructions 2074 generated in the previous step.
2076 }
```

FIG. 20B

```
2202 // Algorithm to enable vectorization by handling cycle causing
2204 // loop-carried flow and intra-iteration anti dependences with horizontal shift and
2206 // propagation instructions
2208 for (each instruction W defining a scalar variable r) {
2210    E = set of intra-iteration anti-dependence edges whose sink is W
2212    S = set of source nodes of edges in set E
2214    for each node R in S {
2216       if (there is no loop-carried flow-dependence edge from W to R) {
2218          remove R from set S and the corresponding anti-dependence edge R->W from set E
2220       }
2222    }
2224    for each node R in S {
2226       if (there is a dependence path from R to W that does not pass through  an edge in set E) {
2228          Attempt to eliminate an edge on this path by partial vectorization
2230          if (no edge on this path can be eliminated) {
2232             return (FAILED_TO_VECTORIZE)
2234          }
2236       }
2238    }
2240    if (Set E is non-empty) {
2242       Push (r, W, S, E) onto a PropagateShiftCodeGeneration stack.
2244       Remove all edges E from the graph
2246    }
2248 }
2250 Apply other disclosed technique or other
2252 conventional vectorization techniques to eliminate cycles in the dependence graph
```

FIG. 22A

```
2254  If (there are no cycles in the dependence graph) {
2256      // Vectorize loop
2258      Generate vector code for the loop;
2260      For each (r, W, S, E) in the PropagateShiftCodeGeneration stack {
2262          Create a copy W (W_copy) where references to r are renamed to r_copy
2264          Hoist W_copy and its dependence predecessors above all instructions represented by set S
2266          Replace references to r with r_copy in all instructions represented by set S
2268          Insert instruction r_copy = PropagateShift(lr, r', p) after W_copy where p is the predicate mask used in
2270              W_copy
2272          Insert instruction lr = SelectLastElement(r, p) after W
2274          Insert initialization lr = r before the loop
2276  }
```

FIG. 22B

METHODS AND SYSTEMS TO VECTORIZE SCALAR COMPUTER PROGRAM LOOPS HAVING LOOP-CARRIED DEPENDENCES

RELATED APPLICATION

This patent arises from a continuation of U.S. patent application Ser. No. 15/018,445, titled, "Methods and Systems to Vectorize Scalar Computer Program Loops Having Loop-Carried Dependences," filed Feb. 8, 2016 (now U.S. Pat. No. 9,733,913), which is a continuation of U.S. patent application Ser. No. 13/994,062 titled, "Methods and Systems to Vectorize Scalar Computer Program Loops Having Loop-Carried Dependences," filed Aug. 11, 2014 (now U.S. Pat. No. 9,268,541) which is a U.S. national stage of international patent application serial no. PCT/US2013/032111, titled, "Methods and Systems to Vectorize Scalar Computer Program Loops Having Loop-Carried Dependences," filed Mar. 15, 2013. Priority is claimed to the foregoing applications which are hereby incorporated by reference in their entireties.

FIELD OF THE DISCLOSURE

This disclosure relates generally to computer systems and, and more specifically, to methods and system to vectorize scalar computer program loops having loop-carried dependences.

BACKGROUND

Many modern day computer systems employ computer program vectorization technologies, such as optimizing computer program code compilers to vectorize scalar computer programs. Vectorization involves converting scalar computer program loops that operate on a scalar variable(s)/operand(s) representing a single numerical value to vector computer program loops that operate on a vector variable(s)/operand(s) representing a set of numerical values (e.g., a vector of "k" elements includes "k" values). Conventional compilers use simple variable expansion (i.e., replacing scalar program variables with vector program variables) to perform vectorization on scalar computer program loops that do not have loop-carried dependences.

BRIEF DESCRIPTION OF THE DRAWINGS

FIG. 2 illustrates example pseudo code representing an example computer program having a scalar computer program loop containing lexically backward loop-carried dependences.

FIG. 3 illustrates example pseudo code representing an example vectorized version of the example scalar computer program loop of FIG. 2 created using the example vectorization system of FIG. 1B.

FIG. 6 illustrates example pseudo code representing an example vectorized version of the scalar computer program loop of FIG. 4 created using the example vectorization system of FIG. 1C.

FIG. 8 illustrates example pseudo code representing an example vectorized version of the example scalar computer program loop of FIG. 7 created using the example vectorization system of FIG. 1D.

FIG. 9 illustrates example pseudo code representing an example scalar computer program having loop-carried dependences arising from conditionally executed statements.

FIGS. 14A and 14B illustrate example pseudo code representing example machine readable instructions executed by the example vectorization system of FIG. 1B to vectorize a scalar computer program loop having lexically backward loop-carried dependences.

FIGS. 16A-16C illustrate an example pseudo code representing example machine readable instructions executed by the example vectorization system of FIG. 1C to vectorize a scalar computer program loop having loop-carried dependences that arise from recurrence loop operations.

FIGS. 18A and 18B illustrate example pseudo code representing example machine readable instructions executed by the example vectorization system of FIG. 1D to vectorize a scalar computer program loop having loop-carried cross iteration memory dependences.

FIGS. 20A and 20B illustrate example pseudo code representing example machine readable instructions executed by the example vectorization system of FIG. 1E to vectorize a scalar computer program loop having loop-carried dependences arising from conditionally executed statements.

FIGS. 22A and 22B illustrate example pseudo code representing example machine readable instructions executed by the example vectorization system of FIG. 1F to vectorize a computer program loop having loop-carried dependences arising from scalar references.

Wherever possible, the same reference numbers will be used throughout the drawing(s) and accompany written description to refer to the same or like parts.

DETAILED DESCRIPTION

Figure 1A:
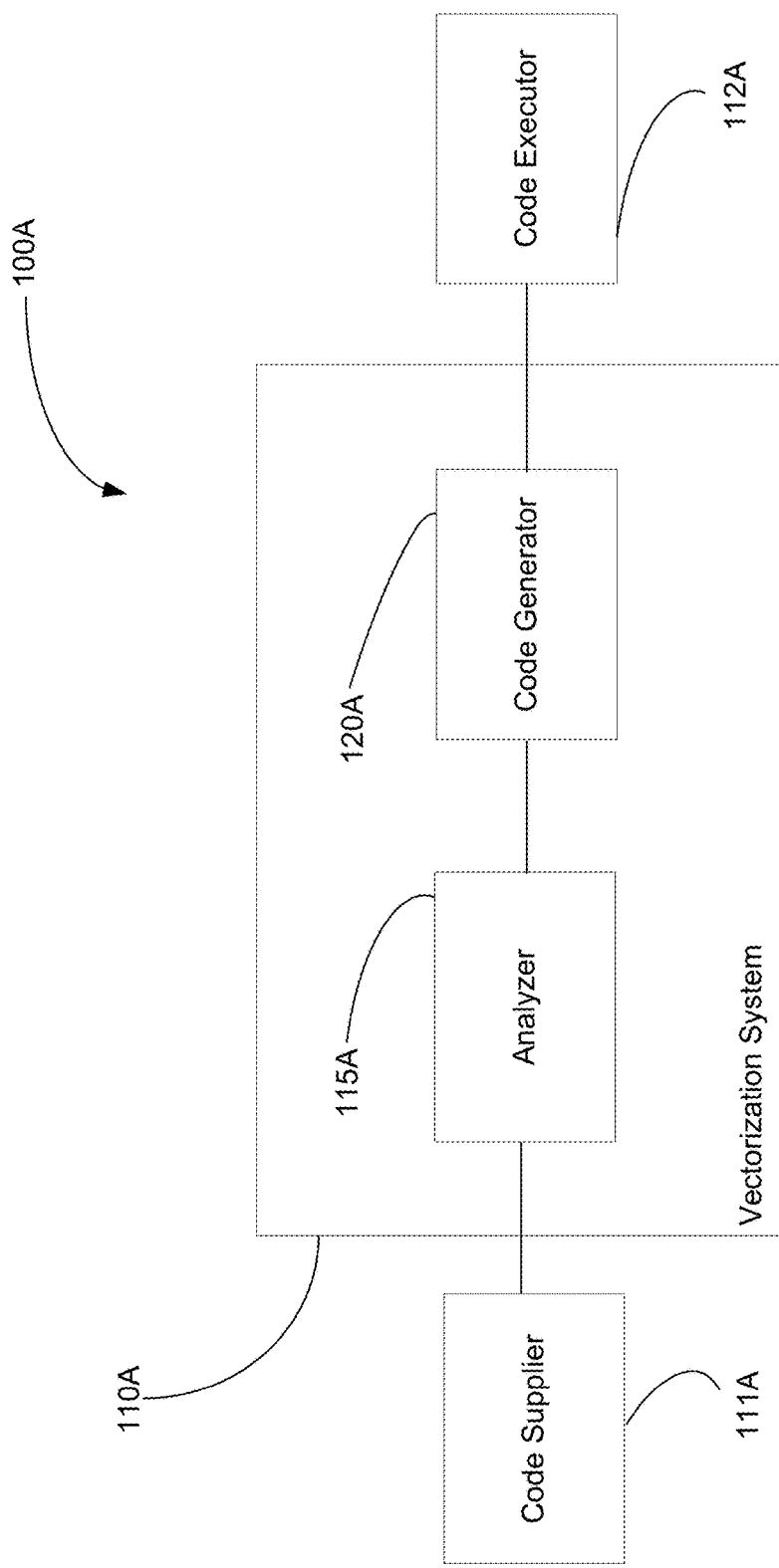
FIG. 1A illustrates a block diagram of an example vectorization system capable of vectorizing a scalar computer program loop.

Example apparatus, methods, systems and articles of manufacture disclosed herein permit vectorization of scalar computer loops having loop-carried dependences. In some examples, the methods and systems enable such vectorization by using computer program code, applications and/or services, including computer code associated with computer languages available in architectures having hardware/software that support speculative vectorization of loops with runtime data dependences, (e.g., Macroscalar™ or similar architectures).

Vectorization allows multiple iterations of a scalar computer program loop to be executed at a same time to thereby improve speed and operating efficiency. To enable parallel loop iteration, each scalar variable in a scalar computer program loop is converted to a vector variable representing a set of numerical values that are each stored in a different vector element (e.g., a vector having "k" elements stores "k" numerical values). (Converting the variables in this manner is sometimes referred to as scalar expansion.) Each vector element of a vector variable corresponds to a different loop iteration such that a first vector element contains a first value calculated during a first iteration, a second vector element contains a second value calculated during a second iteration, etc. Generally, scalar computer program loops can be iterated in parallel (i.e., vectorized) provided that one or more of the instructions in the loop are not dependent on or more other instructions in the loop in a manner that causes a cycle to arise. For example, a dependence between two instructions or variables of a computer program loop exists when the value of a variable calculated in one iteration of the loop depends on a value of the variable calculated in another or the same iteration of the loop. In the case when the variable value calculated in one iteration is dependent on the variable value calculated in a previous, different iteration the dependence is described as "crossing" loop iterations (also referred to as a loop-carried cross-iteration dependence). In the case when the variable value calculated in one iteration is dependent on the variable value calculated in the same iteration the dependence is referred to as a loop-carried intra-iteration dependence.

In addition to being characterized as either a cross iteration or an intra iteration, dependences can be characterized as being one of two general types: 1) control dependences and 2) data dependences. A control dependence (also referred to as a conditional dependence) exists when a statement is executed based on one or more conditions. For example, a computer program loop containing a scalar that is conditionally defined in one loop iteration and then used either unconditionally or guarded by a different condition in the same or a different loop iteration is one type of conditional dependence.

In contrast, data dependences between two loop iterations may occur when one statement or instruction (used interchangeably herein) of the loop must be executed in a particular order relative to another statement in the loop. If the statements are not executed in that particular order, the value of a scalar variable used by the loop may be erroneously calculated. For example, a scalar variable used in a computer program loop should be defined by a write statement before the variable is read by a read statement. Flow dependence, anti-dependence, output dependence, memory dependence and input dependence are all types of data dependences. The following examples of such loop dependences are described with respect to a program code loop having dependences between a first statement "A" and a second statement "B" wherein the statement "A" lexically precedes the statement "B." Note that the adverb "lexically" as used herein refers to the order in which instructions appear in the actual program code of the loop but not necessarily to the order in which the statements are executed based on loop operation (e.g., a loop condition may alter the order in which loop statements are executed while the lexical order of the statements remains unchanged.) For example, a flow dependence between statements "A" and "B" occurs if statement "B" modifies a memory location that statement "A" reads and statement "B" is executed before statement "A" (e.g., "read after write"). Statement "A" is anti-dependent on statement "B" if statement "A" modifies a resource (e.g., memory location) that statement "B" reads and statement "B" is executed before statement "A" (e.g., "write after read"). Statement "A" is output dependent on statement "B" if statement "B" and statement "A" modify the same resource and statement "B" precedes the statement "A" in execution (e.g., "write after write"). Statement "A" is input dependent on a statement "B" if statement "B" and statement "A" read the same memory location and statement "B" is executed before statement "A" (e.g., Read-After-Read). Memory-based dependences arise when a single memory location is read and/or written to by different instructions/statements (e.g., statement "A" and statement "B") in the computer program loop. As used herein, the terms instruction and statement are equivalent and both refer to computer language constructs that are designed/configured to cause a computer to perform one or more operations. As used herein, instructions/statements are tools that are used to perform operations.

Loop-carried dependences are also described as having directions. For example, if the statement "B" is executed in an iteration subsequent to an iteration in which the statement "A" is executed, the loop dependence between that statement "B" and the statement "A" flows in a forward direction and is represented using the symbol (<). If the statement "B" is executed in an iteration previous to the iteration in which statement "A" is executed, the loop dependence between the statement "B" and the statement "A" flows in a backward direction and is represented using the symbol (>). If the dependent statements "A" and "B" are both executed in the same iteration of the loop, the dependence between the statement "A" and the statement "B" is referred to an intra-iteration dependence and the direction is represented using the symbol (=).

One technique for vectorizing a scalar computer program loop includes the use of dependence graphs which are generated using, for example, conventional techniques that are not described herein. A dependence graph represents a computer program loop and is used to identify the loop-carried dependences and cycles present in the computer program loop. The dependent statements or instructions (used interchangeably herein) in the loop are represented in the dependence graph as source nodes and/or sink nodes and nodes that are dependent on one another are connected by a connector referred to as an edge. A source node of an edge is dependent on a corresponding sink node. Therefore, each edge (also referred to herein as a dependence edge) represents a dependence. In some instances, an "edge" is referred to herein as a "dependence edge" and, in these cases, is to be understood to be equivalent to an "edge." As used herein, a dependence edge An edge is represented herein using the following format "(E_R,W)" where "E" is the edge name, "R" is a read statement representing the source node, and "W" is a write statement representing the sink node. An edge from a source node to a sink node is also represented herein using the following example format "(X_R,W) where "X" represents the type of dependence associated with the edge and the read and write statements "R" and "W" are source and sink nodes of the edge, respectively. The variable "X" may be represented using an "A" when the edge is associated with an anti-dependence edge, or represented using an "F" when the edge is associated with a flow dependence, etc.

In some cases, the dependence edges connect to form a path. If the paths form a cycle, the corresponding scalar computer program loop(s) is not vectorizable using conventional techniques (e.g., replacing scalar loop variables with vector loop variables) because the cycle causes one or more outcomes of the scalar loop to be erroneous when executed in parallel iterations. Instead, cycles/path(s) present in scalar loops must be removed/broken from the scalar computer program loop before the scalar computer program loop can be vectorized. Removing/breaking a loop-carried cycle/path from a computer program loop involves eliminating one or more of the edges that connect to form the cycle/path. Edge elimination refers to the performance of operations that permit the loop to be vectorized. If all cycles can be and have been eliminated from a loop, the loop is vectorizable. In contrast, if all cycles of a graph representing a scalar computer program loop cannot be eliminated, then the loop is not vectorizable.

A distance vector is used to describe how loop dependences are related with respect to different iterations of a loop. For example, a dependence distance indicates the number of loop iterations that can be performed in parallel. For example, a loop dependence having a distance value of 2 indicates that the dependence occurs two iterations forward (i.e., when the distance value of a loop dependence is 2, two consecutive iterations can be performed in parallel). In contrast, no iterations of a loop having a dependence distance of 1 can iterated in parallel. As a result, the larger the value of the dependence distance, the easier it is to vectorize the loop (i.e., the greater the number of loop iterations that can be executed in parallel without sacrificing loop integrity).

In some examples, the apparatus, systems, methods and articles of manufacture disclosed herein are performed by a computer system having a vectorization system, a code supplier and a code executer. The example vectorization system includes an analyzer, and a code generator. In some examples, the analyzer creates a list of cycles and/or associated edges in a dependence graph associated with a computer program loop to be vectorized. In some examples, the analyzer performs various operations to process information associated with the edges that form the identified cycles. The analyzer removes cycles and associated edges that have been successfully processed from the list of edges/cycles identified from the dependence graph. If the list of identified edges/cycles is empty, (i.e., all of the edges have been successfully processed), the analyzer supplies the edge-related information to the code generator which operates to compensate for the edges/cycles in a manner that renders the computer program loop vectorizable. In some examples, the code generator inserts instructions, such as hardware instructions into the loop using the information supplied by the edge analyzer. The inserted instructions compensate for cycles caused by the removed edges in a manner that allows multiple iterations of the loop to be iterated in parallel without adversely affecting loop integrity (e.g., the loop outcome). The loop-carried dependences processed by the code vectorization apparatus, systems, methods and articles of manufacture disclosed herein include, for example: 1) lexically backward loop-carried dependences, 2) loop-carried dependences that arise from recurrence loop operations, 3) loop-carried dependences that arise from cross-iteration memory conflicts, 4) loop-carried dependences arising from conditionally executed statements, and 5) loop-carried dependences arising from scalar references, etc.

As described above, a vectorized loop operates on vector operands and permits multiple iterations of a scalar loop to be executed in parallel. Each vector operand (e.g., vector variable) comprises a vector having a length of, for example, 8 or 16 bits, depending on the processing capabilities of the processor. Each element of the vector variable represents a loop iteration. For example, in a vector having eight elements, the first element contains a value calculated in first iteration of the scalar computer program loop, the second element contains a value calculated in a second iteration of the scalar loop and so on. As used herein, an iteration of a vectorized loop is referred to as a vector iteration and includes the parallel execution of multiple scalar loop iterations and a loop iteration refers to an individual one of the iterations represented by one of the positions in the vector(s) used in the vectorized loop. Thus, a loop control variable of a scalar loop (e.g., loop variable "i") controls the number of loop iterations (e.g., "N") executed by the scalar loop and is incremented by one each time a loop is executed. A loop control variable of a vectorized loop controls the number of vector iterations (e.g., "N-VL") executed by the vectorized loop and is incremented by the vector length each time a vector iteration is executed.

A block diagram of an example computer system 100A that vectorizes computer program loops containing dependences is illustrated in FIG. 1A. The example computer system 100A of FIG. 1 includes an example vectorization system 110A coupled to an example code supplieR111A and an example code executoR112A. The vectorization system 110A includes an example analyzeR115A and an example code generatoR120A. In some examples, the analyzer 115A analyzes computer program code/instructions supplied by the example code supplieR111A to identify instructions that cause loop-carried dependences.

If the example analyzeR115A determines that the loop contains one or more types of loop-carried dependences/cycles, the example analyzeR115A performs one or more operations to collect information regarding the cycles that is later supplied to the code generator for use in compensating for edges associated with the cycles in a manner that permits vectorization of the scalar computer program loop. In some examples, the analyzeR115A generates a dependence graph corresponding to the scalar computer program loop being processed and then analyzes the graph to identify the dependence edges present in the graph. The analyzeR115A then processes the edges to collect information about instructions associated with the edges. Because the edges are of a type that can later be compensated for by the code generator, the edges are removed from the list of edges identified by the analyzer. Provided that all edges causing a cycle to arise in the scalar computer program loop have been removed from the list of edges, the collected instruction information regarding the removed edges is supplied to the code generatoR120A. The scalar computer program loop and the corresponding edge-related instruction information are transmitted to the example code generatoR120A which uses the edge-related information to vectorize the loop. In some examples, the code generatoR120A vectorizes the loop by inserting hardware instructions based on the edge-related information to thereby compensate for the edges removed from the list of edges. Iterations of the vectorized loop can then be executed in parallel by the example code executeR112A. In the examples disclosed herein, an edge removal operation performed by the analyzers refers to the removal of an edge from a list of edges associated with a corresponding dependence graph. The code generators disclosed herein then convert the corresponding scalar computer program loop in a manner that compensates for the cycles caused by the removed edges such that multiple iterations of the scalar computer program code can be executed in parallel (i.e., the scalar computer program loop can be vectorized).

Figure 1B:
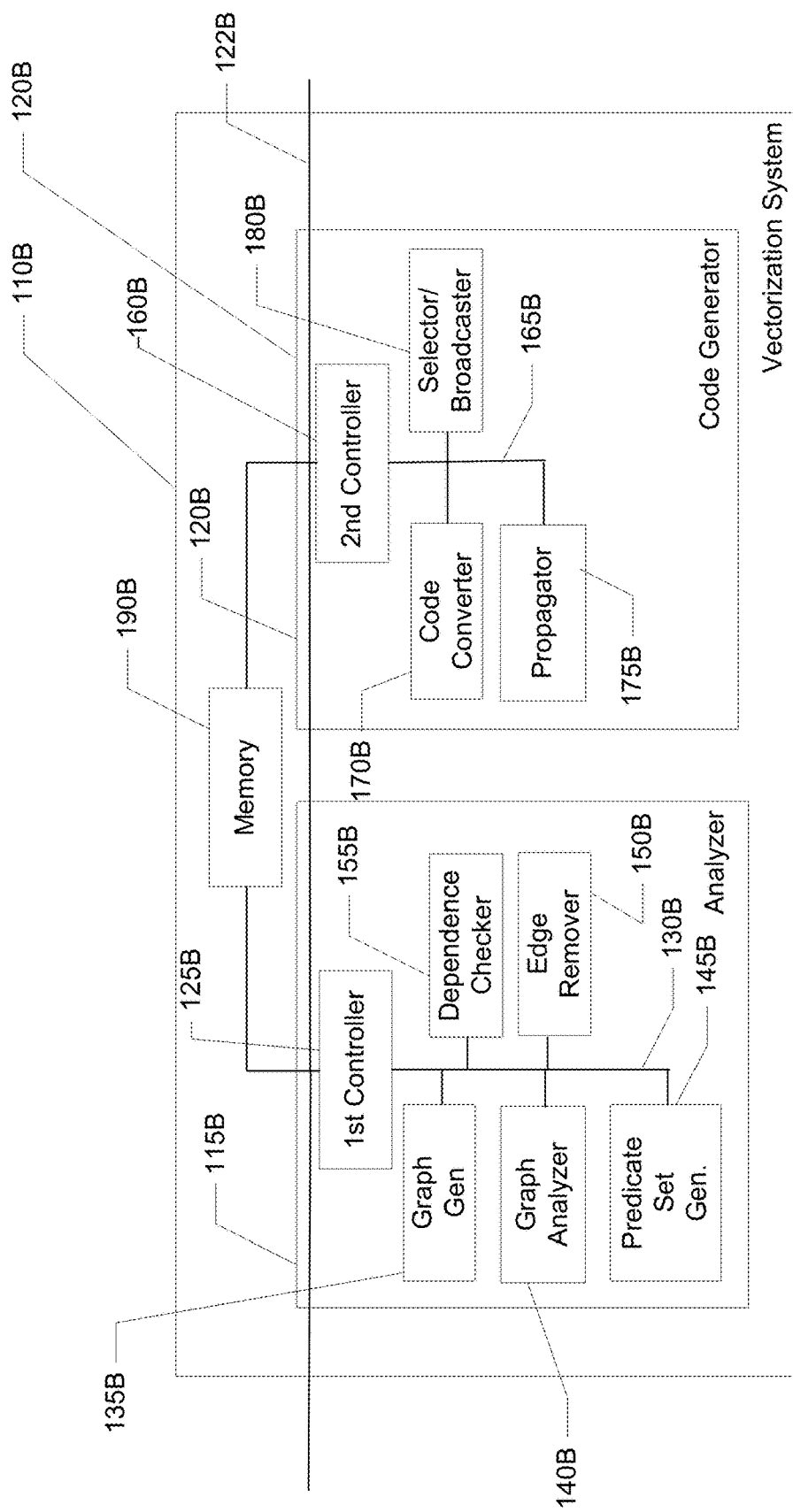
FIG. 1B illustrates a block diagram of an example vectorization system capable of vectorizing a scalar computer program loop having lexically backward loop-carried dependences.

Vectorization of Loops Having Loop-Carried Lexically Backward Dependences that Arise from a Conditionally Defined Scalar Variable FIG. 1B is a block diagram of an example vectorization system 110B configured to vectorize loops having loop-carried lexically backward dependences that arise from defining a conditional scalar variable and then using the scalar unconditionally or guarded by a different, second condition. Such a dependence is present in a scalar computer program loop when, for example, a read statement reads a scalar variable and a write statement subsequently write the scalar variable. In addition, the read statement is executed based on a first condition and the write statement is executed based on a second condition. A loop configured to include a read and a write statement that are ordered in this manner and that are based on two different conditions, will have a different outcome when iterated in parallel than when each loop iteration is executed in a serial fashion. Thus, the loop includes an edge/cycle that must be successfully processed by the analyzer (i.e., removed from the list of edges created by the analyzer) before the loop can be vectorized.

The vectorization system 110B includes an example analyzeR115B in communication with an example code generatoR120B via a communication bus 122B. In some examples, the example analyzeR115B includes a first example controlleR125B coupled via a communication bus 130B to an example dependence graph generatoR135B, an example graph analyzeR140B, an example predicate set generatoR145B, an example edge removeR150B, and an example dependence checkeR155B. The example code generatoR120B includes a second example controlleR160B coupled via a communication bus 165B to an example code converteR170B, an example propagatoR175B and an example selector/broadcasteR180B. In some examples, the first controlleR125B and the second controlleR160B can access a memory 190B as needed to store and/or retrieve information during operation.

In some examples, the example analyzeR115B receives the program code representing the scalar loop to be vectorized from the example code supplieR111A (see FIG. 1A). The example graph generatoR135B then generates a dependence graph representing the scalar loop. The graph generatoR135B supplies the graph to the example graph analyzeR140B which uses the graph to identify dependences/edges present in the graph. For example, the graph analyzeR140B creates a list of the edges that were identified based on the dependence graph.

The example predicate set generatoR145B then creates sets that will be populated with vector predicates. A vector predicate includes a set of vector values each corresponding to different loop iteration and each controlling whether a vector loop statement is to be executed in the corresponding iteration. The vector predicate is defined to be a condition that controls execution of a corresponding loop statement in the scalar loop. The example predicate vector sets created by the predicate set generatoR145B are later used, as described below, to identify loop statements that cause a loop cycle to arise (e.g., statements that use/read a conditionally defined scalar variable before that same scalar variable has been defined such that the outcome of the loop would be adversely affected if multiple iterations of the loop were to be executed in parallel).

As used herein, a predicate "p" placed before a vector statement (and enclosed in parentheses when shown in pseudo code) indicates that the vector statement is to be performed as a masked vector operation. A masked vector operation is an operation that is performed in an iteration only when a value in a vector element of the predicate vector "p," corresponding to the iteration, are TRUE, otherwise the operation is not performed. Thus, for example, a predicate vector "p" used to mask a first vector statement will cause the first vector statement to be executed for the loop iteration only when the value in the predicate vector element corresponding to the same loop iteration is TRUE. The term predicates is also referred to herein as a condition upon which a statement is to be executed. When a condition/predicate appears in a scalar computer program it is a scalar predicate and when a condition/predicate appears in a predicate vector it is referred to as a vector predicate. When describing the operation of a predicate within a vector computer program, it is to be understood that the predicate is a vector. Likewise, when describing the operation of a predicate within a scalar computer program, it is to be understood that the predicate is a scalar. In some instances, when needed for clarity, a predicate that takes the form of a vector is referred to herein as a predicate vector.

In some examples, the predicate set generatoR145B associates two example predicate sets (e.g., a "PredDefSet(W,J)" and a "PredUseSet(W,J)" with each write statement "W" that defines a scalar. The "PredDefSet(W,J)" contains each predicate that, when true, causes the scalar "J" to be defined within the same scalar iteration at or before the write statement, "W." The "PredUseSet(W,J)" contains each predicate that, when true, causes the scalar "J" to be used within the same scalar iteration at or before the write statement, "W." The "PredDefSet(W,J)" is initialized to contain "pW" where "pW" controls execution of the write statement "W," and "PredUseSet(W,J)" is initialized as a NULL set.

The example edge removeR150B next removes each loop-carried lexically backward anti-dependence edge between a read statement "R" that reads the scalar variable "J" and a write statement "W" that writes the scalar variable "J" from the list of edges generated by the edge analyzeR135B and then adds the predicate "pR" to the set "PredUseSet(W,J)" (i.e., sets PredUseSet(W,J) equal to the union of "PredUseSet(W,J)" and the predicate, "pR"), where "pR" controls the execution of the read statement "R."

The edge removeR150B also removes, from the list of edges generated by the edge analyzeR135B, each lexically backward output-dependence edge between, for example, two write statements "W1," and "W2" (e.g., a dependence from a second write statement, "W2," to a first write statement, "W1" of a scalar, "J,") provided that the second write statement "W2" is not a recurrence operation. Upon removing the dependences, the edge removeR150B adds the predicate "pW1" to the set "PredDefSet(W2,J)", where "pW138 controls execution of the write statement "W1" (e.g., sets "PredDefSet(W2,J)" equal to the union of "(Pred-DefSet(W2,J)" and "pW1." (Note that recurrence operations may take the form "T=fn(T,Z)" where the input and output "T" is either a scalar or an array reference to a same memory location. Techniques to vectorize loops having recurrence operations, though not described here, are described in detail below with respect to FIGS. 4, 5, 6, 15A, 15B, 15C, 16A, 16B and 16C.) As described below, the edges associated with the types of dependences described above are processed to permit removal of the edge from the list of edges generated by the edge analyzeR140B because the information related to the removed edges (e.g., the Sets "PredDefSet" and "PredUseSet") is later processed by the code generatoR120B to compensate for any of the edges that cause a cycle/path to be present in the loop.

In addition to performing the operations described above, the edge removeR150B also attempts to use other techniques (including any of the techniques disclosed herein) to process any other edges remaining in the list of edges identified by the edge analyzeR135B. For example, an edge processing technique(s) applicable to the type of edge being processed is attempted (i.e., any technique that will enable vectorization of the loop by the code generator). After the edge remover 150B is done operating, the example dependence checkeR155B determines whether any edges remain in the list of edges identified by the edge analyzeR135B. If any cycles remain, then the loop is not vectorizable and the vectorization system 110B stops operating. If the dependence checker 155B determines that no edges remain in the computer program loop being vectorized, the example analyzeR115B supplies the now vectorizable computer program loop to the code converteR170B of the code generatoR120B.

When the vectorizable code is received at the example code generatoR120B, the example code converteR170B converts the scalar computer program statements supplied by the example analyzeR115B to vector statements by, for example: 1) replacing references to scalar variable(s) with references to vector version(s) of the scalar variable(s), 2) replacing conditional statements in the scalar computer program loop to predicate statements "p," 3) converting statements that are executed conditionally to masked predicate operations, 4) replacing the scalar iteration control variable with a vector iteration control variable, etc. As used herein, a prefix of "v" is added to a scalar variable to indicate the vector form (scalar expansion) of the scalar variable. For example, "vj" is used to represent the vector form of the scalar variable, "J."

Next, the propagatoR175B determines whether there any vector predicates contained in the "PredUseSet(W,J)" that are not contained in the corresponding "PredDefSet(W,J)." If the vector predicates contained in the "PredUseSet(W,J)" are not a subset of the predicates contained in the corresponding "PredDefSet(W,J)," the write statement, "W" is associated with a dependence cycle. In response, the example propagatoR175B performs a propagation operation to compensate for the dependence cycle in a manner that effectively causes the cycle to be broken/eliminated.

For example, the propagatoR175B causes the elements of a conditionally defined vector "vj" of the scalar variable, "J," to propagate from one loop iteration to subsequently executed loop iterations to thereby prevent the execution of an iteration in which the scalar is used but not defined. In operation, the propagatoR175B propagates values from the vector elements of the vector "vj" where a corresponding predicate vector element is TRUE to subsequent vector elements of the vector "vj" where a corresponding predicate vector element is FALSE. In some examples, the propagatoR175B performs this propagation operation by, for example, inserting instructions (e.g., propagate instructions) after the identified, conditionally executed write statements (e.g., W1, W2 . . . etc.).

In some examples, the selector/broadcasteR180B then selects and broadcasts a last value of a vector "j" computed in a current vector iteration to all elements of a vector "vj." The example selector/broadcasteR180B and broadcasteR170B can do this by, for example, inserting an instruction(s) (e.g., select and/or broadcast instructions) at the bottom of the loop being vectorized. Generally, the select and/or broadcast instructions operate to select and broadcast the value residing at a last vector element of the vector "vj" computed in a first vector iteration to all elements of the vector "vj" to be used when executing the second vector iteration. For example, and as described above, if each vector is sixteen elements long, then a first set of sixteen iterations are executed in parallel and then a second set of sixteen iterations are executed in parallel and so on, until a desirable number of iterations. When the select and/or broadcast instruction is used, the value calculated for the last vector element of "vj [i]" during the first set of iterations is propagated to each element of the vector "vj[i+1]" to be used when executing the second set of iterations and so on. Thus, selecting and broadcasting the last element of "vj" calculated in the first iterated vector "vj [i]" to the elements of the vector "vj[i+1]" to be used in the second iterated vector "vj[i+1]" ensures that the vector "vj[i+1]" is properly initialized before execution.

In some examples, the graph generatoR135B, the graph analyzeR140B, the predicate set generatoR145B, the edge removeR150B and dependence checkeR155B operate under the control of the first controlleR125B. Likewise, in some examples, the code converteR170B, the propagatoR175B, and the selector/broadcasteR180B operate under control of the controlleR160B.

The operation of the example vectorization system 110B of FIG. 1B can be further understood with reference to an example scalar computer program loop 200 illustrated using the pseudo code shown in FIG. 2. The computer program loop 200 contains loop-carried lexically backward anti and output dependences (as described below) arising from conditionally defined scalar variables. A description of the operation of the example loop 200 is followed by a description of how the example vectorization system 110B operates to vectorize the loop 200.

The example computer program loop 200 begins when a scalar "j" is initialized to equal "a[0]." (See line 202). Next, a loop controlled by a counter "i" is entered (see line 204) and a test for a first condition or first predicate "p1" is performed where p1 is equal to "a[i]<b[i]." (See line 206). If the first predicate, "p1," is met, a first write statement, "W1," is executed by setting the scalar "j" equal to "a[i]" (See line 208). If the first predicate, "p1," is not met, a test for a second condition or predicate, "p2," is performed where "p2" is "c[i]<b[i]." (See line 212). If the second predicate, "p2," is met, a second write statement "W2" is executed by setting "j=c[i]." (See line 214). If the second predicate, "p2," is not met, the program 200 tests for a fourth condition or predicate, "p4," where "p4" is "b[i]>0." (See line 218). If the fourth predicate, "p4," is met, a read statement, "R1" is executed at which the value of "b[i]" is read as the value of the scalar "j." (See line 220). If the fourth predicate, "p4," is not met, the value of "j" is returned. (See line 226). (Note that a third predicate "p3" is defined and described with respect to vectorized computer program loop 300 shown in FIG. 3.)

Thus, the example computer program loop 200 contains two conditional write statements, "W1" and "W2" (see ll. 208, 214) to the scalar variable "j" and one conditional read statement, "R1," (see line 220) of the scalar variable "j." The order in which these instructions are executed creates: 1) lexically backward anti-dependences from "R1" to "W1" and "W2," 2) an output dependence from the first write statement "W1" to the second write statement "W2" and 3) a lexically backward output-dependence from the second write statement "W2" to the first write statement "W1."

The write statement "W1" defines the variable "j" based on the predicate "p1" and the write statement "W2" defines the variable "j" based on "p2." If either or both "p1" and "p2" are true in a current iteration, then the variable "j" will be defined in the same iteration before the read statement "R" is executed. However, if neither "p1" nor "p2" is true in the current iteration, then the variable "j" will be undefined when the read statement "R" is executed in the same iteration. When the read statement "R" executes before the variable "j" has been defined in the current iteration, the value of the "j" variable set in the preceding iteration will be read in the current iteration. Thus, when neither "p1" nor "p2" is true, an outcome of the current iteration is dependent on the preceding iteration (i.e., the conditional write statements cause a loop dependence) such that iterating the scalar computer program loop in parallel will cause an error in the outcome of one or more of the iterations.

FIG. 3 illustrates example computer program code 300 representing a vectorized version of the example scalar computer program code 200 (see FIG. 2). In some examples, the vectorization system 110B of FIG. 1 is used to vectorize the scalar computer program loop 200 of FIG. 2 to thereby generate the vectorized computer program loop 300 of FIG. 3. The example analyzeR115B first identifies and processes the edges of the scalar computer program loop 200 to enable vectorization of the loop To perform the conversion, the graph generatoR135B generates a dependence graph of the loop 200 (see FIG. 2). The graph analyzeR140B then uses the graph to identify and create a list of the edges present in the scalar computer program loop 200 (see FIG. 2). The edges present in the computer program loop 200 (see FIG. 2) are associated with 1) lexically backward anti-dependences from "R1" to "W1" and "W2," 2) an output dependence from the first write statement "W1" to the second write statement "W2" and 3) a lexically backward output-dependence from the second write statement "W2" to the first write statement "W1."

Next, the predicate set generatoR145B associates two predicate sets "PredDefSet(W,J)" and "PredUseSet(W,J)" with each of the write statements "W1" and "W2" such that the predicate set generatoR145B creates the following four sets: 1) "PredDefSet(W1,j)={p1}," 2) "PredUseSet(W1,j)={ }," 3) "PredDefSet(W2,j)={p2}," and 4) "PredUseSet(W2, j)={ }." The example edge removeR150B removes the cross-iteration backward anti-dependence edges between "R1" and "W1" from the list of edges identified by the graph analyzeR140B and sets "PredUseSet(W1,j)" equal to "{p3}," removes the cross-iteration backward anti-dependence edge between "R1" and "W2" from the list of edges identified by the graph analyzeR140B and sets "PredUseSet (W2,j)" equal to "{p3}." The edge removeR150B also removes the cross-iteration output dependence edge of "W2" to "W1" and sets "PredDefSet(W2,j)" equal to "{p2|p1}." In this example, the "PredUseSet (W1,j)" is not a subset of the "PredDefSet(W1,j)" thereby indicating that the write statement "W1" is associated with a cycle. Likewise, the "PredUseSet (W2,j)" is not a subset of the "PredDefSet(W2,j)" thereby indicating that the write statement "W2" is associated with a cycle.

After the edge removeR150B stops operating, the example dependence checker 155B determines that all the loop dependence edges have been removed from the list of edges identified by the example graph analyzeR140B and causes the vectorizable loop to be supplied to the example code generatoR120B. The example code generatoR120B then begins operating to create the vectorized code 300 of FIG. 3 by causing the code converteR170B to convert the conditionally executed statements of scalar loop 200 of FIG. 2 into conditionally executed vector statements in the loop 300 of FIG. 3. For example, to convert the write statement "W1" in loop 2 (see line 208 of FIG. 2) the code converteR170B replaces the conditional statement "if (a[i] <b[i])" (line 206 of FIG. 2) with a statement that defines the condition as a predicate, "p1=a[i:i+VL−1]<b[i:i+VL−1]" (see line 306 of FIG. 3). Here, the first predicate, "p1," (see line 308) is used as a mask vector for performing the first write statement, "W1" and the second predicate, "p2," (see line 312) is used as a mask vector for performing the second write statement "W2." (See line 314). The predicate "p" enclosed in parentheses before a statement indicates that the statement is to be performed as a masked vector operation. A masked vector operation is an operation that is performed only when elements of the predicate "p" used as the vector mask are TRUE, otherwise the operation is not performed. Thus, for example, with respect to line 308 of FIG. 3, the first predicate "p1" is used to mask the operation of the first write statement "W1" such that the first write operation "W1" is performed on a particular element of the vector "vj" depending on whether a corresponding vector element of the predicate mask is true.

In the example of loop 200 and, as described above, the read instruction "R" is only executed when both "p1" and "p2" are true (i.e., the union of "p1" and "p2"). Thus, the example code converter also defines a third predicate "p3" equal to the union of "p1" and "p2" (e.g., "p1|p2") (see line 316) to control execution of the read statement "R."

As described above, the "PredUseSet (W1,j)" is not a subset of the "PredDefSet(W1,j)" and the "PredUseSet (W2,j)" is not a subset of the "PredDefSet(W2,j)." As a result, the example propagatoR175B inserts a first example propagate instruction (e.g., "PropagatePostTrue" instruction) after the first write statement "W1" masked by the predicate "p1" (See line 310) and a second example propagate instruction ("PropagatePostTrue" instruction) after the second write statement "W2" (See line 318) masked by the predicate "p2." As described above, the "PropagatePostTrue" instruction of line 318 causes the values of the vector elements of "vj" calculated in loop iterations in which "p3" is true to be propagated to vector elements calculated in subsequent loop iterations in which "p3" is false. This operation causes the value of the variable "j" calculated in any iteration in which neither "p1" nor "p2" is TRUE (i.e., the iterations in which "j" is not defined before being read) to be equal to the value of the variable "j" calculated in the iteration in which the value of "j" was last defined. In this example, the value of "j" was last defined in the nearest preceding iteration in which either "p1" and/or "p2" were TRUE. Thus, the propagation instruction (see line 318) compensates for the loop dependence(s) caused by the loop statements that use a loop variable in a given iteration before that loop variable has been defined in the same iteration to thereby allow multiple iterations of the loop to be executed in parallel (i.e., vectorized).

The selector/broadcasteR170B then inserts an example select instruction (e.g., "SelectLast" operation) at the bottom (i.e., end) of the loop to select and broadcast the last value of "j" computed in each loop iteration to all elements of the vector "vj" based on a predicate "TRUE_Predicate" where all of the values in the "TRUE_Predicate" are true. (See line 324).

It is noted that the "PropagatePostTrue" instruction of line 310 is intended to compensate for the loop dependence caused by the conditionally executed write statement "W1." However, by defining the predicate "p3" to account for the circumstances in which neither "p1" nor "p2" is true, the "PropagatePostTrue" instruction at the line 318 of FIG. 3 compensates for both instances in which the read instruction "R" attempts to read a "j" value that has not been previously defined in the same loop iteration. As a result, the "PropagatePostTrue" instruction of line 310 never operates and can be removed without consequence to loop operation.

Figure 1C:
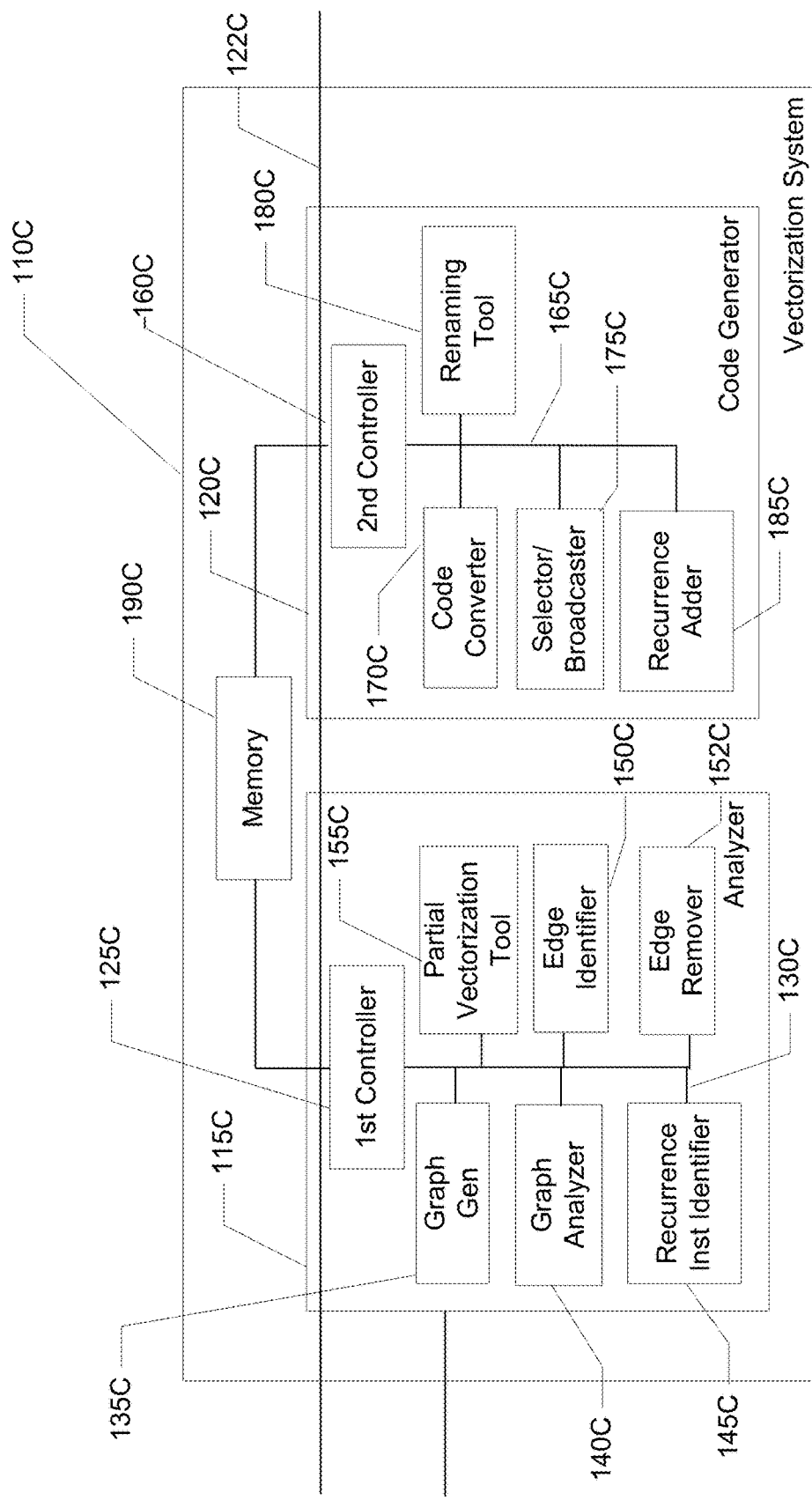
FIG. 1C illustrates a block diagram of an example vectorization system capable of vectorizing a scalar computer program loop having loop dependences that arise from recurrence loop operations.

Vectorization of Loops Having Loop Dependences Arising from Recurrence Operations FIG. 1C is a block diagram of an example vectorization system 110C configured to vectorize loops having loop dependences arising from use of a recurrence operation. Recurrence operations may take the form "T=fn(T,Z) where the input and output "T" is either a scalar or an array reference to a same memory location. One example recurrence instruction can take the form of a write statement "W" where "W" is equal to "t=t+a[i]" such that the value of "t" is set equal to a previously defined value of "t" plus the addend "a[i]." In cases where the value of "t" to be added to "a[i]" was defined in an earlier-executed iteration, (e.g., "t=t[i−1]+a[i]"), the outcome of a current iteration "i" is dependent on an outcome of an earlier executed loop iteration thereby causing a loop dependence to arise.

In some examples, a computer program loop contains a read statement "R" that operates on the variable "t" and precedes execution of the recurrent write statement "W" where the execution of "W" depends on a condition "p." In such examples, assuming that the value of "t" is initialized to "$t_{initial}$" before the computer program loop is entered, after execution of the write statement "W" at a fourth loop iteration, the value of "t" will equal "$t_{initial}$+a[1]+a[2]+a[3]+a[4]" provided that the predicate condition "p" was met in each of the four loop iterations. If, instead, the predicate condition "p" was met in the first three loop iterations but not the fourth loop iteration, the value of "t" at the fourth loop iteration will equal "$t_{initial}$+a[1]+a[2]+a[3]." Thus, the value of "t" read in each loop iteration will equal "$t_{initial}$" plus the values of "a" associated with earlier loop iterations in which the corresponding predicate condition "p," is met.

In the illustrated example of FIG. 1C, the vectorization system 110C includes an example analyzeR115C in communication with an example code generatoR120C via an example communication bus 122C. The example analyzeR115C operates to identify and process loop dependence edges arising from recurrence operations thereby rendering the computer program loop vectorizable, and the example code generatoR120C operates to vectorize the code. In some examples, the example analyzeR115C performs the dependence edge removal operations by creating a dependence graph of the loop, using the graph to identify loop dependences and then removing edges from the graph as described below. The code generatoR120C operates to vectorize recurrence instructions included in the computer program loop by causing one or more elements of a first vector to be added to one or more elements of a second vector depending on the value of a predicate vector. In some examples, the elements of the first and second vectors are added using an instruction that creates a running sum of the elements of a vector representing the "addend" of the recurrence instruction as described in greater detail below.

In some examples, the analyzeR115C includes a first example controlleR125C coupled via a communication bus 130C to an example graph generatoR135C, an example graph analyzeR140C, an example recurrence instruction identifieR145C, an example edge identifieR150C, an example edge removeR152C, and an example partial vectorization tool 155C. In some examples, the code generatoR120C of FIG. 1C includes a second example controlleR160C coupled via a communication bus 165C to an example vector code converteR170C, an example selector/broadcasteR175C, an example vector renaming tool 180C, and an example recurrence adder 185C. The example first controlleR125C and the example second controlleR160C access a memory 190C as needed to store and/or retrieve information during operation.

In some examples, the example analyzeR115C receives the program code representing the scalar loop to be vectorized from the example code supplieR111A (see FIG. 1A). The example graph generatoR135C then generates a dependence graph representing the scalar loop. The graph generatoR135C supplies the graph to the example graph analyzeR140C which uses the graph to identify and create a list of edges present in the dependence graph.

The recurrence instruction identifieR145C then marks each recurrence instruction(s) that operates on, for example, a variable "t," with an "S." In some examples, the recurrence instruction "S" are write statement(s) "W" that takes the form "t=t+addend" or the form "t=t−addend" (provided that the variable "addend" is a constant or is a variable expression that is not dependent on the variable "t"). If the addend is not a constant or is a variable expression dependent on the variable "t," then the code is not vectorizable and the vectorization system 110C ceases operating. Here, the variable "t" may be a scalar variable, an array variable or memory accesses where the loop-carried flow-dependence distance in the recurrence operation is 1. A flow dependence distance of 1 indicates that a value written in a previous iteration of the loop is read in the current iteration of the loop. As described above, iterations of a loop having a dependence distance of 1 cannot be iterated in parallel.

In addition to marking the recurrence instructions/statements with an "S," the example recurrence instruction identifieR145C creates an example set of instructions to store the recurrence instructions/statements, referred to as, for example, "RecurrenceSet(t)" and populates the set with the instructions marked with an "S."

The example edge identifieR150C of the example analyzeR115C then creates an initially empty set, referred to as "EdgesToRemove(t)," that is later populated with edges that are to be removed from the list of edges generated by the graph analyzeR140C. The example edge identifieR150C adds each intra-iteration anti-dependence edge (e.g., "A") on the operand "t" that extends from a read statement(s) "R" in the loop to one of the write statements "W" in the loop to the "EdgesToRemove(t)" set provided that the write statement "W" is a recurrence instruction "S" and the read statement "R" is not a recurrence instruction "S" (e.g., "RecurrenceSet(t)" set contains the write statement "W" but not the read statement "R"). (If this condition is not met, the vectorization system 110C cannot vectorize the code and ceases operating.) In some examples, the recurrence instruction identifieR145C also creates an initially empty set of instructions, referred to as, for example, "PreAdd(R)," corresponding to each read instruction "R." As described below, the "PreAdd(R)" set corresponding to each read statement "R" will later be populated with the recurrence write instruction(s) "W" that operate on a same variable (e.g., "t") operated on by the read statement "R."

Next, the example partial vectorization tool 155C selects an anti-dependence edge remaining in "EdgesToRemove(t)" (e.g., "A") extending from a read instruction "R" to a write instruction "W" with direction (=) and applies partial vectorization techniques to compensate for the edge in a manner that will permit vectorization of the loop. The example partial vectorization tool 155C applies the partial vectorization techniques when the application of the technique will enable vectorization of the loop (e.g., will result in the elimination of one or more cycles in the dependence graph from the read statement "R" to the write statement "W") and further provided that there are paths from the read statement "R" to the write statement "W" that are constructed using intra-iteration dependence edges that do not pass through an edge in the "EdgesToRemove(t)" set. The partial vectorization techniques may include, for example, the partial vectorization techniques described below with respect to FIGS. 11, 14 and 21.

If one or more of the edges cannot be processed using the partial vectorization technique (e.g., applying partial vectorization will not enable vectorization of the loop by the code generatoR120C), the example edge removeR152C removes the recurrence instruction "W" from the "RecurrentSet(t)" set and then removes all edges from the "EdgesToRemove(t)" set. As described below, when the partial vectorization techniques are unsuccessful in removing one or more of the edges from the list of edges generated by the example graph analyzeR140C (i.e., application of partial vectorization will not enable vectorization), other edge processing techniques are later applied in an attempt to remove the cycles created by the edges and thereby enable loop vectorization.

Provided that the "RecurrenceSet(t)" set is not empty (i.e., "RecurrenceSet(t)" set contains one or more other recurrence write instructions/statements such as a second write statement "W2"), the partial vectorization tool 155C selects the second write statement "W2," adds the associated anti-dependent edges to "EdgesToRemove(t)" and proceeds to operate in the manner described above in an attempt to process the edge dependence graph using partial vectorization techniques. In some examples, the partial vectorization tool 155C is associated with the code generatoR120C instead of the code analyzeR115C.

If the example partial vectorization tool 155C is successful in permitting removing one or more such edges associated with the recurrence instruction(s) (e.g., "W"), the example recurrence instruction identifieR145C adds the write instruction "W1" to the "PreAdd(R)" set created for each corresponding read statement "R" (e.g., "PreAdd(R)"). In some examples, the example recurrence instruction identifieR145C adds the write statement "W1" to the "PreAdd(R)" set by setting "PreAdd(R)" equal to the union of "PreAdd(R)" and "W." Next, the example edge removeR152C removes loop-carried anti-dependence edges having a sink node contained in the "RecurrenceSet(t)" set from the dependence graph (i.e., from the list of edges created by the edge analyzeR135C) and removes the loop-carried flow or output dependence edges occurring between two recurrence instructions/statements from the dependence graph, (e.g., from the first write statement "W1" to the second write statement "W2), where both the recurrence instructions/statements are contained in the "RecurrenceSet(t)." If, additional recurrence instruction(s) remain in "RecurrenceSet(t)," the operations described above are repeated for each of the remaining recurrence instruction(s).

If one or more of the edges remaining in the dependence graph connect to form a dependence cycle, one or more other techniques performed by, for example, the analyzers of FIGS. 1B, 1D, 1E and 1F may be deployed to attempt to process the remaining edges. For example, a technique applicable to the type of edge to be processed is attempted (i.e., a technique that will permit vectorization of the loop by the code generator is attempted). If such edges and associated cycles are not successfully processed, the loop cannot be vectorized and the compileR110A ceases operating. If, instead, such edges and associated cycles are successfully processed/removed from the list edges created by the graph analyzeR140B the loop is now vectorizable and is supplied by the example analyzeR115B to the example code generatoR160C for vectorization.

When the vectorizable code is received at the example code generatoR120C, the example code converteR170C converts the scalar computer program loop instructions supplied by the example analyzeR115C to vector program instruction by, for example: 1) replacing references to the scalar variable(s) with references to vector version(s) of the variable(s) 2) replacing conditional statements in the scalar code with predicate statements "p," 3) converting statements that are executed conditionally to masked predicate operations, 4) replacing the scalar iteration control variable with a vector iteration control variable, etc.

Next, the example recurrence addeR185C recurrently uses a first running sum operation and/or a second running sum operation to add the "addend(s)" values corresponding to each loop iteration (e.g., "a[i], a[i+1], a[i+2], a[i+3], etc.") and thereby form a first vector of a first running sum of the addend values (e.g., "vsa1") and a second vector of a second running sum of the addend values (e.g., "vsa2"). Each element in the first and second running sums (e.g., "vsa1" and "vsa2") represents a running sum of the addend values gathered up to a desired loop iteration (e.g., "[i]" or "[i−1]"). In some examples, the recurrence addeR185C forms the first and second running sum vectors (e.g., "vsa1" and "vsa2") by: 1) causing elements of a vector of the addend values (e.g., "va") to be added to elements of another vector (e.g., the vector "v1"), 2) causing elements of the addend vector "va" to be added together, and/or 3) propagating elements of addend vector "va" to subsequent elements of "vsa." The adding and propagating operations performed by the recurrence addeR185C are executed based on a predicate mask condition vector "p." The predicate mask condition "p" corresponds to a condition in the scalar loop used to control operation of the corresponding scalar recurrence instruction "t=t+v[a]."

In some examples, the example recurrence addeR185C generates the first and second running sums using an example set of propagation instructions (e.g., a "RunningPostAdd" instruction and a "RunningPreAdd" instruction, respectively). The "Running PostAdd" instruction, for example, operates on "v1," "va," and "p" to calculate the first running sum (e.g., "vsa1") and takes the form "vsa1=RunningPostAdd(v1, va, p)." The "RunningPreAdd" instruction, for example, also operates on the vector, "v1," the vector "va" and the predicate mask vector "p" to calculate a second running sum (e.g., vector "vsa2") and takes the form "vsa2=RunningPreAdd(v1, va, p)." Both instructions traverse the vector elements of the predicate mask vector "p" starting from the vector element residing at the vector element position "0" of the predicate mask vector. Each vector element value contained in the first vector "v1" is copied to a corresponding element position "k" in the first and second running sum vectors (e.g., "vsa1" and "vsa2") until the first TRUE predicate element of the predicate mask vector "p" is encountered. When the first TRUE predicate element of the predicate mask vector "p" is encountered, a running sum (i.e., partial sum) of the mask enabled elements of the vector "va" is added to the first mask enabled element of the vector "v1" and stored as the element residing in the corresponding position "k" of the first running sum vector and the second running sum vector (e.g., "vsa1" or "vsa2"). When using the "RunningPostAdd," instruction, the value recorded at the vector element position "k" of the vector "vsa1" (i.e., "vsa1 [k]") includes the addition of the element residing at the vector element position "k" of the vector "va," (i.e., the first running sum is gathered up to and include the element of the vector "va" located at the position "k"). In contrast, for "RunningPreAdd" the vector value recorded at the vector element position "k" of the vector "vsa2" includes the partial sum of the elements of the vector "va" gathered up but not including the element residing at the vector element position "k" (i.e., the second running sum is gathered up to the element of the vector "va" located at the position "k−1"). Note that the vector "v1" represents an initial value to be added to the partial sum (e.g., "vsa1" or "vsa2"). In some examples, the recurrence addeR185C initializes the elements of the vector "v1" at the top of the loop.

Figure 4:
FIG. 4 illustrates example pseudo code representing an example scalar computer program loop having loop-carried dependences that arise from recurrence loop operations.

Using the example of FIG. 4 to demonstrate the operation of the "RunningPostAdd" and "RunningPreAdd" instructions when using the predicate "p" to operate on the illustrated eight element vectors "v1" and "va," the vector value of "vsa1" residing at the vector element position "k=0" is equal to the vector value of "v1" residing at the vector element position "k=0" (e.g., "vsa1 [0]"="v1[0]." Likewise, "vsa1 [1]"="v1[1]" because the first two elements of the predicate vector "p" residing at the vector element positions "k=0" and "k=1" are FALSE. The first TRUE value of "p" resides at the vector element position "k=2." Hence, the running sum is computed starting at the vector element position "k=2. Thus, the value of "vsa1" at vector element position "k=2" is equal to "v1[2]+va[2]" and the value of "vsa2" at vector element position "k=2" is equal to "v1[2]." Likewise, because "p[3]" is TRUE, the value of "vsa1" at "k=3" is equal to "v1[2]+v2[2]+v2[3]" and the "vsa2" at "k=3" is equal to "v1[2]+v2[2]." The values of "vsa1" remain unchanged at k=4, 5 and 6 because the predicate "p" is FALSE at these vector element positions is FALSE and the value of "vsa1" includes the addition of "v2[7]" at "k=7." The values of "vsa2" remain unchanged at k=4, 5, 6 and 7 because the predicate "p" is FALSE at these vector element positions is FALSE and the value of "vsa2" does not include the addition of "v2[7]" at "k=7."

Referring again to FIG. 1C, after inserting the instructions that generate the first running sum (e.g., "vsa1"), the example recurrence addeR185C re-defines the vector "vt" by inserting a vector recurrence operation that adds the first running sum to the vector "vt." Thus, in some examples, the example recurrence addeR185C inserts the sequence of vector instructions "{vsa1=RunningPostAdd(v1,va,p); vt=vt+vsa1}," where "S" is of the form "t=t+a" or the instruction sequence "{vsa1=RunningPostAdd(v0,va,p); vt=vt−vsa1}," where the instruction "S" is of the form "t=t−a").

Next, to distinguish the vector "vt" being written by a recurrence write instruction "W" and then read by a read instruction "R" from other forms of the vector "vt" that are used elsewhere in the computer program loop, the example renaming tool 180C renames the vector "vt" before each read instruction "R" that operates on the vector "vt." In some examples, the example renaming tool 180C renames the vector, "vt," operated on by the read instruction "R" to "vtk" and replaces references to the vector "vt" in the read instruction "R" with references to the vector "vtk."

In some examples, for each recurrence instruction "S" (e.g., each write instruction "W") included in a "PreAdd(R)" set, the recurrence addeR185C uses a second summing operation to generate a second running sum of the addend associated with the corresponding recurrence instruction "S" gathered up to the previous iteration. The second summing operation, in some examples, is implemented using the instruction "vsa2=RunningPreAdd(0,va,p1)." In addition, the recurrence addeR185C inserts a second recurrence instruction that defines the vector "vt" as being equal to the sum of the vector "vt" and the second running sum (e.g., "vtk=vtk+vya" or "vtk=vtk−vya" depending on whether the corresponding scalar recurrence operation takes the form "t=t+a" or "t=t−a," respectively). Thus, the example recurrence addeR185C generates the second running sum and the second recurrence instruction using the sequence of vector instructions {vya=RunningPreAdd(0,vz,p1); vtk=vtk+vya" or "vya=RunningPreAdd(0,vz,p1); vtk=vtk−vya"}.

The sequences of instructions inserted by the recurrence addeR185C compensate for the cycles created by the edges removed from the list of edges created by the graph analyzer 140C (see FIG. 1C) such that the code generatoR120C can vectorize the loop (i.e., convert the scalar loop to a loop that can be iterated in parallel without adverse effect on loop integrity).

At this point, one or more optimization techniques, such as copy propagation and common sub-expression elimination or partial redundancy elimination can be performed to further fine tune/optimize the vectorized code.

The example selector/broadcasteR175C initializes every element in the vector "vt" (before the vector loop is entered) using an initial value of the scalar variable "t." In some examples, the selector/broadcasteR175C performs this operation by inserting, for example, a "broadcast" instruction (e.g., "vt=Broadcast(t)"). The selector/broadcasteR175C performs this initializing operation on each scalar variable that is subject to a recurrence instruction "S" included in the computer program loop. The example selector/broadcasteR175C also inserts the last mask-enabled element of the vector "vt" (calculated at the bottom of the first loop iteration) to be inserted into each element of the vector "vt" at the start of the succeeding vector iteration. Thus, the value in the last element of "vt" calculated in the initial vector iteration is used at the input of the succeeding vector iteration (e.g., the last element of the vector "vt" calculated at the bottom of a vector iteration is used to populate each element of the vector "vt" at the top of the next loop iteration). In some examples, the example selector/broadcasteR175C selects the last value of the vector "vt" by inserting a "SelectLast" instruction (e.g., "vt=SelectLast(vt, p0)") where "p0" is a predicate mask vector having all elements set to TRUE. In some examples, the selector/broadcasteR175C also inserts a broadcast instruction before the loop is entered to set the elements of the predicate mask vector "p0." In addition, in some examples, the selector broadcasteR175C sets or clears the elements of the vector "v1" before the loop is entered.

In some examples, the example graph generatoR135C, the example graph generatoR135C, the example graph analyzeR140C, the example recurrence instruction identifier 145C, the example edge identifieR150C, the example edge removeR152C, and the example partial vectorization tool 155C operate under the control of the first example controlleR125C. Likewise, in some examples, the example vector code converteR170C, the example selector/broadcasteR175C, the example vector renaming tool 180C, and the example recurrence addeR190C operate under the control of the second controlleR160C.

Figure 5:
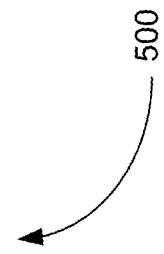
FIG. 5 illustrates example pseudo code used by the example code generator to vectorize a computer program loop having loop-carried dependences that arise from recurrence loop operations.

An example computer program loop 500 illustrated using the pseudo code shown in FIG. 5 is described to provide one example of a loop having loop dependences that arise from recurrence operations/statements. The description of the loop operation is followed by a description of how the example vectorization system 110C operates to vectorize the computer program loop 500 of FIG. 5.

The example computer program loop 500 sets a variable "sum" equal to "0." (See line 502) and defines a loop iteration control variable "i." (See line 504). Upon entering the loop, a first read instruction "R1" is executed on a variable "sum." (See line 506). If a condition (e.g., predicate "p1") equal to "a[i]<K" returns TRUE (see line 508), then a first write statement "W1" operates as a recurrence operation to read and write to the variable "sum." (See line 510). (Note that the variable "K" used in the conditional "p1" is not related to the "k" variable used earlier to represent the vector elements.) Otherwise, a second read statement "R2" reads the variable "sum." (See line 514). Next, if a predicate "p2" equal to "b[i]<K2" returns TRUE (see line 516), then a second write statement "W2" operates as a recurrence operation to read and write the variable "sum." (See line 518). Lastly, a third read statement "R3" reads the variable sum. (See line 522). Thus, as described, the loop 500 of FIG. 5 reads the variable sum at the statement "R1" and then conditionally adds a first value "a[i]" to the variable "sum" based on the predicate "p1" at the write statement "W1" and/or adds a second value "b[i]" based on the predicate "p2" at the write statement "W2." The loop 500 also reads the results of the write statement "W1," and the write statement "W2." Thus, the variable "sum" calculated in one iteration of the loop 500 is used in subsequent iteration(s) of the loop 500 and the method used to calculate the variable "sum" changes in each loop based on the conditions "p1" and "p2."

An example computer program loop 600 representing a vectorized version of the loop 500 of FIG. 5 is illustrated using the pseudo code of FIG. 6. Before the code generatoR120D creates the vectorized code, the example analyzeR115D operates to the convert the code in the manner described above. For example, the graph generator generates a graph of the computer program loop of FIG. 6 and the graph analyzer analyzes the graph to identify and create a list of loop edges.

As described above, the loop 500 conditionally adds a value to the scalar variable "sum" at the statement "W1" which is then read in the same and/or subsequent loop iterations by one or more statements "R1," "W1," "R2," "W2," and "R3." Thus, when operating on the program loop 500 of FIG. 5, the graph analyzeR140C identifies an intra-iteration anti-dependence edge "A1_R1W1" on the variable "sum" from the read statement "R1" to the write statement "W1" that requires that the statement "R1" lexically precede the write statement "W1." As a result, a flow dependence edge "F1_W1R1" from the write statement "W1" to the read statement "R1" on the variable "sum" is a loop-carried lexically backward flow dependence. Similarly there are intra-iteration anti-dependences edges, "A2_R1W2," A3_W1W2, A4_R2W2 on the variable "sum" from the read statement "R1," to the write statement "W1," and from the read statement "R2" to the write statement "W2" that require that the read statement "R1," the write statement "W1", and the read statement "R2" lexically precede the write statement "W2." Hence a set of flow dependence edges "F2_W2R1," "F3_W2W1," and "F4_W2R2" from the write statement "W2" to "R1," "W1," and "R2" on the variable "sum" are loop-carried lexically backward flow dependences/edges. Together, these flow and anti-dependences "F1_W1R1," "F2_W2R1," "F3_W2W1," and "F4_W2R2" and "A1_R1W1," "A2_R1W2," "A3_W1W2," and "A4_R2W2" create cycles in the dependence graph. There are also cycles created by self flow dependences as well as flow dependences between the recurrence operations "W1" and "W2." In addition there are cycles created by output dependences between "W1" and "W2" (referred to as "O1_W2W1", O2_W1W1," O3_W2,W2"). A conventional compiler would not be able to vectorize this loop.

After the graph analyzeR140C has identified and created a list of the dependences of the computer program loop 500, the example recurrence instruction identifieR145C creates the "RecurrenceSet(sum)" set and defines the set to contain the recurrence instructions/statements "{W1,W2}." The example edge identifieR150C creates the initially empty set of edges to be removed, "EdgesToRemove(sum)". The example edge identifieR150C then adds each intra-iteration anti-dependence edge "A" on the operand "sum" from a read instruction to a write statement to the "EdgesToRemove(t)" set provided that the "RecurrenceSet(sum)" set contains the corresponding write statements "W1" and "W2" but not the corresponding read statements "R1" and "R2." In the loop 500, the intra iteration edges "A1," "A2," and "A4" correspond to the edges from "R1" to "W1," from "R1" to "W2" and from "R2" to "W2," respectively, and "RecurrenceSet (sum)" contains "W1" and "W2" but not "R1" and not "R2." As a result, the edges "A1," "A2," and "A4" are each added to the "EdgesToRemove(t)" set.

As described above, in some examples, the edge identifieR150C creates an initially empty set of instructions, "PreAdd(R)." to contain read statements "R." A different "PreAdd(R)" set is created for each read instruction "R" in the loop 500 (i.e., "PreAdd(R1)" and "PreAdd(R2)." The example edge identifieR150C adds "W1" and "W2" to "PreAdd(R1)" because the anti-dependent intra-iteration edge "A1_R1,W1" extends from "R1" to "W1" and the anti-dependence intra-iteration edge "(A2_R1,W2)" extends from "R1" to "W2." The example edge identifieR150C also adds the write statement "W2" to "PreAdd(R2)" because the anti-dependence intra-iteration edge "A4_R2,W2" extends from "R2" to "W2."

In the scalar computer program loop 500 of FIG. 5, every path formed using intra-iteration dependence edges "A1," "A2" and "A4" passes through an edge in the "EdgesToRemove(sum)" set such that the partial vectorization tool 155C does not apply partial vectorization techniques to remove these edges.

Next, the edge identifieR150C removes the edges contained in the "EdgesToRemove(t)" set from the dependence graph/list of edges and removes any loop-carried anti-dependence edges on the variable "sum" if the sink node of the edge is in the "RecurrenceSet(t)." This operation results in the removal of the edges "A1," "A2," "A3," and "A4" from "EdgesToRemove(sum)" and from the list of edges.

The example edge identifieR120C also removes, from the dependence graph/list of edges, each loop-carried flow and output dependence edge on the variable "sum" from the statement "W1" to the statement "W2," provided that both "W1" and "W2" are in the "RecurrenceSet(t)." This operation results in the removal of the edges "O1," "O2," "O3," "F1," "F2," "F3," and "F4" from the dependence graph/list of edges.

Because all cycles in the loop were formed by one or more of the edges removed from the list of edges, the edge identifieR150C supplies the scalar computer program code and edge-related information the example code generatoR120C for vectorization. It is noted that there are additional edges (dependences) in the scalar computer program loop 500 not discussed here. However, these edges do not cause cycles such that removal of these edges is not required to enable vectorization.

Referring to FIG. 6, upon receiving the vectorizable code, the example code generatoR120C begins operating when the example code converteR170C converts the scalar loop variables to vector variables (e.g., "sum" is converted to "vsum," "a[i]" is converted to "vsa[i]," and "b[i]" is converted to "vsb[i]"), initializes the vector controller iteration "i" to control iteration of the vectorized loop, and defines a set of predicates "p1" and "p2" to replace the conditional statements that control execution of the first write statement "W1" and the second write statement "W2." (See lines 608, 610, 612, 614 and 616). The example selector/broadcasteR175C initializes a set of vectors including a predicate vector, "p0," and the vectors "vzero" and the vector "vsum" are initialized by the recurrence addeR185C before the loop is entered (see lines 602, 604, 606). As shown, the vector elements of the predicate "p0" are set to TRUE and the predicate "p0" is later used by the selector/broadcasteR175C as described in detail below. The elements of the vectors "vzero" and "vsum" are also set to FALSE and both are later used by the example recurrence adder 185C to determine a running sum of the variables "a[i]" and "b[i]," as is also described in greater detail below.

To ensure proper loop operation, the example renaming tool 180C renames the vector "vsum" to be read at "R1" to "vsum1" and the vector "vsum" to be read at "R2" to "vsum2." The name of the vector "vsum" read at instruction "R3" remains unchanged. (See lines 624, 632, and 638).

In some examples, after the example code converteR170C, the example selector/broadcasteR175C and the example renaming tool 180C have operated, the example recurrence addeR185C uses a sequence of three instructions (see lines 618-622) to calculate the vector "vsum1" operated on by the first read instruction "R1." (See line 624). The first instruction in the sequence is a "RunningPreAdd" instruction (See line 618) that operates on the vector "va" and the vector "vzero" to calculate a running sum (i.e., "vsa") of the mask enabled elements of the vector "va" gathered up to the previous iteration, where the mask is "p1." During execution of the first loop iteration of each vector iteration, the running sum, "vsa" of the mask enabled elements of "va" gathered up to the previous iteration is set to zero such that the first element of "va" used in each vector iteration is zero.

The second example instruction is a "RunningPreAdd" instruction (see line 620) that operates on the vector "vb" and the vector "vzero" to calculate a running sum (i.e., "vsb") of the mask enabled elements of the vector "vb" gathered up to the previous iteration, where the mask is "p2." Note that, during execution of the first loop iteration of each vector iteration, the running sum of "vb" gathered up to the previous iteration is set to zero such that the first element of "vb" used in each vector iteration is zero. (See line 620).

The second example instruction sets "vsum=vsum+vsa" (see line 628 thereby causing the values in the vector "vsum" to be equal to the values in the vector "vsum" calculated at the end of a previous iteration added to the running sum (i.e., "vsa") of the masked enabled elements of the vector "va" calculated in a current iteration. The third example instruction calculates the value of "vsum1" to equal the sum of the values of the vector "vsum" as defined for the current set of vector iterations (see line 606 for the initial set of vector iterations and line 638, 640 for later sets of vector iterations) added to the running sums (i.e., "vsa," and "vsb") of the mask enabled elements of the vectors "va" and "vb," respectively (see lines 618, 620) calculated using the "RunningPreAdd" instructions (see lines 622). Note that the recurrence addeR185C has set the elements of the vector "vsum" used during the first vector iteration to zero (see line 606), as described above, and the elements in the vector "vsum" used in subsequent vector iterations are carried over from a previous vector iteration (see lines 622 and 640). The elements of the vector "vzero" were also set by the example recurrence addeR185C to zero as described above. Here, the vector "vzero" represents the vector "v1" described in the example illustrated in FIG. 4.

The example recurrence addeR185C also inserts a second sequence of three instructions (see lines 626-630) to calculate the vector "vsum2" operated on by the second read instruction "R2." (See line 632). The first instruction in the second sequence of instructions is a "RunningPostAdd" instruction (See line 626) that operates on the vector "va" and the vector "vzero" to calculate a running sum (e.g., "vsa") of the mask enabled elements of the vector "va" gathered up to the current iteration, where the mask is "p1."

The second example instruction sets "vsum=vsum+vsa" (see line 628) thereby causing the values in the vector "vsum" to equal the values in the vector "vsum" calculated at the end of a previous iteration added to the running sum (i.e., "vsa") of the vector "va" calculated in a current iteration. The third example instruction sets "vsum2=vsum+vsb" (see line 630) thereby causing the values in the vector "vsum2" to equal the values in the vector "vsum" calculated at the end of a previous iteration added to the running sum the vector "vb" calculated in a current iteration.

The example recurrence addeR185C also inserts a sequence of two instructions (see lines 634-636) to calculate the value of "vsum" to be read at the third read instruction "R3." (See line 638). The first instruction in the sequence is a "RunningPostAdd" instruction (See line 634) that operates on the vector "vsb" and the vector "vzero" to calculate a running sum of the mask enabled elements of the vector "vb" gathered up to the current iteration, where the mask is "p2."

The second example instruction (see line 636) re-defines the value of "vsum" to equal the sum of "vsum" (defined at the line 630) added to the running sum (i.e., "vsb") of the mask enabled elements of the vector "vb" gathered up to the current iteration.

The example selector/broadcaster inserts a "SelectLast" instruction (see line 640) after the third read instruction "R3" to select and broadcast the last mask enabled element of "vsum" (as defined at line 636) to every element of the vector "vsum" used in the next vector iteration. As described above, the predicate "p0" used in the "SelectLast instruction" is a predicate mask (see line 602) with all bits enabled (i.e., all elements are TRUE).

Vectorization of Loops Having Cross Iteration Memory Loop Dependences

Figure 1D:
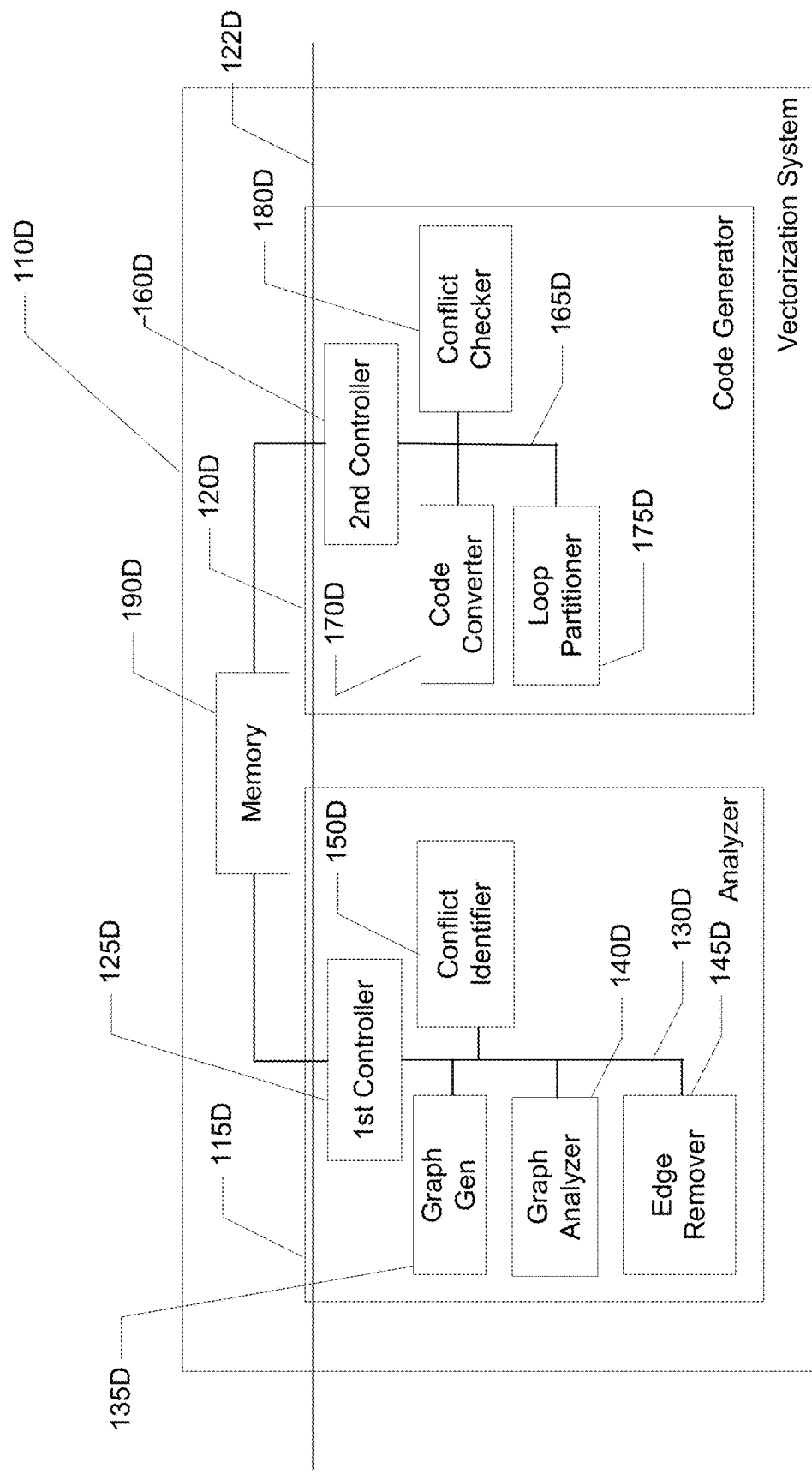
FIG. 1D illustrates a block diagram of an example vectorization system capable of vectorizing a scalar computer program loop having cross iteration memory dependences.

FIG. 1D is a block diagram of an example vectorization system 110D configured to vectorize loops having cross iteration memory dependences. Cross iteration memory dependences occur when a memory access performed in one iteration of a loop conflicts with a memory access occurring in a previous iteration of the same loop. In some examples, an example analyzeR115D identifies and removes cross-iteration dependence edge from a dependence graph (e.g., from a list of edge created using the dependence graph) corresponding to the loop and an example code generatoR120D operates to compensate for the removed edges by, for example, performing memory checking operations to identify different loop iterations that may access a same memory (resulting in a memory conflict) and sectioning or partitioning the vector loop into chunks that can be performed in parallel without resulting in an adverse loop outcome (e.g., creating a vector partitioning loop). A vector partitioning loop executes a variable number of times based on dynamically changing conditions in the loop (e.g., the detection of memory access conflicts in the loop), in contrast to a loop vectorized using conventional techniques which executes a fixed number of times. Before describing the operations performed by the vectorization system 110D, a brief description of how a vector partitioning loop operates follows.

Consider, for example, the scalar loop shown here:
for(i=0;i<N;i++)
    scalar_computation(i)

Assuming that the "scalar_computation" is vectorizable, then the vectorizable loop takes the following form:
for(i=0;i<N;i+=VL)
    vector_computation(i,min(i,i+VL−1)

In the example above, the "scalar_computation" has been converted to the "vector_computation" that executes multiple iterations of the "scalar_computation" in parallel (each set of iterations executed in parallel are referred to as a vector iteration). Here, the number of iterations executed in parallel (i.e., the size of the vector iteration) is fixed based on the size of the vector length "VL" associated with system hardware. The scalar iteration counter "i" is incremented by the vector length "VL−1" after each vector iteration.

In contrast, partial vectorization involves further, dynamically partitioning a single vector iteration into smaller parts (referred to as "chunks" and/or "subpartitions") that can be executed in parallel by introducing an inner loop referred to as a vector partitioning loop ("VPL"). The "VPL" may take the form:

```
for (i=0; i<N; i+=VL) {
    start=i;
    do { // This is the "VPL" loop
        divide = someRuntimeDependencyDetectionMechanism(some_input, ...); //
divide value is: start <= divide <= min(N, i+VL−1)
            vector(start, divide); // execute in parallel the elements from
position start to divide;
            start = divide + 1;
    } while(start < min(N, i+VL));
}
```

In this example the "VPL" is represented as a "do" loop and the variable "divide" represents a mechanism used to detect points in the loop at which iterations cannot be performed in parallel due to a dependence. In the pseudo code above, the function "someRuntimeDependencyDetectionMechanism(some_input, . . . )" is used to detect (at runtime) loop iterations that cannot be performed in parallel. For the example vectorization technique described below with respect to FIGS. 7 and 8, the dependence detection mechanism detects loop dependences caused by memory access conflicts.

In the example pseudo code above, the calculation of the divide value results in the identification of points (represented by "start . . . divide") that signify the contiguous positions of the vector sub-partition elements that can be executed in parallel. Thus, as described above, the vector partitioning loop: 1) divides (or partitions) a vector iteration into sub-partitions/chunks of vector elements that can be iterated in parallel because they do not depend on each other, 2) causes those vector elements to be executed in parallel, 3) updates the start position to equal the next sub-partition/chunk of vector elements to be executed in parallel, and 4) proceeds to execute the next chunk of vector elements in parallel by branching back to the "VPL." These operations are repeated until no sub-partitions remain. Note that an outer loop containing the "VPL" (inner loop) configures the loop to be performed a fixed number of iterations and then the "VPL" is executed a variable number of times based on the number of iterations in which a loop dependence is detected. Thus, the VPL processes a variable number of scalar iterations unlike traditionally vectorized loops in which a fixed number of scalar iterations or vector elements are processed. The number of iterations containing a loop dependence is detected by checking for loop iterations that are adversely affected by the outcome of other loop iterations. For example, a loop having multiple memory access instructions that may access a same memory location may result in a conflict between an access of the memory performed in one iteration and an access of the same memory location in another iteration. The example vectorization system of FIG. 1D identifies the iterations that are dependent on each other by checking the loop operation, during runtime, for memory access conflicts. In some examples, the system checks for memory access conflicts using hardware instructions referred to as memory checking instructions as described below.

In some examples, the example vectorization system 110D of FIG. 1D includes an example analyzeR115D in communication with the example code generatoR120D via a communication bus 122D. In some examples, the analyzeR115D includes an example first controlleR125D coupled via a communication bus 130D to an example graph generatoR135D, an example graph analyzeR140D, an example edge removeR145D, and an example conflict identifier 150D. In some examples, the code generatoR120D includes an example second controlleR160D coupled via a communication bus 165D to an example code converteR170D, an example loop partitioneR175D, and an example conflict checkeR180D. In some examples, the first controller 125B and the second controlleR160D can access a memory 190B as needed to store and/or retrieve information during operation.

The components of the example analyzeR115D perform operations to convert the loop into a vectorizable form and then supply the vectorizable code to the example code generator 120D. In some examples, the example analyzeR115D receives the program code representing the scalar loop to be vectorized from the example code supplieR111A (see FIG. 1A). To convert the loop to a vectorizable form, the example graph generatoR135D of the analyzeR115D generates a dependence graph representing the program loop to be vectorized and the example graph analyzer 140D uses the graph to identify and create a list of loop edges. The example edge removeR145D then marks the program loop as vectorizable. For each dependence edge "E" in the dependence graph, the example edge removeR145D uses conventional techniques to determine whether an edge "E" is part of a cycle (i.e., loop dependence). If an edge "E" under consideration is not part of a cycle, the edge removeR145D uses, for example, any of the other techniques disclosed herein, to process the edge in a manner that will permit vectorization of that edge by the code generatoR120D. The technique used is selected based on, for example, the type of edge/dependence to be processed.

If an edge "E" under consideration is part of a cycle and the edge "E" is a memory flow, anti or output dependence edge from a statement "A" to a statement "B" having a single direction (<), the example conflict identifieR150D identifies the statements "A" and "B" as being instructions/statements that may cause a conflict to occur in the program loop. In some examples, the conflict identifieR150D performs this operation by adding the statement "A" and the statement "B" to a set of conflict instructions "C." Next, the example edge removeR145D removes that edge "E" from the list of edges identified by the example analyzeR135C.

The same operations are performed for the other edges included in the list of edges identified by the example graph analyzer 140D (i.e., present in the dependence graph). The conflict identifieR150D then marks all of the program instructions that were in the cycle that was eliminated by removing any of the edges "E" with a notation "IN_VPL." If, instead, the dependence edge "E" under consideration cannot be eliminated/removed, the example edge removeR145D determines that the loop is not vectorizable. In some examples, the edge removeR145D performs this operation by marking the loop as non-vectorizable. Provided that the loop is vectorizable, (i.e., the dependence edges and associated cycles were successfully eliminated by the example edge removeR145D), the analyzeR115D provides the vectorizable code to the example code generatoR120D.

When the vectorizable code is received at the code generatoR120D, the example code converteR170D converts the scalar computer loop program instructions supplied by the example analyzeR115D to vector instructions by, for example: 1) replacing references to scalar variable(s) with references to vector variables, 2) replacing conditional statements in the scalar code to predicates "p," 3) converting statements that are executed conditionally to masked predicate operations, 4) replacing scalar iteration control variables with vector iteration control variables, etc.

Provided that the loop is vectorizable, (i.e., the edges associated with cycles were successfully eliminated from the corresponding dependence graph by the example edge remover 145D), and provided that the conflict instruction set "C" created by the example conflict identifier 150D is not empty, the example loop partitioneR175D partitions the loop and places the instructions that have been marked with the notation "IN_VPL" into the "VPL" into the partition.

In some examples, the example conflict checkeR180D then analyzes the vectorizable program code at runtime to identify loop iterations in which memory conflicts will occur. For example, the conflict checkeR180D uses an example conflict checking instruction to identify loop iterations that are dependent on other loop iterations due to, for example, a conflicting memory access. The output of the conflict checking instruction is used to control iteration of the partition. For example, if the conflict checking instruction indicates that a set of loop iterations 1, 2 and 3 can be performed without conflict but that iteration 4 conflicts with iteration 1, then the conflict checkeR180D will indicate that the next earliest conflict occurs at iteration 4. Thus, the loop partitioneR175D will cause the "VPL" to execute the first, second and third iterations in parallel. Further, if the conflict checking instructions indicates that the $4^{th}$ and $5^{th}$ iterations can be executed in parallel, but that $6^{th}$ iteration conflicts with $4^{th}$ iteration, then the loop partitioneR175 will cause the "VPL" to execute the $4^{th}$ and $5^{th}$ iterations in parallel, etc. In some examples, an output(s) of the conflict checking instructions is used as a predicate to control operation of the "VPL" thereby controlling the iterations to be executed by the "VPL" in parallel.

In some examples, the example conflict checking instruction takes the form "CheckConflict(MemoryAddress(B), MemoryAddress(A), pB, pA)", where "pA" is the predicate that controls the execution of the statement "A" and "pB" is the predicate that controls the execution of the statement "B." Here, the statement "A" and the statement "B" are both memory access instructions that may access a same memory location. The "CheckConflict(MemoryAddress(B), MemoryAddress(A), pB, pA" instruction checks the program loop for instances in which different iterations of a loop conflict due to memory accesses caused by the statement "A" and the statement "B." The conflict checkeR180D inserts, for each pair of instructions (A, B) contained in the conflict instruction set "C," a corresponding "CheckConflict(MemoryAddress(B), MemoryAddress(A), pB, pA)" instruction before the "VPL."

If there are more one set of conflicting memory access instructions (e.g., memory access instructions that may access a same memory location(s)), the example conflict checkeR180D inserts a set of conflict checking instructions where each conflict checking instruction in the set corresponds to one of the sets of memory access instructions that access a same memory location. The example conflict checker performs a logical OR operation on the results of all the "CheckConflict" instructions included in the set to dynamically determine the earliest next iteration conflict point and the output of the logical OR operation is used as a predicate to control execution of the "VPL".

In some examples, the example graph generatoR135D, the example graph analyzer 140D, the example edge removeR145D, and the example conflict identifieR150D operate under the control of the first example controlleR125D. Likewise, the example code converteR170D, the example loop partitioneR175D, and the example conflict checkeR180D operate under the control of the second controlleR160D.

Figure 7:
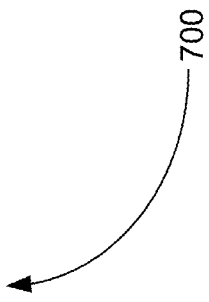
FIG. 7 illustrates example pseudo code representing an example scalar computer program having loop-carried cross iteration memory dependences.

An example computer program loop 700 illustrated by the pseudo code shown in FIG. 7 is described to provide one example of how the example vectorization system 110D of FIG. 1D can be used to vectorize loops containing cross-iteration dependences arising from memory access conflicts. The description of how the example loop 700 operates is followed by a description of how the example vectorization system 110D of FIG. 1D operates to vectorize the computer program loop 700.

The example computer program loop 700 begins when the number of loop iterations is defined to be controlled by an iteration counter "i." (See line 702). If a predicate "p," (e.g., (b[i]<FACTOR)) is TRUE (line 704), then a read statement "R" is executed (see line 706), followed by a write statement W (see line 708). In this example, the program loop has intra-iteration flow and memory dependences from the read instruction "R" to the write statement "W" on the scalar "t" and there is a memory flow-dependence (with direction <) from the write statement "W" to the read instruction "R." Thus, the dependence graph associated with the example computer program loop 700 has cycles that will prevent vectorization using conventional vectorization techniques, such as converting the scalar variables to vector variables without more.

The example vectorization system 110D of FIG. 1D begins vectorizing the example computer program 700 when the example graph generatoR135D generates a dependence graph representing the computer program loop 700. The example graph analyzeR140D then uses the graph to identify and create a list of loop dependences including the memory flow-dependence edge "F1" (with direction <) from the write statement "W" to the read instruction "R" (i.e., F1(W->R)) and the intra-iteration flow and memory dependences from the read statement "R" to the write statement "W" on the scalar variable "t" (i.e., A(R->W) and F2(R->W)).

The example edge removeR145D marks the program loop as vectorizable. In the example loop of FIG. 7, the edge F1 is a memory flow dependence edge having a single direction (<) and is part of a cycle, such that the example conflict identifieR150D identifies the write statement "W" and the read statement "R" as statements that may cause a memory access conflict to occur in the program loop and causes them to be added to the set of conflict instructions "C." Next, the example edge removeR145D removes the edge "F1" from the list of edges identified by the graph analyzeR140D. In addition, the example conflict identifieR150D marks the instructions that were in the cycle that was eliminated by removing the edge "F1" (e.g., the "W" and the "R" instructions) with the notation "IN_VPL" to indicate that they will be placed into the partitioned loop.

Now the example computer program loop 700 is vectorizable and supplied by the example analyzeR115D to the example code generatoR120D to generate the vectorized program code 800 of FIG. 8. To begin processing the vectorizable code, the example code converteR170D converts the scalar program instruction of the computer loop 700 supplied by the example analyzer 115D to vector instructions by, for example: 1) replacing references to scalar variable(s) with references to vector variables, 2) replacing conditional statements in the scalar code to predicate statements "p," 3) converting statements that are executed conditionally to masked predicate operations, 4) converting scalar loop iteration control variables to vector loop control iteration variables, etc.

The example loop partitioneR175D generates a vector partitioning loop "VPL" and places the instructions that have been marked with the notation "IN_VPL" by the example analyzeR115D into the "VPL." (See ll. 810-820). Here, the read statement "R" and the write statement "W" are placed in the "VPL". (See ll. 814-815). Then, the conflict checkeR180D inserts the "CheckConflict(b[i], i, p, p)" instruction before the "VPL" where the predicate "p" is equal to "(b[i]<FACTOR)." (See ll. 808-809). The result of the CheckConflict instruction is used to identify the next earliest instance of a memory access conflict and the next earliest conflict point is used to generate a masked predicate for the "VPL." (Note that, in this example, there is only one pair of instructions that may cause memory access conflicts to occur such that a logical OR operation need not be (and is not) included in the vectorized program code represented in FIG. 8.) In the example computer program loop 800 of FIG. 8, the "divide=getNextDependence (dependences, start)" instruction represents the masked predicate used to control the execution of the "VPL". Specifically, loop iterations from the range spanning "start" to "divide" are iterated in parallel (via the "VPL") until the next conflict point is reached, at which time the execution of the "VPL" returns to the "divide" instruction (ll. 812-813), and obtains information identifying the next chunk of iterations (i.e., the iterations between "start+1" and "divide") that can be performed in parallel, and then causes those loop iterations to be executed in parallel. The "VPL" is exited when the value of "i" reaches a maximum value. (See line 804).

Figure 1E:
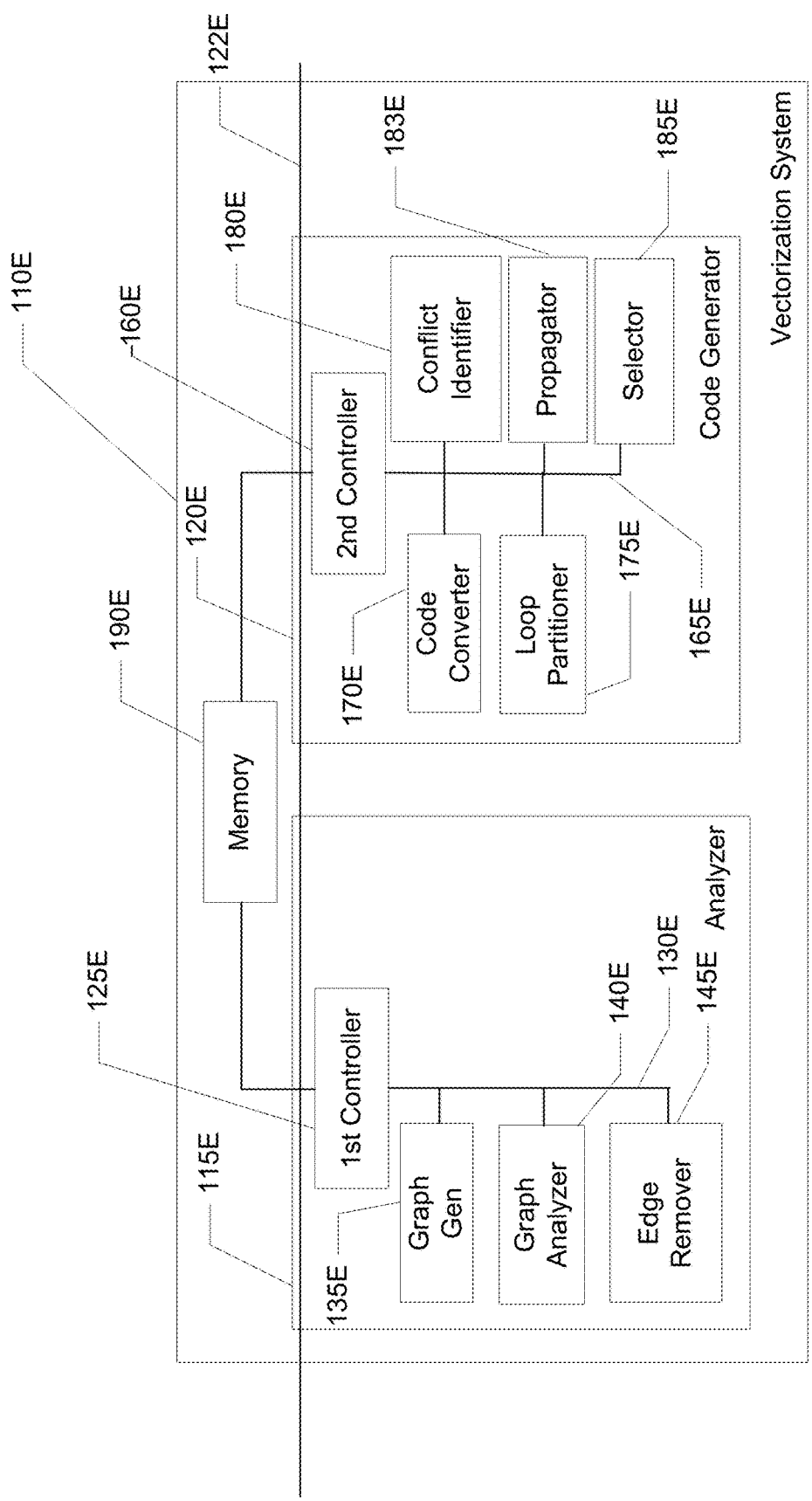
FIG. 1E illustrates a block diagram of an example vectorization system capable of vectorizing a scalar computer program loop having loop-carried dependences arising from conditionally executed statements.

Vectorization of Loops Having Cross Iteration Loop Dependences Arising from Conditionally Executed Statements FIG. 1E is a block diagram of an example vectorization system 110E configured to vectorize loops having loop-carried dependences from or to conditionally executed statements also referred to as dynamic cross-iteration dependences. Loop carried dependences from/to conditionally executed statements occur when a conditional statement executed in one iteration is executed unconditionally in a subsequently executed iteration or is guarded by a different condition in a subsequently executed loop iteration.

In some examples, the example vectorization system 110E includes an example analyzeR115E in communication with an example code generatoR120E via an example communication bus 122E. The example analyzeR120E includes an example first controlleR125E coupled via a communication bus 130E to an example graph generatoR135E, an example graph analyzeR140E, an example edge removeR145E and an example edge identifieR150E. In some examples, the code generatoR120E includes an example second controlleR160E coupled via a communication bus 165F to an example code converteR170E, an example loop partitioneR175E, an example conflict checkeR180E, an example propagatoR183E and an example selectoR185E. In some examples, the first controlleR125E and the second controlleR160E can access a memory 190E as needed to store and/or retrieve information during operation.

In some examples, the example analyzeR115E receives the program code representing the scalar loop to be vectorized from the example code supplieR111A (see FIG. 1A). The example graph generatoR135E of the analyzeR115E generates a dependence graph and the graph analyzeR140E uses the graph to identify and create a list of loop edges. The example edge removeR145E then determines whether any of the edges are flow dependent edges with a single direction (<) from a statement "A" to a statement "B" where at least one of the nodes "A" and/or "B" of the dependence graph is conditionally executed within the loop and removal of the edge will eliminate a cycle from the dependence graph. If the example edge removeR145E determines that an edge meeting these criteria is present in the loop, the example edge removeR145E removes the corresponding edge from the list of edges created by the graph analyzeR140E using the dependence graph and the example conflict identifieR150D identifies the instructions associated with the eliminated cycle as being conflicting instructions (e.g., places the instructions associated with the eliminated cycle into a set of instructions referred to as the "IN_VPL" set to be placed into a vector partition). The edge removeR145E continues to process the edges in the loop in the manner described until all edges have been processed. If all edges have been processed and no cycles remain in the loop, the vectorizable code is supplied to the example code generatoR120E for vectorization.

If an edge "E" being processed by the example edge removeR145E does not meet the criteria described above, the edge removeR145E attempts to use other edge removal techniques as applicable (including any of the techniques disclosed herein) to process the edge. If all such techniques have been unsuccessful and/or if, one or more cycles remain in the loop after all of the edges have been processed, the code is not vectorizable and the code vectorization system 110E ceases operating.

When the vectorizable code is supplied to the code generatoR160E, the example code converteR170E converts the scalar computer loop program instructions supplied by the example analyzeR115E to vector instructions by, for example: 1) replacing references to the scalar variable(s) with references to vector version(s) of the variable(s), 2) replacing conditional statements in the scalar code to predicate statements that convert the condition(s) contained in the scalar code to vector predicates "p," 3) converting statements that are executed conditionally to masked predicate operations, 4) replacing a scalar loop control variable "i" with a vector loop control variable, etc.

The example loop partitioneR175E generates a "VPL" containing all of the statements associated with the eliminated cycle (including the conditionally executed statements identified by the edge removeR145E) (e.g., the instructions "A" and "B" placed into IN_VPL.

The example conflict checkeR180E then identifies loops iterations in which conditionally executed statements cause a cross-iteration loop dependence. As described above, the conditionally executed statements are identified by the example conflict identifieR150E of the analyzeR115E and may include the conditionally executed statement "A" and the conditionally executed statement "B." The conditional conflict identifieR180E can use, for example, hardware instructions (e.g., conditional conflict identifying instructions) to identify the iterations that can be executed in parallel and the iterations that cannot be executed in parallel. In some examples, the conditional conflict identifying instructions take the form "ConditionalPairStop(pB,pA)" instruction where the execution of the statement "A" is controlled by a predicate "pA," and the execution of the statement "B" is controlled by a predicate "pB."

In some examples, the loop partitioneR175E places the conditional conflict identifying instruction (e.g., "ConditionalPairStop(pB,pA)") after the predicates "pB" and "pA" are defined. The "ConditionalPairStop(pB,pA)" instruction determines the actual dynamic cross-iteration dependences between conditionally executed statements "A" and "B" and, in some examples, is placed into the corresponding "VPL" (e.g., the "VPL" that operates on the conditional statements "A" and "B") before the instruction(s) to be partially vectorized (e.g., the instruction(s) conditionally controlled by the conditional statements "A" and "B"). The example partitioneR175E then uses the output generated by the conditional conflict identifying instruction to mask the conditionally executed statement(s) (e.g., statement "A" and/or statement "B").

In some examples, after the partitioneR175E has operated, the example propagator 183E causes the value of "r" contained in the vector "vr" from vector elements where the predicate "pA" is TRUE to subsequent elements where the predicate "pA" is FALSE provided that the statement "A" is conditionally executed and the removed edge "E" associated with the statement "A" is on a scalar variable (e.g., "r") (or an array variable that is not dependent on the loop induction variable, where a loop induction variable is a variable that is increased or decreased by a fixed amount on every iteration of the loop, or is a linear function of another induction variable). In addition, the example selectoR185E selects the last element of the vector "r" and broadcasts that element to the entire vector. In some examples, the propagatoR183 uses a propagation instruction to cause the propagation operation and the selectoR185E uses a "SelectLast" instruction to select the value to be used in the next vector iteration. Using the propagatoR183E and the selectoR185E causes the last value of "r" calculated in one vector iteration to be used to initialize the variable "r" in each loop iteration of the subsequently executed vector iteration.

In some examples, the example graph generatoR135E, the example graph analyzer 140E, the example edge removeR145E and the example conflict identifieR150E operate under the control of the first example controlleR125E. Likewise, in some examples, the example code converteR170E, the example loop partitioneR175E, the example conditional conflict identifieR180E, the example propagatoR183E and the example selectoR185E operate under the control of the second controlleR160E.

The operation of the example vectorization system 110E of the FIG. 1E can be further understood with reference to the example computer program loop 900 illustrated using the pseudo code shown in FIG. 9. The computer program loop 900 contains loop dependences that arise from conditionally executed statements. A description of the operation of the loop 900 is followed by a description of how the example vectorization system 110E of FIG. 1E vectorizes the loop 900.

In the example loop 900 of FIG. 9, a counter "i" is defined to control the number of times the loop is iterated. (See line 902). If a predicate is TRUE (e.g., (a[i]<FACTOR)) (see line 906), a statement "A" (see line 910) is executed. As illustrated in FIG. 9, the statement "A" includes a read "R" and a write "W" of the variable "r" (e.g., "r=a[i+r]"). As a result, when executed, one iteration of the loop may write to the variable "r" if "a[i]<FACTOR" holds true for that iteration and a different, subsequently executed iteration of the loop may read that value of "r" (i.e., the value of "r" as defined in the first iteration) if the condition "a[i]<FACTOR" holds true. Thus, the value of "r" as read in one iteration depends on the value of "r" as defined (e.g., written) in another iteration thereby causing a cross-iteration dependence such that at least some of the iterations cannot be executed in parallel. In the example loop 900 the cross-iteration dependence is also a self flow dependence because the conditionally executed statement "A" is dependent on itself (e.g., in some iterations, the execution of statement "A" conflicts with the execution of the statement "A" in other iterations). Hence, the cycle caused by the loop-carried cross-iteration self-flow dependence in the corresponding dependence graph prevents the vectorization of this (and similar) loops using conventional vectorization techniques (e.g., converting the scalar variables to vector variables without more).

Figure 10:
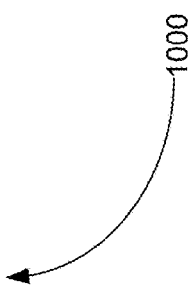
FIG. 10 illustrates example pseudo code representing an example vectorized version of the example scalar computer program loop of FIG. 9 created using the example vectorization system of FIG. 1E.

In some examples, the vectorization system 110E operates to vectorize the scalar computer program loop 900 of FIG. 9 to thereby create the vectorized loop 1000 shown in FIG. 10. As described above, the example analyzeR115E process the edges of the scalar computer program loop 900 to enable vectorization of the loop and then supplies the vectorizable loop to the example vector code generator for vectorization.

For example, the example graph generatoR135E creates the dependence graph and the graph analyzeR140E uses the graph to identify and creates a list of the loop edges including: 1) a cross-iteration (<) flow dependence edge "F" (W->W)" from a statement "A" to the statement "A" and 2) an intra and cross-iteration (<=) anti-dependence edge "A (R->W)" from the statement "A" to the statement "A." Here, the edge "A(R->W)" is a self anti-dependence and can, therefore, be ignored because vector operations, by default, read all elements of their operands before these elements are written such that the code can be vectorized regardless of the presence of such a dependence. The example edge removeR145E then removes the edge "F" from the list of edges identified by the graph analyzeR140E. The example conflict identifieR150E also identifies the instruction "A" to the code generator as an instruction to be added to a "VPL." The example analyzeR115E then supplies the vectorizable code to the example code generatoR120E.

The example code converteR170E converts the conditional "if" statement (see line 906 of FIG. 9) into a predicate statement "p" (see line 1008) and converts the scalar variable "r" into a vector, "vector(r)." (See line 1008). The code converteR170F also converts the scalar iteration control variable "i" into a vector iteration control variable. (See lines 1002 and 1016). The example partitioneR175E creates a "VPL" (see line 1006) and places the conditionally executed statement "A" into the VPL. (See line 1012). The example partitioneR175E also places the predicate "p" used to control the execution of the statement A in the scalar loop into the vector loop 1000 (See line 1008). The example conditional conflict identifieR180E then generates a predicate (i.e., "divide") using, for example, the "ConditionalPairStop (p,p)" instruction (see line 1010) and the partitioner 175 uses the predicate to control the number of loop iterations to be executed in parallel in each vector iteration. (See lines 1012 and 1013).

In some examples, the example propagatoR183E uses a horizontal propagation instruction to cause the vector elements of the conditionally defined vector "r" to be propagated to other vector elements based on the predicate "p" and the example selectoR185E inserts a "SelectLast" instruction (see line 1014) near the bottom of the loop to select and broadcast the last value of "r" calculated in the current vector iteration to all elements of the vector, "vr," used in the subsequent vector iteration. The example propagatoR183E and selectoR185E performs these operation when, for example, the variable "r" defined in the statement "A" is a scalar variable.

Note that, in the example loop 900, the statement "A" is dependent on itself. Thus, instead of using a conditional checking instruction of the form "ConditionalPairStop(pA, pB)" to identify conflicting instructions, the conflict checkeR180E uses a conditional checking instruction of the form "ConditionalPairStop(p,p) (see line 1010) where "p" is the predicate controlling execution of the statement "A." (See line 906).

Figure 1F:
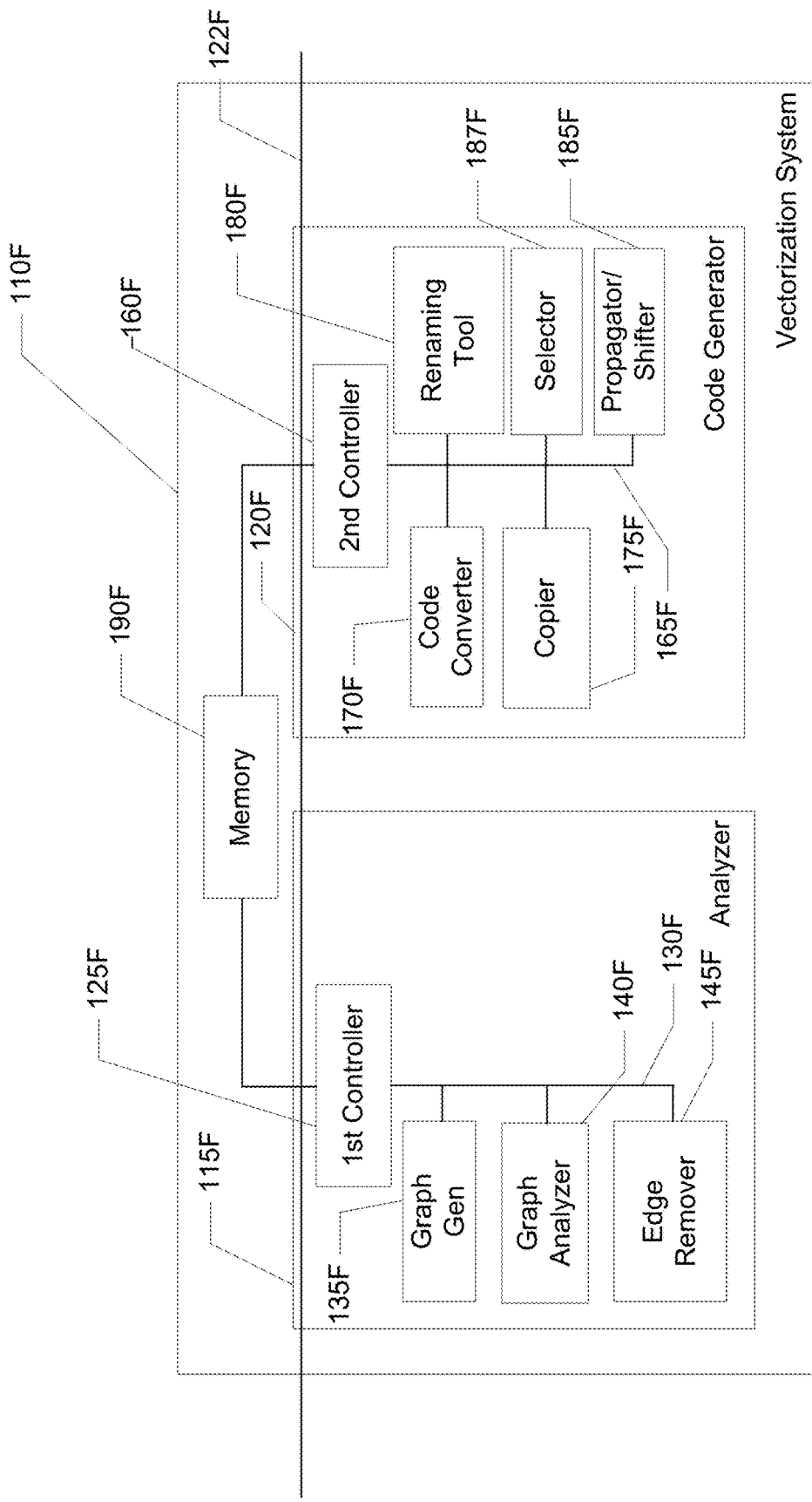
FIG. 1F illustrates a block diagram of an example vectorization system capable of vectorizing a scalar computer program loop having loop-carried dependences arising from scalar references.

Vectorization of a Loop Having Intra-Iteration Anti-Dependences Arising from Scalar References FIG. 1F is a block diagram of an example vectorization system 110F configured to vectorize loops containing intra-iteration anti-dependences arising from scalar references. As described above, an intra-iteration anti-dependence is a dependence between two instructions that operate within a same iteration where a first of the instructions is dependent on a second instruction and the first instruction lexically precedes the second instruction. For example, a loop having a read statement of a scalar variable lexically followed by a write statement of the same scalar variable has an intra-iteration anti-dependence from the read statement and the write statement because the early executed read statement is dependent on the later executed write statement. To preserve loop integrity, the computer program has to be vectorized in a manner that causes the write standard to execute before the read statement. In some examples, the vectorization system 110F includes an example analyzeR115F in communication with an example code generatoR120F via a communication bus 122F. In some examples, the example analyzeR115F includes a first example controlleR125F coupled via a communication bus 130F to an example graph generatoR135F, an example graph analyzeR140F and an example edge removeR145F. In some examples, the example code generatoR120F includes an example second controlleR160F coupled via a communication bus 165F to an example code converteR170F, an example instruction copieR175F, an example renaming tool 180F, an example propagatoR185F, and an example selectoR187F. In some examples the first controlleR125F and the second controlleR160F accesses a memory 190F as needed to store and/or retrieve information during operation.

The example analyzeR115F receives scalar computer program code representing a scalar loop to be vectorized from the example code supplieR111A (see FIG. 1A). The example graph generatoR135F of the analyzeR115F creates a dependence graph of the scalar loop and the example graph analyzeR140F uses the graph to identify and creates of list of e edges associated with the loop dependences. In some examples, the edge removeR145F creates a set, referred to as "E," that is later populated with edges from the dependence graph/list of edges created by the example graph analyzeR140F. When processing, for example, a loop having flow dependences on a scalar variable "r" from a write statement (e.g., "W") to one or more read statements (e.g., "R1, "R2," "R3" . . . RN"), and in which the loop also has intra-iteration anti-dependences on the variable "r" from the read statements "R1, "R2," "R3" . . . RN" to the write statement "W," the edge remover 145F places all of the intra-iteration anti-dependence loop edges having the write statement "W" as a sink node into the set "E." The edge removeR145F also places all of the source nodes (e.g., "R1," "R2," . . . , "RN") of the edges contained in the set "E" into a set of nodes/instructions referred to as "S".

The example edge removeR145F determines whether the loop being processed contains any loop-carried flow-dependence edges from the write statement "W" to a first read statement "R1." If no such dependence edges exist, the edge removeR145F removes the first read statement "R1" from the set of nodes "S" and also removes the corresponding edge from "R1" to "W" from the set of edges "E." The edge removeR145F repeats these operations for each of the remaining source nodes/instructions (e.g., "R2," . . . , "RN") contained in the set of source nodes "S."

The example edge removeR145F then determines whether there is a dependence path from any of the source nodes remaining in the set of source nodes "S" to the write statement "W" that does not pass through an edge contained in the set "E." If so, the edge removeR145F attempts to process in the edge in a manner that will permit vectorization using any other technique (including any of the techniques described herein). If none of the edges could be successfully eliminated, then one or more cycles remain in the loop such that the loop is not vectorizable and the vectorization system 110F ceases operating. The example edge removeR145F repeats these operations for all source nodes/instructions remaining in the set of source nodes/instructions "S."

Provided that the loop is vectorizable (e.g., at least one of the edges could be successfully eliminated on each of the identified dependence paths), the example edge removeR145F determines whether any edges remain in the set of edges "E." If so, the example edge removeR145F creates a list identifying each remaining edge, "E," a corresponding scalar variable "r," a corresponding write statement "W," and a corresponding read statement "R." The example edge removeR145F supplies the list to the example code generatoR120F for usage in vectorizing the scalar computer program code as described below.

The example copieR175F of the code generatoR120F creates a copy of the write statement "W" referred to as "$W_{copy}$" and places or hoists "$W_{copy}$" and the dependence predecessors of "$W_{copy}$" above the "R1," "R2," "R3," . . . "RN" statements. A dependence predecessor of "$W_{copy}$" is a statement that outputs a value that is used by the statement "$W_{copy}$." For example, a predicate "p" used to conditionally control the execution of "W" is a dependence predicate of the statement "$W_{copy}$," and is also hoisted above the statements "R1," "R2," "R3" . . . "RN." As used herein, the term "hoist" refers to the action of selecting instructions/statements and moving them to or placing them at a different location relative to other loop instructions/statements. Creating a copy of "W" and hoisting the copy of "W" (i.e., "$W_{copy}$") above the read instructions "R1," "R2," "R3" . . . "RN" removes the anti-dependence between "R" and "W."

The example renaming tool 180F renames the result of "$W_{copy}$" (i.e., the loop variable "r") to "$r_{copy}$" and replaces the references to "r" in "R1," "R2," "R3" . . . "RN" with references to "$r_{copy}$." The example propagatoR185F then causes the vector values of "$r_{copy}$" to be propagated based on the predicate that controls execution of "$W_{copy}$." In some examples, the propagatoR185F propagates the vector values of "$r_{copy}$" by inserting a propagate/shift instruction (e.g., a "PropagateShift" instruction). In some examples, the "PropagateShift" instruction takes the form "v2=PropagateShift(s,v1,p)" and shifts the element of the vector "v1" right by one position when the corresponding element of the predicate vector "p" is TRUE and propagates the element value that was shifted in when the corresponding element of the predicate vector "p" is false. The scalar "s" is shifted into the first element of the resulting vector. By way of example, for vector "v1" and "v2" each containing eight elements, where s=0, v1={1, 2, 3, 4, 5, 6, 7, 8}, and p={T, F, T, T, F, F, F, T}, the vector "v2" produced using the "PropagateShift" instruction includes the elements {0, 1, 1, 3, 4, 4, 4, 4}. Thus, to effect propagation and shift of "$r_{copy}$," the propagatoR185F inserts the instruction "$r_{copy}$=PropagateShift (lr, $r_{copy}$, p)" after "$W_{copy}$" where "p" is the predicate mask used to perform the propagate shift operations.

Replacing references to the variable "r" with "$r_{copy}$" and propagating and shifting the elements of "$r_{copy}$" in the manner described ensures that the corresponding read statements of the vector loop read the value of "r" defined in the previous loop iteration to thereby compensate for the anti-dependence existing between each read instruction and the write instruction.

In addition, the example selectoR187F selects the last element (as determined by the predicate vector "p") of the vector "r" in the current iteration and causes the selected element to be used as the value "s" to be "shifted in" to the vector "v1" when using the "PropagateShift" instruction. In some examples, the example selectoR187F selects the last element by placing the instruction "lr=SelectLastElement (r,p)" after the write statement "W." In some examples, the selectoR187F also initializes the value of "r" at the start of the loop (e.g., sets "lr=r").

In some examples, the example graph generatoR135F, the example graph analyzer 140F and the example edge removeR145F operate under the control of the first example controller 125F. Likewise, in some examples, the example instruction copieR175F, the example renaming tool 170F, the example propagatoR185F, and the example selectoR187F operate under the control of the second controlleR160F.

Figure 11:
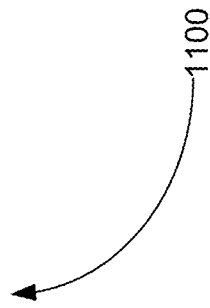
FIG. 11 illustrates example pseudo code representing an example scalar computer program having loop-carried dependences arising from scalar references.

The operation of the example vectorization system 110F of FIG. 1F can be further understood with reference to an example computer program loop 1100 illustrated using the pseudo-code shown in FIG. 11. The computer program loop 1100 contains intra-iteration anti-dependences arising from scalar references within the loop 1100. A description of the operation of the loop 1100 is followed by a description of how the example vectorization system 110F operates to vectorize the loop 1100.

The example computer program loop 1100 of FIG. 11 begins by setting a variable "last" equal to 10 (see line 1102) and then entering a loop that iterates under control of a variable "i." (See line 1104) Within the loop, a variable "j" is set equal to a variable "a[i]." (See line 1106). Next, a first read operation, "R1," of the variable "last" is performed when determining whether a first predicate p1 (e.g., "(j<last) ") holds TRUE. (See line 1108). A second read operation, "R2," of the variable "last" is executed when the value of a variable "b[i]" is set equal to the value of the variable "last" based on the predicate "p1". (See line 1110). Next, a second predicate "p2" is defined (e.g., "(j<0)") to control execution of a write operation, "W." (See line 1114). Depending on whether the second predicate "p2" holds TRUE, the write operation "W" is performed. (See line 1116). The value of "last" is then returned. (See line 1122). Thus, the values of the scalar variable "last" that are read at "R1" and "R2" in a current loop iteration are dependent on a value of the scalar variable "last" computed at the write statement "W" in the previous loop iteration thereby creating an intra-iteration anti-dependence on the scalar variable "last."

Figure 12:
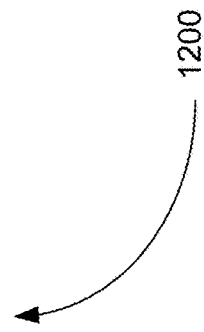
FIG. 12 illustrates example pseudo code representing an example vectorized version of the computer program loop of FIG. 11 created using the example vectorization system of FIG. 1F.

The computer program loop 1100 of FIG. 11 is illustrated as a vector loop 1200 using the pseudo code shown in FIG. 12. When processing the loop 1100 of FIG. 11, the example graph generatoR135F creates a dependence graph for the loop 1100 and the example graph analyzer 140F uses the graph to determine and a list of loop edges including the intra-iteration anti-dependence edges referred to as "A1" and "A2" on the variable "last" from "R1" to "W" and from "R2" to "W." In this example computer program loop 1100, the read statements "R1" and "R2" lexically precede "W." The list of edges created by the graph analyzeR140F also includes loop-carried lexically backward flow-dependences referred to as "F1" and "F2," from "W" to "R1" and from "W" to "R2," respectively. Together, "F1," "F2," "A1" and "A2" create cycles in the dependence graph that cannot be vectorized using conventional vectorization techniques.

The example edge removeR145F of the analyzeR115F creates the set of edges, "E," and populates the set with the edges "A1" and "A2" and places the source nodes "R1" and "R2," into the set of nodes "S." The edge removeR145F then uses a list of edges identified by the example graph analyzeR140F to determine whether the computer program loop 1100 contains any loop-carried flow-dependence edges from the write statement "W" to a first read statement "R1." In this case loop-carried flow dependence edges "F1" and "F2" exist such that the example edge removeR145F proceeds to determine whether there is a dependence path from either of the source nodes remaining in the set "S" (e.g., "R1" and "R2") to the write statement "W" that does not pass through an edge contained in the set "E." In this case, no such dependence path exists such that the example edge removeR145F creates the list identifying each edge in the set of edges "E" (e.g., "A1" and "A2"), identifies information corresponding to each edge "E" ((e.g., {"last," "W," "R1," "A1"} and {last, "W," "R1," and "A2"}), and then removes the edges from the dependence graph/removes the edges from the list of edge created by the graph analyzeR140F. The computer program loop 1100 is now vectorizable and the example edge removeR145F supplies the vectorizable loop 1100 and the list of edges to the example code generatoR120F. In some examples, the list of edges and corresponding information is supplied to the code generatoR120F in a stack.

The code generatoR120F then operates on the now-vectorizable code to create the vectorized code 1200 of FIG. 12. In some examples, the code converteR170F converts the scalar variables in the scalar loop to the vector variables (e.g., the scalar variable "j" is converted to a vector "vj," "a[i]" is converted to a vector, "b[i]" is converted to a vector, "last" is converted to a vector "vlast," and the loop iteration control variable "i" is converted to a vector iteration control variable). (See lines 1204, 1206, 1216 and 1218). Additionally, the code converteR170F converts the conditional statements to predicates, "p1" and "p2". (See lines 1208 and 1214). In the scalar computer program loop 1100 of FIG. 11, prior to entering the loop, the scalar variable "last" was initialized to an integer value of "10" (see line 1202). Thus, in the vector computer program loop 1200, the scalar variable is initialized to an integer value of "10" (see line 1202) because computer program instructions outside of the loop are not converted by the code converteR170F of the example code generator.

The example copieR175F then inserts a copy "$W_{copy}$" of the write statement "W" above the read instructions "R1" and "R2." (See line 1210). In this example, the write statement "W" is masked by the predicate vector "p2." Here, the copy of the write statement "$W_{copy}$" is constructed by setting the vector variable "vlast" equal to the vector variable "vj," where the vector variable "vlast" has been renamed by the example renaming tool 180F to "vlast1." (See line 1210). Likewise, the renaming tool 180F renames the vector "vlast" read by "R1" and "R2" in the scalar loop 1100 to the vector "vlast1" in the vector loop 1200 causing the read statements "R1" and "R2" (see lines 1214, 1216) to read the values of the renamed vector "vlast1" computed by the "$W_{copy}$" instruction. Further, by placing the "$W_{copy}$" instruction above the read statements "R1" and "R2," the vector values of "vlast1" that are read by the read statements "R1" and "R2" are defined in the current loop iteration before the read statements thereby eliminating the anti-dependence between the write statement "W1" and the read statements "R1" and "R2." After the "$W_{copy}$" instruction, the example propagatoR185F inserts a "PropagateShift" instruction to shift or propagate (in the manner described above) the elements of the vector "vlast1" computed by the copy of the write statement "$W_{copy}$" based on the value of the predicate "p2." (See line 1212). Shifting/propagating the vector values of "vlast1" in this manner causes the value of "vlast1" calculated for each current iteration (i.e., residing in each element/position in the vector "vlast1") to be equal to the value of "vlast" calculated in the preceding iteration. As a result, the vector values read by the read statements "R1" and "R2" are the vector values calculated for "vj" in the preceding iteration.

Finally, the example selectoR187F inserts a "SelectLastElement" operation after the write statement "W" (see line 1220) to select the last element of the vector "vlast" depending on the predicate "p2" and to cause the last element of the vector "vlast" to be used by the next iteration as the scalar value to be shifted into the first element of "vlast 1" when using the "PropagateShiftInstruction." (See line 1212). In addition, the selector initializes the value of "last" before the loop. (See line 1202).

While an example manner of implementing the example vectorization system 110A of FIG. 1A is illustrated in FIGS. 1A, 1B, 1C, 1D, 1E, 1F, one or more of the elements, processes and/or devices illustrated in FIGS. 1A, 1B, 1C, 1D, 1E, 1F may be combined, divided, re-arranged, omitted, eliminated and/or implemented in any other way. Further, the example vectorization systems 110B, 110C, 110D, 110E, 110F, the example code supplieR111A, the example code executoR112A, the example analyzeR115A, 115B, 115C, 115D, 115E 115F, the example code generatoR120A, 120B, 120C, 120D, 120E, 120F, the example communication bus 122B, 122C, 122D, 122E, 122F, 130B, 130C, 130D, 130E, 130F, 165B, 165C, 165D, 165E, the example first controlleR125B, 125C, 125D, 125E, 125F, the example second controlleR160B, 160C, 160D, 160E, 160F, the example graph generatoR135B 135C, 135D, 135E, 135F, the example graph analyzeR140B, 140C, 140D, 140E, 140F, the example edge removeR150B, 152C, 145D, 145E, 145F, the example code converteR170B, 170C, 170D, 170E, 170F, the example predicate set generatoR145B, the example dependence checkeR155B, the example recurrence instruction identifieR145C, the example partial vectorization tool 155C, the example edge identifieR150C, the example conflict identifieR150D, 150E, the example propagatoR175B, 183E, 185F, the example selector/broadcasteR175C, the example selectoR185E, 187F, the example recurrence addeR185C, the example renaming tool 180C, 180F, the example loop partitioneR175D, 175E, the example conflict checkeR180D, 180E, and/or, the example copieR175F and/or more generally, the example vectorization system 110A of FIG. 1A may be implemented by hardware, software, firmware and/or any combination of hardware, software and/or firmware. Thus, for example, any of the example vectorization systems 110B, 110C, 110D, 110E, 110F, the example code supplieR111A, the example code executoR112A, the example analyzeR115A, 115B, 115C, 115D, 115E 115F, the example code generatoR120A, 120B, 120C, 120D, 120E, 120F, the example communication bus 122B, 122C, 122D, 122E, 122F, 130B, 130C, 130D, 130E, 130F, 165B, 165C, 165D, 165E, the example first controlleR125B, 125C, 125D, 125E, 125F, the example second controlleR160B, 160C, 160D, 160E, 160F, the example graph generatoR135B 135C, 135D, 135E, 135F, the example graph analyzeR140B, 140C, 140D, 140E, 140F, the example edge removeR150B, 152C, 145D, 145E, 145F, the example code converteR170B, 170C, 170D, 170E, 170F, the example predicate set generatoR145B, the example dependence checkeR155B, the example recurrence instruction identifieR145C, the example partial vectorization tool 155C, the example edge identifieR150C, the example conflict identifieR150D, 150E, the example propagatoR175B, 183E, 185F, the example selector/broadcasteR175C, the example selectoR185E, 187F, the example recurrence addeR185C, the example renaming tool 180C, 180F, the example loop partitioneR175D, 175E, the example conflict checkeR180D, 180E, and/or the example copieR175F and/or, more generally, the example vectorization system 110A could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example vectorization systems 110A, 110B, 110C, 110D, 110E, 110F, the example code supplieR111A, the example code executoR112A, the example analyzeR115A, 115B, 115C, 115D, 115E 115F, the example code generatoR120A, 120B, 120C, 120D, 120E, 120F, the example communication bus 122B, 122C, 122D, 122E, 122F, 130B, 130C, 130D, 130E, 130F, 165B, 165C, 165D, 165E, the example first controlleR125B, 125C, 125D, 125E, 125F, the example second controlleR160B, 160C, 160D, 160E, 160F, the example graph generator 135B 135C, 135D, 135E, 135F, the example graph analyzeR140B, 140C, 140D, 140E, 140F, the example edge removeR150B, 152C, 145D, 145E, 145F, the example code converteR170B, 170C, 170D, 170E, 170F, the example predicate set generatoR145B, the example dependence checker 155B, the example recurrence instruction identifieR145C, the example partial vectorization tool 155C, the example edge identifieR150C, the example conflict identifieR150D, 150E, the example propagatoR175B, 183E, 185F, the example selector/broadcasteR175C, the example selectoR185E, 187F, the example recurrence addeR185C, the example renaming tool 180C, 180F, the example loop partitioneR175D, 175E, the example conflict checkeR180D, 180E, and/or the example copieR175F are hereby expressly defined to include a tangible computer readable storage device or storage disk such as a memory, a digital versatile disk (DVD), a compact disk (CD), a Blu-ray disk, etc. storing the software and/or firmware. Further still, the example vectorization system 110A of FIG. 1A, may include one or more elements, processes and/or devices in addition to, or instead of, those illustrated in FIGS. 1A, 1B, 1C, 1D, 1E and/oR1F and/or may include more than one of any or all of the illustrated elements, processes and devices.

Flowcharts and pseudo code representative of example machine readable instructions for implementing the vectorization systems 110A, 110B, 110C, 110D, 110E and 110F of FIGS. 1A, 1B, 1C, 1D, 1E and 1F are shown in FIGS. 13, 14A-14B, 15A-15C, 16A-16C, 17A-17B, 18A-18B, 19A-19B, 20A-20B, 21A-21B, and/oR22A-22B. In this example, the machine readable instructions comprise a program for execution by a processor such as the processoR2312 shown in the example processor platform 2300 discussed below in connection with FIG. 23. The program may be embodied in software stored on a tangible computer readable storage medium such as a CD-ROM, a floppy disk, a hard drive, a digital versatile disk (DVD), a Blu-ray disk, or a memory associated with the processoR2312, but the entire program and/or parts thereof could alternatively be executed by a device other than the processoR2312 and/or embodied in firmware or dedicated hardware. Further, although the example program is described with reference to the flowchart and pseudo code illustrated in FIGS. 13, 14A-14B, 15A-15C, 16A-16C, 17A-17B, 18A-18B, 19A-19B, 20A-20B, 21A-21B, and 22A-22B, many other methods of implementing the example vectorization systems 110A, 110B, 110C, 110D, 110E and 110F may alternatively be used. For example, the order of execution of the blocks and/or lines of pseudo code may be changed, and/or some of the blocks described may be changed, eliminated, or combined.

As mentioned above, the example processes of FIGS. 13, 14A-14B, 15A-15C, 16A-16C, 17A-17B, 18A-18B, 19A-19B, 20A-20B, 21A-21B, and 22A-22B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 13, 14A-14B, 15A-15C, 16A-16C, 17A-17B, 18A-18B, 19A-19B, 20A-20B, 21A-21B, and 22A-22B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 13:
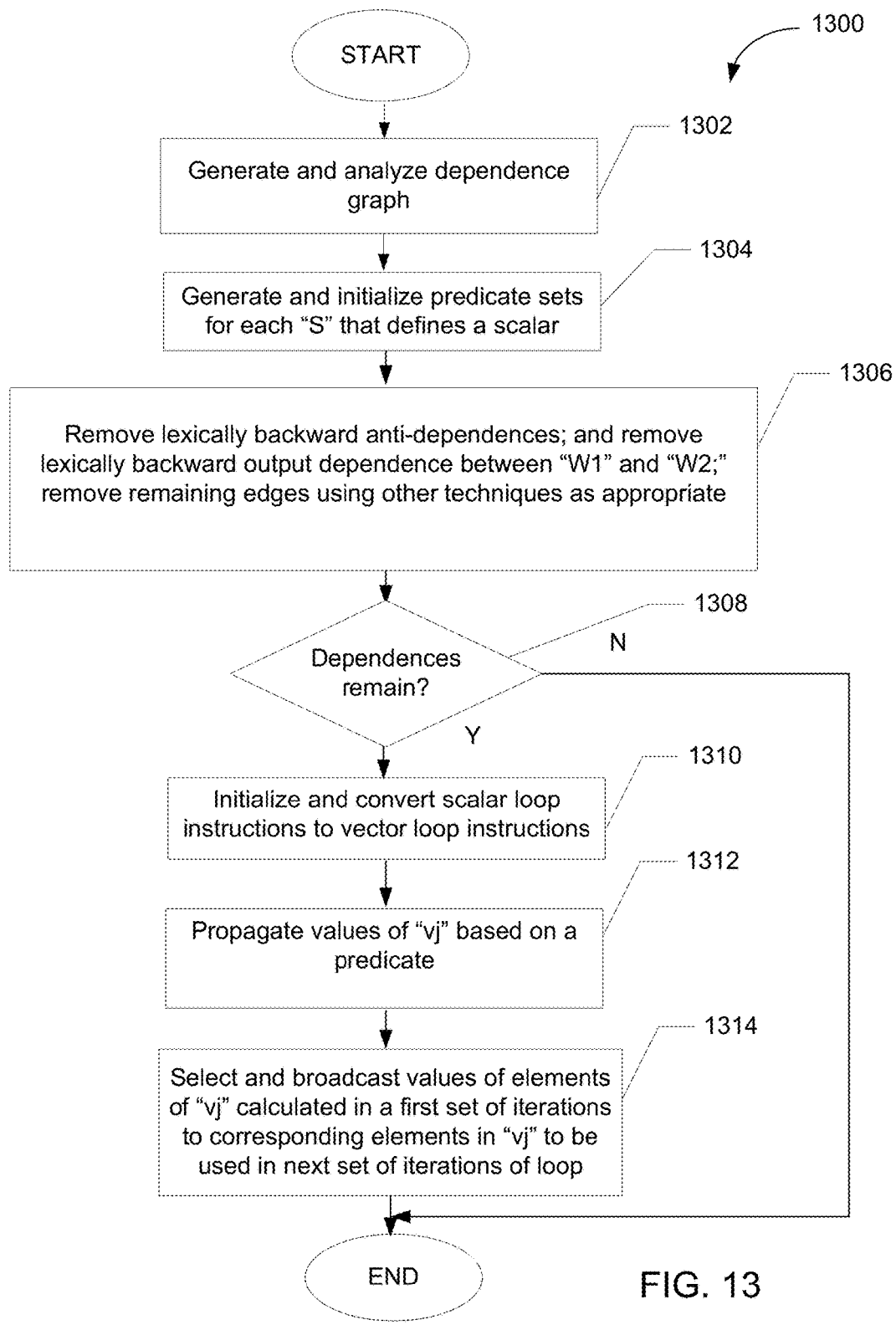
FIG. 13 illustrates an example flowchart representing example machine readable instructions executed by the example vectorization system of FIG. 1B to vectorize a scalar computer program loop having lexically backward loop-carried dependences.
Figure 14B:
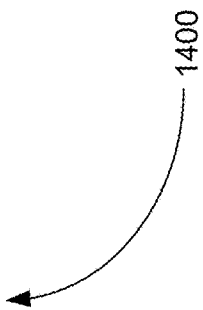

Example machine readable instructions 1300 & 1400 and that may be executed to implement the example vectorization system 110B of FIG. 1B are represented by the flowcharts 1300 illustrated in FIG. 13 and by the pseudo code 1400 illustrated in FIGS. 14A and 14B. The example machine readable instructions 1300 and 1400 may be executed at intervals (e.g., predetermined intervals), based on an occurrence of an event (e.g., a predetermined event), etc., or any combination thereof. In some examples, the instructions executed by the example analyzer 115B of FIG. 1B and the example code generatoR120B of FIG. 1B are designed to enable loop vectorization by processing the cycle-causing loop-carried anti and output dependence edges of the loop and then compensating for the processed edges by inserting horizontal propagation instructions for each instruction "S" (defined below) associated with one of the cycle-causing dependences.

The example machine readable instructions 1300 and 1400 of FIGS. 13 and 14A-14B begin by causing the dependence graph generatoR135B of FIG. 1B to generate the dependence graph, and the graph analyzeR140B of FIG. 1B analyzes the graph to identify and create a list of loop edges. (See block 1302 of FIG. 13). In some examples, the graph analyzeR140B of FIG. 1B identifies edges arising from a conditionally defined scalar variable. Provided that any such dependences edges are present and have been identified by the graph analyzeR140B of FIG. 1B, the predicate set generatoR145B associates a set of predicates with each instruction "S" in the computer program loop that defines a scalar "J." (See block 1304 of FIG. 13; lines 1406-1412 of FIG. 14A). In some examples, the sets of predicates are defined as "PredDefSet(S, J)" and "PredUseSet(S, J)" and are initialized by setting "PredDefSet(S, J)" equal to "predicate(S)," where the "predicate(S)" is the predicate that controls execution of the corresponding instruction "S." Additionally, the sets "PredUseSet(S,J)" are initialized as empty sets. (See block 1304 of FIG. 13 and lines 1406-1412 of FIG. 14A).

Next, the example edge removeR150B of FIG. 1B removes the edges associated with the instruction "S" from the list of edges identified by the example graph analyzeR130B of FIG. 1B. (See block 1306 of FIG. 13; lines 1418-1444 of FIG. 14A). In some examples, the loop to be vectorized includes a write statement "W1" that conditionally writes to a scalar variable "J" based on a first predicate "p1" and a write statement "W2" that conditionally writes to the scalar variable "J" based on a second variable "p2" and further includes a read statement "R" that is executed based on both "p1" and "p2."

For example scalar loops of this type, the edge removeR150B of FIG. 1B operates to remove each loop-carried lexically backward dependence edge that is part of a cycle and that is anti-dependent on a scalar (e.g., for each write statement "W" that is a sink of an edge "E" and for each read instruction "R" that is a source of the edge "E)" from the list dependence edges identified by the graph analyzeR140B. The edge removeR150B of FIG. 1B then adds the predicate "pR" that controls the statement "R" to the set "PredUseSet(W,J)." (See block 1306 of FIG. 13; lines 1420-1430 of FIG. 14A). The edge removeR150B of FIG. 1B also removes, from the list of edges created by the graph analyzeR140B of FIG. 1B, each lexically backward dependence edge "E" that is part of a cycle and that is output dependent on the scalar "J" (instead of being anti-dependent on the scalar), (e.g., the write statement "W1" is the sink of the edge "E" and the write statement "W2" is the source of the Edge "E)." (See block 1306 of FIG. 13; lines 1432-1434 of FIG. 14A). The edge removeR150 of FIG. 1B then adds the predicate "pW1" that controls execution of "pW1" to the set "PredDefSet(W2,J")  "pW1." (See block 1306 of FIG. 13; line 1436 of FIG. 14A). In some examples, the edge removeR150B of FIG. 1B first determines whether the scalar loop being processed includes and loop-carried lexically backward dependences and output dependence before the performing the described operations. (See lines 1424, 1426, 1432 of FIG. 14A.)

If the edge "E" is not part of a cycle or is part of a cycle but is not a loop-carried lexically backward edge, the example edge removeR150B of FIG. 1B attempts to apply another technique to process the dependence edge "E." (See block 1306 of FIG. 13; lines 1442-1444 of FIG. 14A).

Next, the example dependence checkeR155B of FIG. 1B determines whether the edge processing operations performed by the edge removeR150B of FIG. 1B have caused all edges associated with a cycle to be eliminated from the loop 200 of FIG. 2 (e.g., to be eliminated from the list of edges created by the graph analyzeR140B). (See block 1308 of FIG. 13; line 1410 of FIG. 14A). If all such dependences edges have been removed, the example code generatoR120B operates to create a vectorized version of the loop to be vectorized. (See block 1310 of FIG. 13; line 1452 of FIG. 14B). In some examples, the vector code generatoR120B of FIG. 1B begins operating when the code converteR170B converts the scalar loop control variable (e.g., "i") to a vector loop control variable and converts the statements in the scalar loop to vectorized statements by, for example, replacing the conditional statements with predicates, "p" and converting conditionally executed statements to masked vector operations, etc. In addition, the code converter replaces references to the scalar "j" with references to a vector of the variable "j" (e.g., "vj"). (See block 1310 of FIG. 13; line 1452 of FIG. 14B). If all edges associated with a cycle have not been eliminated, the vectorization system 110B of FIG. 1B stops operating.

The example propagatoR175B of FIG. 1B propagates the elements of the vector "vj" based on a predicate "p" by, for example, inserting a "PropagatePostTrue" after each instruction "S" that defines a scalar where the associated "PredUseSet (S, J)" is not a subset of the PredDefSet(S, J), (e.g., "J=PropagatePostTrue(J, PredDefSet(S, J))"). (See block 1312 of FIG. 13; lines 1454-1462 of FIG. 14B). In some examples, the selectoR180B of FIG. 1B then inserts a "SelectLast" instruction at the bottom of the loop body (see block 1314 of FIG. 13; line 1464 of FIG. 14B). After all instructions "S" have been processed, the example machine readable instructions represented by the flowchart 1300 and the pseudo code 1400 cause the example vectorization system 110B of FIG. 1B to cease operating.

Figure 15A:
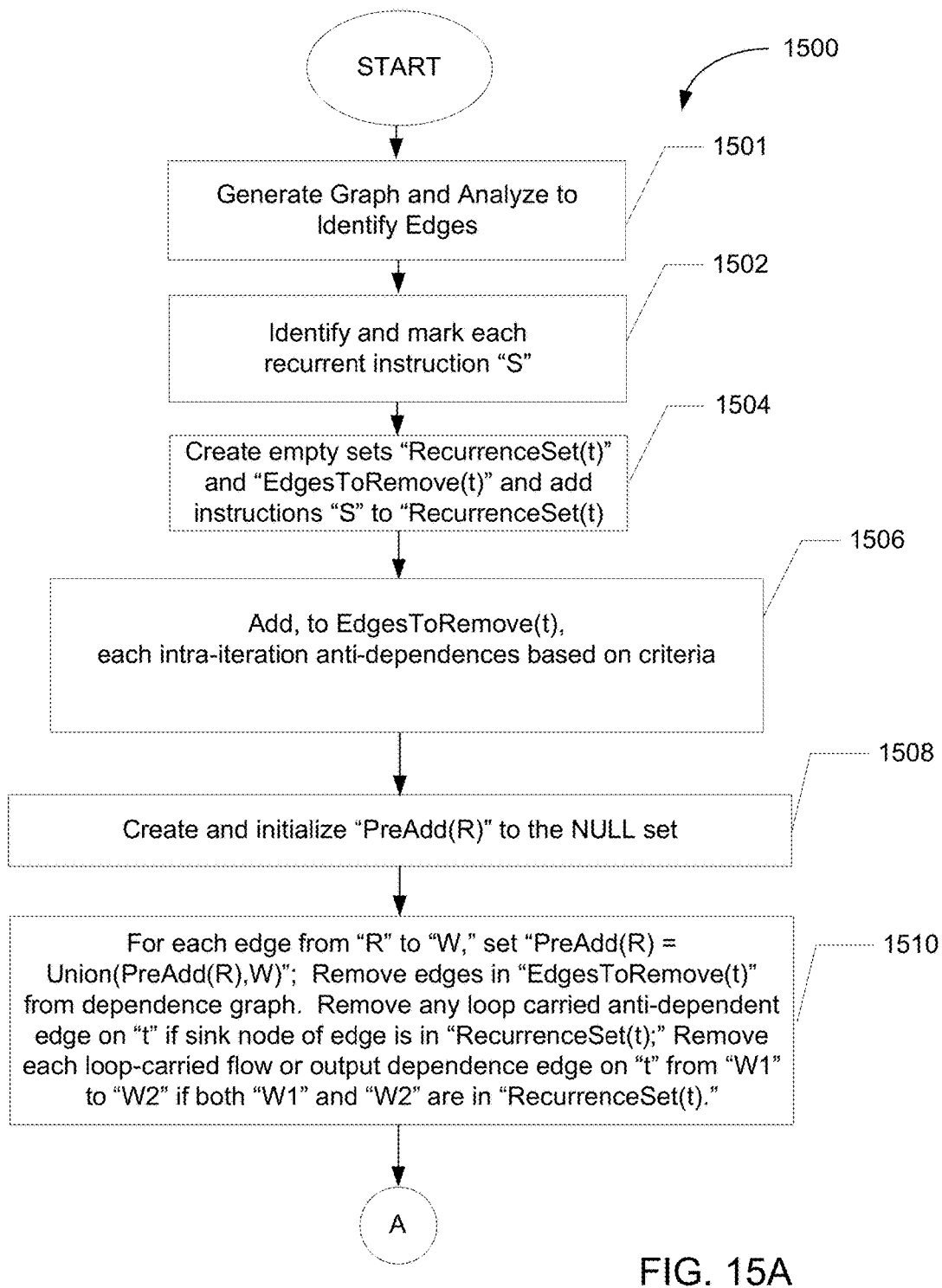
FIGS. 15A-15C illustrate an example flowchart representing example machine readable instructions executed by the example vectorization system of FIG. 1C to vectorize a scalar computer program loop having loop-carried dependences that arise from recurrence loop operations.
Figure 15B:
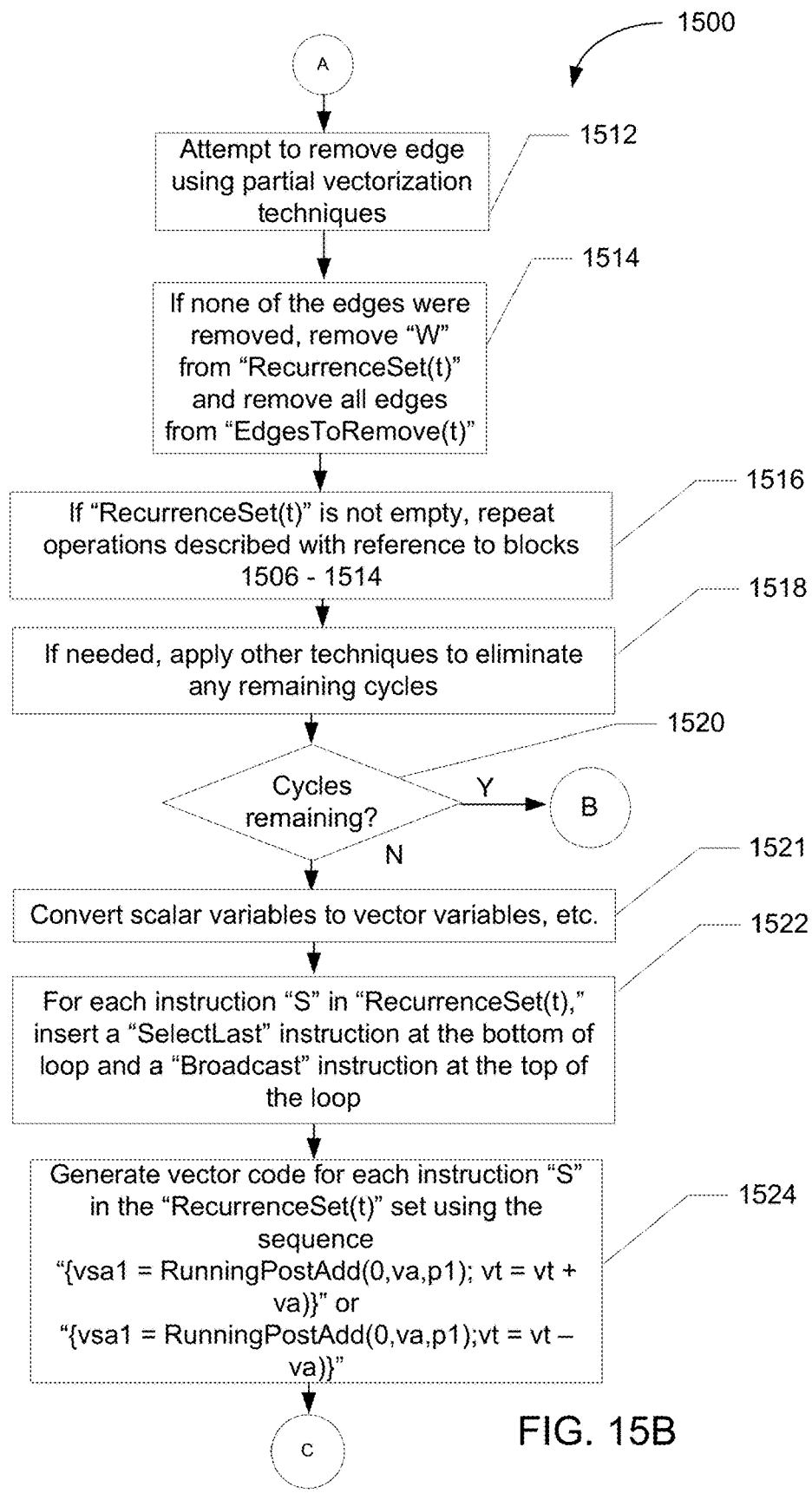
Figure 15C:
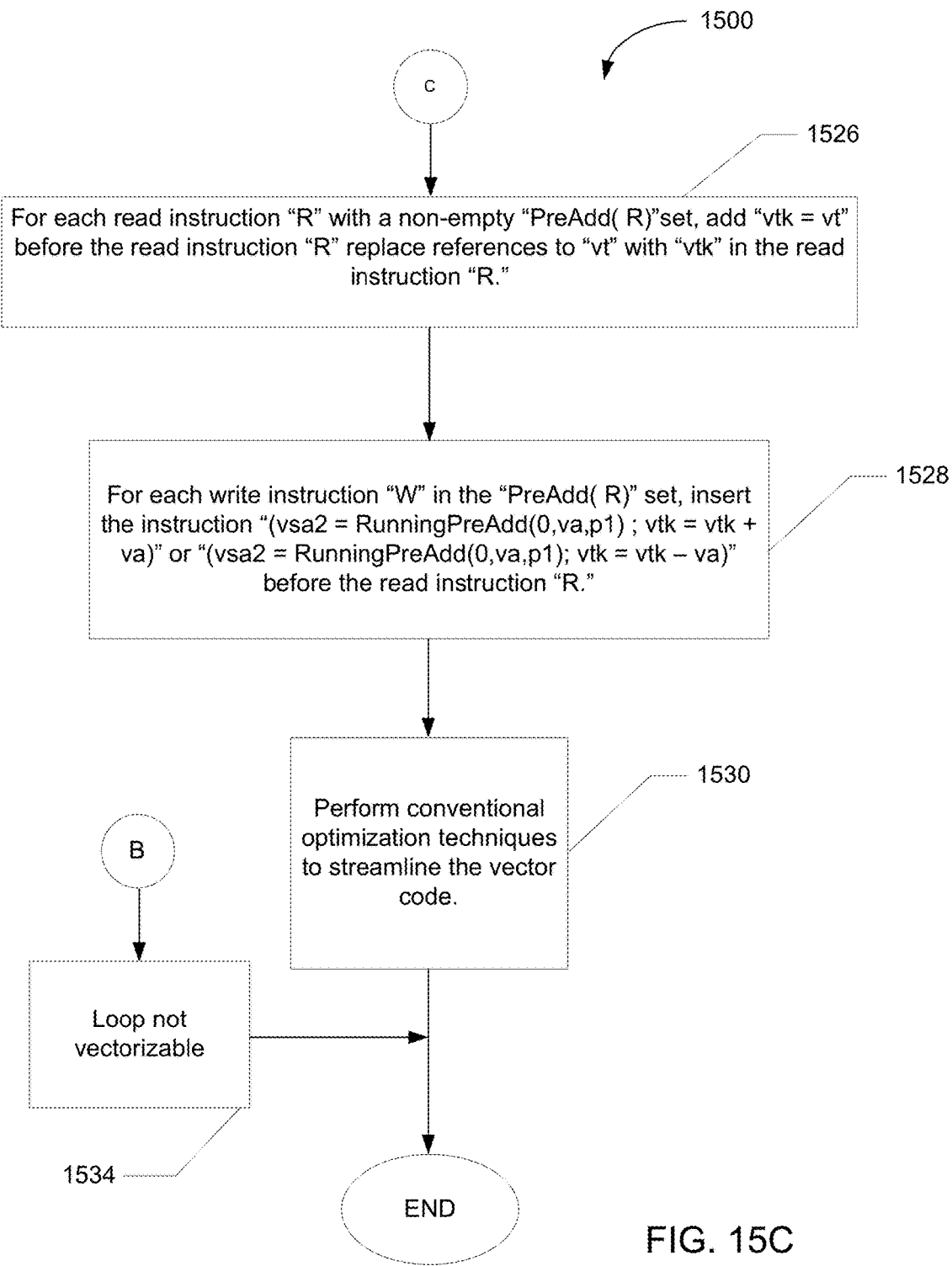

Example machine readable instructions 1500 & 1600 that may be executed to implement the example vectorization system 110C of FIG. 1C are represented by the flowcharts 1500 illustrated in FIGS. 15A, 15B, and 15C and the pseudo code 1600 illustrated in FIGS. 16A, 16B, and 16C. The example machine readable instructions 1500 and 1600 may be executed at intervals (e.g., predetermined intervals), based on an occurrence of an event (e.g., a predetermined event), etc., or any combination thereof.

In this example, the machine readable instructions executed by the example vectorization system 110C of FIG. 1C are designed to permit the example analyzeR115C of FIG. 1C and example code generatoR120C of FIG. 1C to perform scalar loop vectorization by processing certain types of intra-iteration anti-dependences and loop-carried dependences of a scalar computer program loop and then compensating for the edges using horizontal recurrence instructions. In this example, the machine readable instructions begin when the example graph generatoR135C of FIG. 1C generates a dependence graph corresponding to the loop to be vectorized and then supplies the graph to the example graph analyzeR140C of FIG. 1C which uses the graph to identify and create a list of loop edges. (See block 1501 of FIG. 15A).

The example recurrence instruction identifieR145C of FIG. 1C marks each instruction "S" of the form "t=t+addend" or "t=t-addend" as a vectorizable recurrence operation where the addend is a constant or a variable expression that is not dependent on the scalar variable "t" (see block 1502 of FIG. 15A; line 1603 of FIG. 16A). In addition, the example recurrence instruction identifieR145C of FIG. 1C creates a set of instructions referred to as "RecurrenceSet(t)" containing the instructions "S" and the example edge identifieR150C of FIG. 1C creates an empty set of edges referred to as "EdgesToRemove(t)" (see block 1504 of FIG. 15A; lines 1604, 1605 of FIG. 16A).

For each "RecurrenceSet(t)" that is not empty, the example edge identifieR150C of FIG. 1C adds, to the set "EdgesToRemove(t)," each intra-iteration anti-dependence edge "A" on the operand "t" from a read statement node "R" (defined as a source node of the edge "A") to a write statement "W," (defined as the sink node of the edge "A") provided that the "RecurrenceSet(t)" contains the write statement "W" but not the read statement "R." (See block 1506 of FIG. 15A; lines 1607-1612 of FIG. 16A). In addition, the example recurrence instruction identifieR145C of FIG. 1C creates and initializes the set "PreAdd(R)" to the NULL set (i.e., empty set). (See block 1508 of FIG. 15A; line 1613 of FIG. 16A).

If there are no paths from the read instruction "R" to the write statement "W" that can be eliminated by removing an edge of the path, the example recurrence instruction identifier 145C also sets "PreAdd(R)=Union(PreAdd(R),W)" for each edge from the read instruction "$R_{copy}$" to the write statement "W" in the EdgesToRemove(t) set. The example edge removeR152C of FIG. 1C removes the edges in the EdgesToRemove(t) set from the dependence graph (see block 1510 of FIG. 15A; line 1632 of FIG. 16B) and removes any loop-carried dependence edge on the variable "t" if the edge is an anti-dependent edge and the sink node of the edge is in the RecurrenceSet(t) set. (See block 1510 of FIG. 15A; lines 1633-1636 of FIG. 16B). The example edge removeR152C also removes each loop-carried flow or output dependence edge on the variable "t" from a first write statement "W1" (defined as the source node) to a second write statement "W2" (defined as the sink node) if both the write instructions "W1" and "W2" (e.g., the source node and the sink node) are in the RecurrenceSet(t) set. (See block 1510 of FIG. 15A; lines 1637-1639 of FIG. 16B).

The example partial vectorization tool 155C of FIG. 1C attempts to apply partial vectorization techniques to process edges on paths in the dependence graph from the read statement "R" (defined as a source node) to the write statement "W" (defined as the sink node) where the paths are constructed using intra-iteration dependence edges that does not pass through an edge "E" included in the set "EdgesToRemove(t)" (see block 1512 of FIG. 15B; line 1616-1620 of FIG. 16A). If none of the edge(s) could be removed, the example edge removeR152C removes the write statement "W" from the RecurrenceSet(t) set and removes all edges from "EdgesToRemove(t)." (See block 1514 of FIG. 15B; line 1623-1624 of FIG. 16A). If the RecurrenceSet(t) is not empty, the operations described with respect to the blocks 1506-1520 of FIGS. 15A and 15B are repeated.

If the RecurrenceSet(t) is empty, the example edge removeR152C of FIG. 1C applies other techniques, as applicable, to process any remaining edges/cycles in the dependence graph in a manner that will permit vectorization of the loop. (see block 1518 of FIG. 15B; lines 1642-1643 of FIG. 16B). Provided that all cycles have been removed from the corresponding dependence graph/list of edges (see block 1520 of FIG. 15B; line 1644 of FIG. 16C), the loop can now be vectorized. (If all cycles have not been removed (see blocks 1520 & 1534 of FIGS. 15A and 15B; line 1644 of FIG. 16C), the loop is not vectorizable and the machine readable instructions 1500 and 1600 cause the example analyzeR115 to cease operating.

The code converteR170C of FIG. 1C converts the scalar instructions to vector instructions by, for example, replacing the scalar variables with vector variables, replacing the scalar iteration control variable with a vector iteration control variable. (See block 1520 of FIG. 15B), etc. (Note that this operation is not illustrated in the example pseudo code of FIGS. 16A-16C). In some examples, for each instruction "S" of the form "t=t+a" or "t=t-a" that is in the RecurrenceSet(t) set, the selector/broadcasteR175C selects the last mask-enabled value of the vector "vt" calculated at the bottom of the loop by, for example, inserting a "SelectLast" instruction and broadcasts the mask-enabled element to all elements of the vector "vt" at the top of the loop. (see block 1522 of FIG. 15B; lines 1646-1649 of FIG. 16C).

Next, the example recurrence addeR180C of FIG. 1C generates a summing vector for each instruction "S" that is in the RecurrenceSet(t) set using the sequence {vsa1=RunningPostAdd(0,va,p1); vt=vt+va)} if "S" is of the form "t=t+a" and {vsa1=RunningPostAdd(0,va,p1); vt=vt−va)} if "S" is of the form "t=t−a." (See block 1524 of FIG. 15B; lines 1650-1654 of FIG. 16C). Here, "p1" is the predicate mask that controls execution of the instruction "S" in the vector code.

For each read instruction "R" with a non-empty "PreAdd(R)" set, the example renaming tool 180C adds the instruction "vtk=vt" before the read instruction "R" and the references to "vt" are replaced with references "vtk" in the read statement "R." (See block 1526 of FIG. 15C; lines 1657-1659 of FIG. 16C). Here "vtk" is a unique name generated for the read instruction "R." In some examples, for each write statement "W" in the "PreAdd(R)" set, the example renaming tool 180C inserts the instruction (vsa2=RunningPreAdd(0,va,p1); vtk=vtk+va) or vsa2=RunningPreAdd(0,va,p1); vtk=vtk−va) before the read instruction "R." (See block 1528 of FIG. 15C; lines 1660-1665 of FIG. 16C). In some examples, conventional optimization techniques such as, for example, copy propagation and common sub-expression elimination, or partial redundancy elimination are performed after the vectorization operations to streamline the vector code. (See block 1530 of FIG. 15C) and the vectorization process represented by the machine readable instructions ends. The example code generatoR120C of FIG. 1C can also identify multiple instructions with the same "PreAdd" set content and nullify those instructions except for the lexically first of these instructions to further optimize the code. In these instances any references to "vt" are replaced with references to "vtk" in the nullified instructions.

Figure 17A:
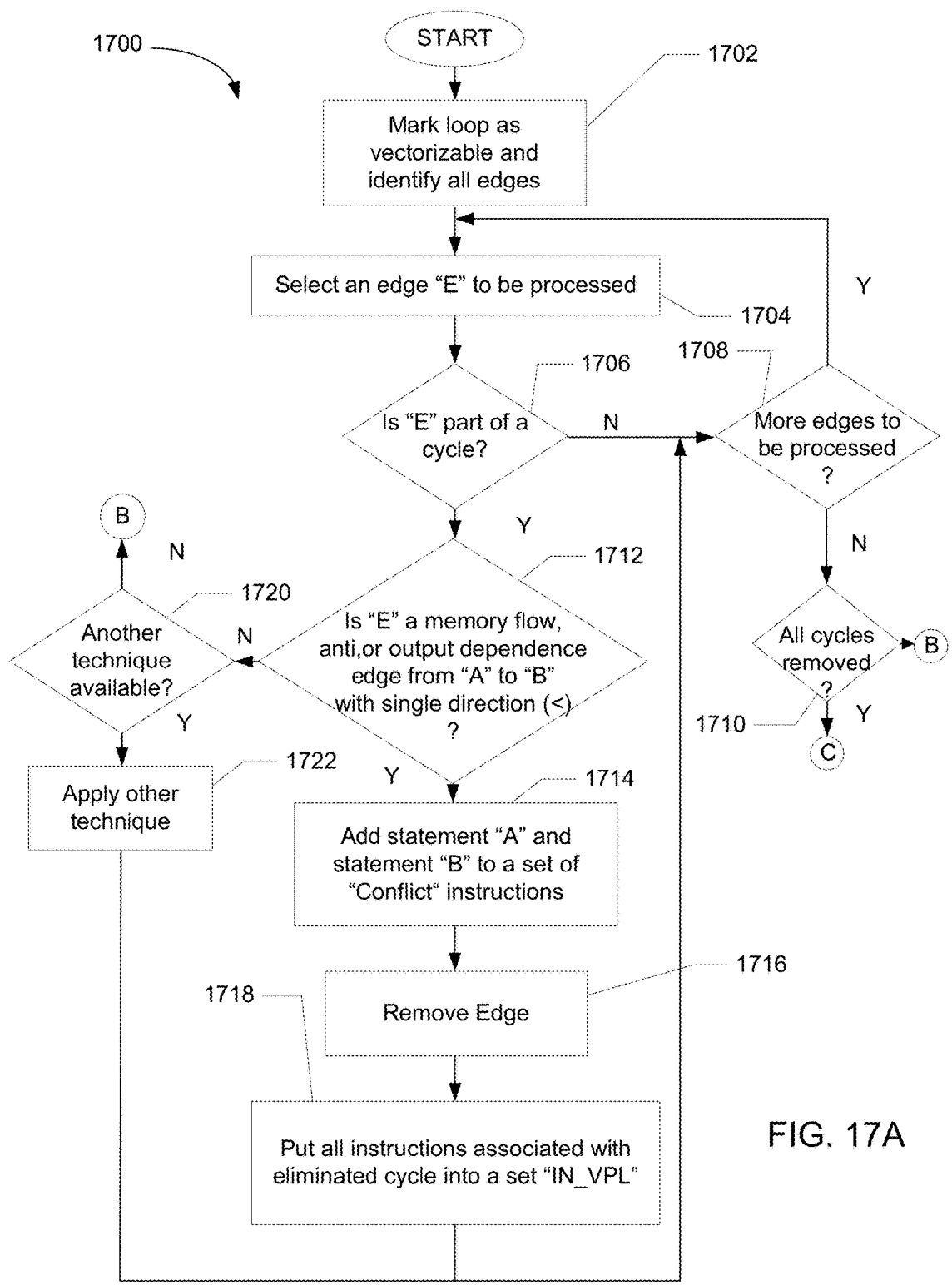
FIGS. 17A and 17B illustrate an example flowchart representing example machine readable instructions executed by the example vectorization system of FIG. 1D to vectorize a scalar computer program loop having loop-carried cross iteration memory dependences.
Figure 17B:
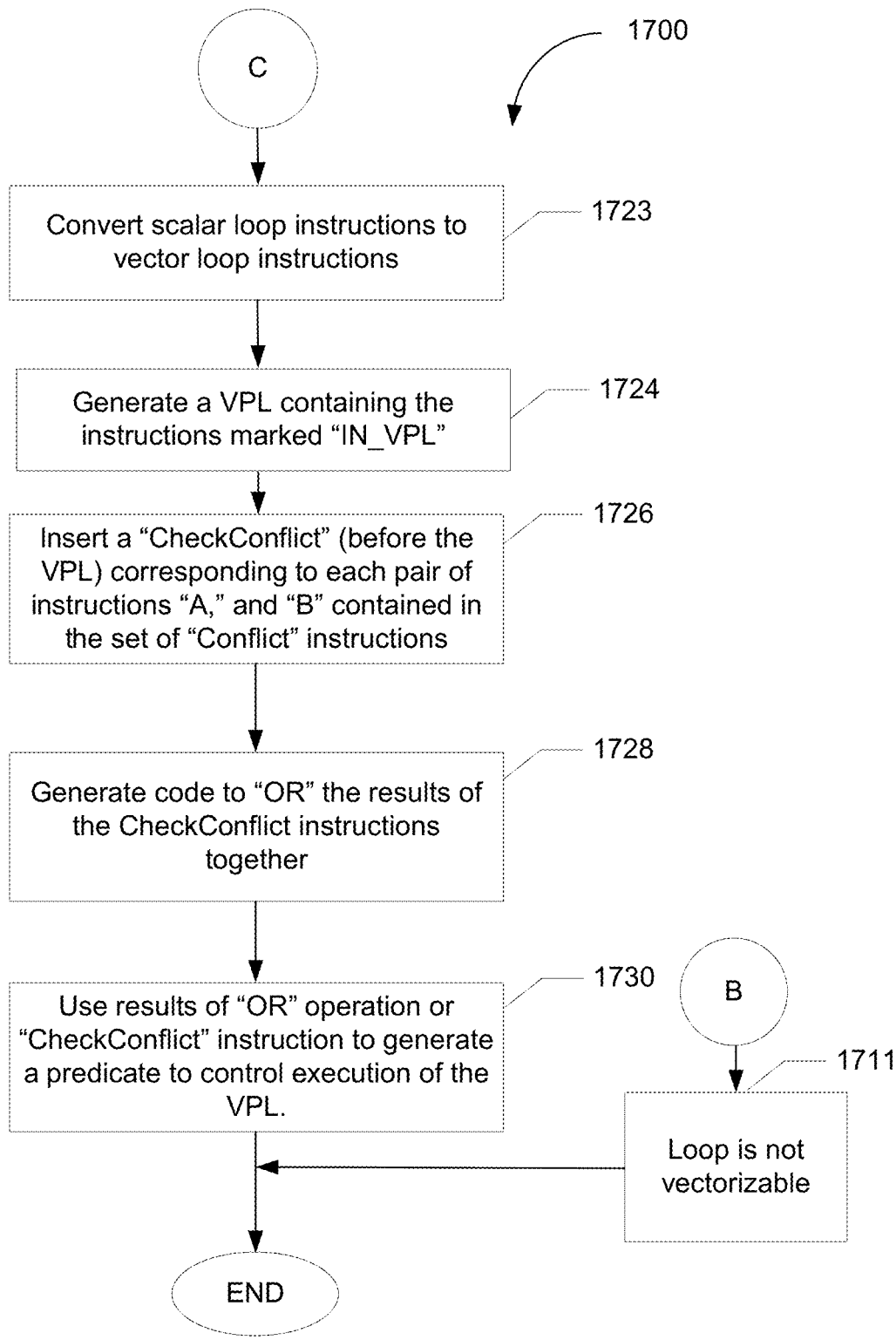

Example machine readable instructions of 1700 & 1800 that may be executed to implement the vectorization system 110D of FIG. 1D are represented by the flowchart 1700 illustrated in FIGS. 17A and 17B and the pseudo code 1800 illustrated in FIGS. 18A and 18B. The example machine readable instructions 1700 and 1800 may be executed at intervals (e.g., predetermined intervals), based on an occurrence of an event (e.g., a predetermined event), or any combination thereof.

In this example, the machine readable instructions executed by the vectorization system 110D are designed to enable loop vectorization of loops with cross-iteration memory dependences. Before the machine readable instructions 1700 and 1800 begin operating, the graph generatoR115D and the graph analyzeR120D have generated a dependence graph of the loop being analyzed and analyzed the graph to identify and create a list of loop edges, respectively. The machine readable instructions begin when the example edge removeR145D of FIG. 1D marks the instructions of the loop to be vectorized as "vectorizable" (see block 1702 of FIG. 17A; line 1806 of FIG. 18A) and the example conflict identifieR150D of FIG. 1D selects an edge "E" to be processed (see block 1704 of FIG. 17A; line 1808 of FIG. 18A) and determines whether the selected edge "E" is part of a cycle. (See block 1706 of FIG. 17A; line 1810 of FIG. 18A). If the edge "E" is not part of a cycle, the example conflict identifieR150D of FIG. 1D determines whether other dependence edges "E" are to be processed. (See block 1708 of FIG. 17A; line 1808 of FIG. 18A). If there are more edges "E," the example edge removeR145D of FIG. 1D selects a next edge "E" to be processed. (See block 1704 of FIG. 17A; line 1808 of FIG. 18A). If all edges "E" have been processed, the example edge removeR145D determines whether any of the edges that were determined to part of a cycle have not been removed from the loop (i.e., removed from a list of edges created by the graph analyzeR140D). (See block 1710 of FIG. 17A). If all such edges cycles have not been removed, then the loop is not vectorizable (see block 1711 of FIG. 17B; line 1836 of FIG. 18A) and the machine readable instructions 1700, 1800 cause the vectorization system 110D of FIG. 1D to cease operating.

If the edge "E" is part of a cycle, the example conflict identifieR150D of FIG. 1D determines whether the edge "E" is a memory flow, anti, or output dependence edge "E" from a statement "A" to a statement "B" with a single direction (<) (see block 1712 of FIG. 17A; line 1814 of FIG. 18A). If the edge "E" meets one of these criteria the example conflict identifieR150D adds the statements "A" and "B" to a set of "conflict" instructions (see block 1714 of FIG. 17A; line 1818 of FIG. 18A) and the example edge removeR145D of FIG. 1D removes the edge "E" from the dependence graph/list of edges. (See block 1716 of FIG. 17A; line 1820 of FIG. 18A). The example conflict identifieR150D of FIG. 1D places all of the instructions associated with the eliminated cycle into a set of instructions referred to as the "IN_VPL" set that will later be placed into a "VPL". (See block 1718 of FIG. 17A; line 1822 of FIG. 18A).

If the example conflict identifieR150D of FIG. 1D determines that the edge "E" does not meet any of these criteria (see block 1712 of FIG. 17A; line 1814 of FIG. 18A), the example conflict checkeR180D determines whether another technique is available to process the edge "E." (See block 1720 of FIG. 17A; line 1826 of FIG. 18A). If there is another technique available, the example edge removeR145D applies that technique to process the edge "E." (See block 1722 of FIG. 17A; lines 1828-1830 of FIG. 18A). If there is not another technique available, the example conflict identifieR150D of FIG. 1D determines that the loop is not vectorizable (see block 1711 of FIG. 17B) and the machine readable instructions cause the example vectorization system 110D to cease operating.

After placing all of the instructions associated with the cycle that was eliminated by removing the edge "E" into the set "IN_VPL" (see block 1718 of FIG. 17A), the example conflict identifieR150D of FIG. 1D tests to determine whether there are more edges to be processed. (See block 1708 of FIG. 17A; line 1808 of FIG. 18A). If all edges have been processed, the example edge removeR145D of FIG. 1D tests to determine whether all of the cycle have been removed (i.e., whether removal of edges from the list of edges has operated to break all cycles in the loop). (See block 1710 of FIG. 17A). If all cycles have not been removed, the loop is not vectorizable (see block 1711 of FIG. 17B; line 1836 of FIG. 18A) and the machine readable instructions cause the example vectorization system 110D of FIG. 1D to cease operating, as described above.

If all cycles have been removed, the example code converteR170D of FIG. 1D converts the scalar instructions of the loop being vectorized to vector instructions as described above with respect to FIG. 1D. (See block 1723 of FIG. 17B; not illustrated in the example pseudo code of FIG. 18.) The example loop partitioneR175D of the code generatoR130A generates the "VPL" and places all of the instructions included in the set "IN_VPL" into the "VPL". (See block 1724 of FIG. 17B; lines 1844 of FIG. 18B). Then, for each pair of instructions "A" and "B" included in the "Conflict" instruction set, the example conflict checkeR180D inserts a corresponding "CheckConflict" operation before the "VPL". (See block 1726 of FIG. 17B; lines 1850-1854 of FIG. 18B). In some examples, the conflict checkeR180D performs a logical OR operation on the results of the "CheckConflict" operation to dynamically determine the earliest next conflict point in the loop (see block 1728 of FIG. 17B; lines 1858-1862 of FIG. 18B) and uses the next earliest conflict point to generate a predicate used to control execution of the "VPL". (See block 1730 of FIG. 17B; lines 1858-1862 of FIG. 18B). After generating the predicate used to control execution of the "VPL", the machine readable instructions cause the example vectorization system 110D to cease operating.

Figure 19A:
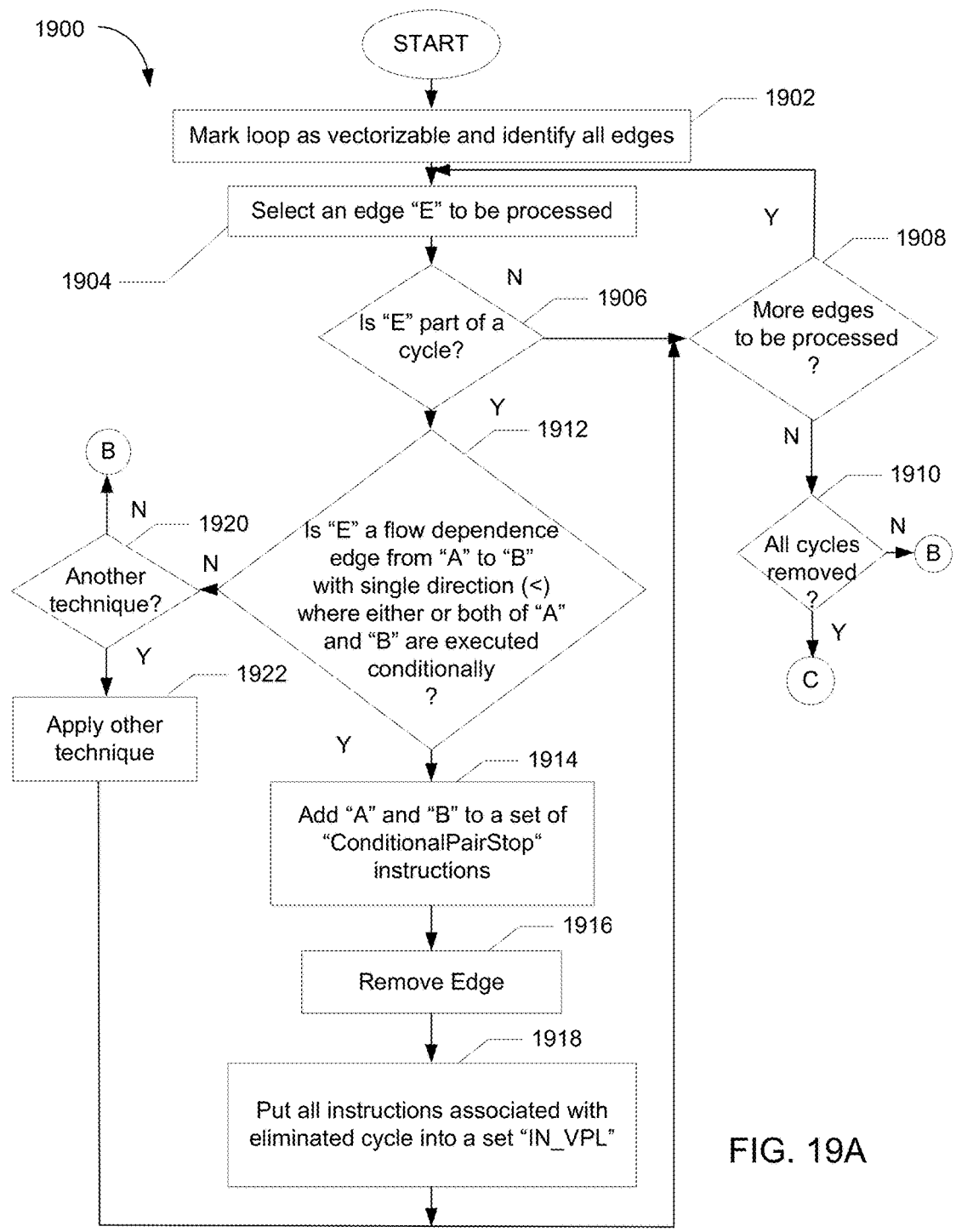
FIGS. 19A and 19B illustrate an example flowchart representing example machine readable instructions executed by the example vectorization system of FIG. 1E to vectorize a scalar computer program loop having loop-carried dependences arising from conditionally executed statements.
Figure 19B:
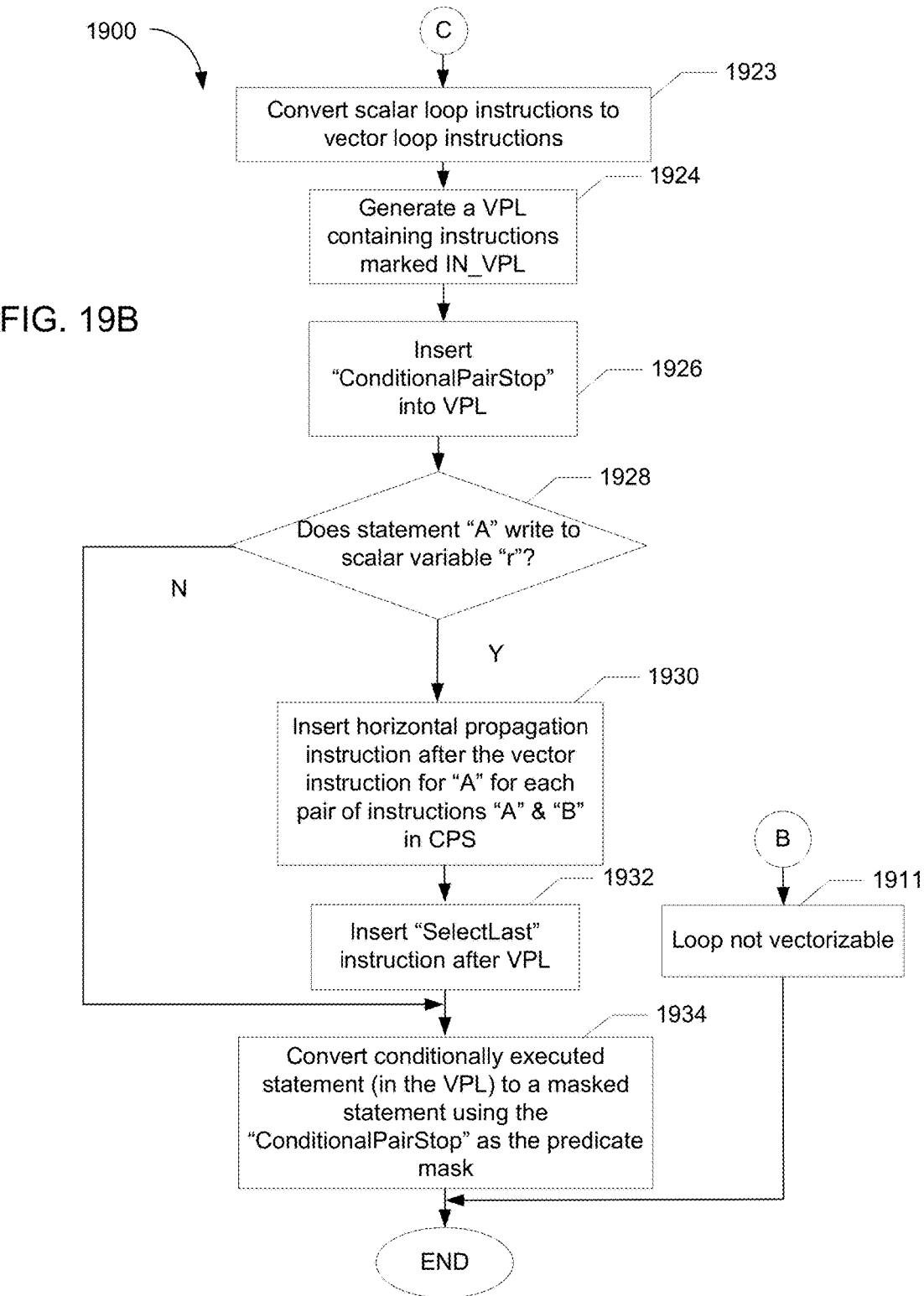

Example machine readable instructions 1900 & 2000 that may be executed to implement the vectorization system 110E of FIG. 1E are represented by the flowcharts of FIGS. 19A and 19B and by the pseudo code illustrated in FIGS. 20A and 20B. The example machine readable instructions 1900 and 2000 may be executed at intervals (e.g., predetermined intervals), based on an occurrence of an event (e.g., a predetermined event), etc., or any combination thereof.

The machine readable instructions executed by the vectorization system 110E of FIG. 1E are designed to enable vectorization of a scalar computer program loop having conditionally executed statements that can result in cross-iteration dependences. Before the instructions are executed, the example graph generatoR135E of FIG. 1E and the example graph analyzeR140E of FIG. 1E have operated to generate the graph and to analyze the graph to identify edges (e.g., create a list of the edges) present in the scalar computer program loop. The machine readable instructions then cause the example edge removeR145E of FIG. 1E to mark the instructions of the loop to be vectorized as "vectorizable"

(see block 1904 of FIG. 19A; line 2006 of FIG. 20A). The example edge removeR145E of FIG. 1E also selects an edge to be processed. (See block 1906 of FIG. 19A; line 2008 of FIG. 20A) and determines whether the edge "E" is part of a cycle. (See block 1906 of FIG. 19A; line 2010 of FIG. 20A). If the edge "E" is not part of a cycle, the example conflict identifieR150E determines whether there are more edges "E" to be processed. (See block 1908 of FIG. 19A; line 2008 of FIG. 20A). If there are more edges "E", the example analyzer edge removeR145E selects a next edge "E" to be processed. (See block 1904 of FIG. 19A). If all of the edges "E" have been processed, and provided that all of the edges "E" that are part of a cycle have been removed, the example code generatoR120E of FIG. 1E proceeds to vectorize the loop as described below with reference to block 1923 of FIG. 19A and line 2042 of FIG. 20B.

If all of the edges "E" have been processed (using the example techniques described below with reference to blocks 1912-1922 of FIG. 19A and lines 2014-2034 of FIG. 20A) but not all of the edges that are part of a cycle have been removed from the list of edges identified by the example graph analyzeR140E of FIG. 1E, then one or more cycles remain in the loop and the edge removeR145E of FIG. 1E causes the loop to be marked as non-vectorizable and the instructions cause the vectorization system 110E to cease operating. (See block 1911 of FIG. 19B; line 2036 of FIG. 20A).

If the selected edge "E" is part of a cycle (see block 1906 of FIG. 19A; line 2010 of FIG. 20A), the example edge removeR145E of FIG. 1E determines whether the edge "E" is a flow dependence edge from a statement "A" to a statement "B" with a single direction (<), where either "A," "B" or both are conditionally executed within the loop. (See block 1912 of FIG. 19A; lines 2014, 2016 of FIG. 20A). If the edge removeR145E of FIG. 1E determines that these conditions are met, the example conflict identifieR150E of FIG. 1E adds the statements "A" and "B" to a set of "ConditionalPairStop" instructions (CPS) (see block 1914 of FIG. 19A; line 2018 of FIG. 20A) and the edge removeR145E of FIG. 1E removes the edge "E" from the dependence graph. (See block 1916 of FIG. 19A; line 2020 of FIG. 20A). In some examples, the conflict identifier 150E places all of the instructions associated with the eliminated cycle into a set of instructions referred to as "IN_VPL" (see block 1918 of FIG. 19A; line 2022 of FIG. 20A) that will later be placed into a "VPL" by the code generator.

If the example edge removeR145E of FIG. 1E determines that the edge "E" is not a flow dependence edge "E" of the type described above (see block 1912 of FIG. 19A; line 2014 of FIG. 20A), the example edge removeR145E of FIG. 1E determines whether another technique can be used to process the edge "E" in a manner that will permit vectorization of the loop by the code generator (See block 1920 of FIG. 19A; line 2026 of FIG. 20A). If there is another technique available, the example edge removeR145E applies that technique to the edge "E" (see block 1922 of FIG. 19A; lines 2028, 2030 of FIG. 20A). If there is not another technique that can be used to process the edge "E", the example edge removeR145E determines that the loop is not vectorizable (see block 1911 of FIG. 19B), marks the loop as non-vectorizable (see block 1911 of FIG. 19B; line 2036 of FIG. 20A) and the machine readable instructions cause the example vectorization system 110E to halt operation.

After each edge is processed, the edge removeR145E of FIG. 1E again tests to determine whether there are more edges to be processed (as described above), and, if not, whether all cycles have been eliminated from the dependence graph. As described above, if the example edge removeR145E of FIG. 1E determines that edges have been successfully processed and removed from the list of edges such that all loop-cycles have been broken, the scalar computer program loop is supplied to the code converteR170E of FIG. 1E which converts the scalar loop instructions into vector loop instructions by replacing the scalar variables with vector variables, etc. (See block 1923; not illustrated in the example pseudo code of FIGS. 20A and 20B. The example partitioner 175E generates a "VPL" containing the statements included in the set "IN_VPL." (See block 1924 of FIG. 19B; lines 2044 of FIG. 20B). Then, the conflict checker identifieR180E of FIG. 1E inserts a conditional conflict checking instruction such as the "ConditionalPairStop" instruction into the "VPL" for each pair of statements "A" and "B" included in the set of conflict check instructions "CPS." (See block 1926 of FIG. 19B; line 2046 and lines 2050-2054 of FIG. 20B). The "ConditionalPairStop" instructions, as described above, are used to identify the loop iterations that can be executed in parallel. In some examples, the conditional conflict identifieR180E of FIG. 1E tests to determine whether the statement "A" writes to a scalar variable "r." (See block 1928 of FIG. 19B; line 2056 of FIG. 20B). If the statement "A" does not write to a scalar variable "r," the example partitioneR175E converts the conditionally executed instructions included in the "VPL" (e.g., statement "A" and statement "B") into masked instructions. (See block 1934 of FIG. 19B; lines 2072, 2074 of FIG. 20B). If the statement "A" does write to a scalar variable "r," the example propagatoR183E of FIG. 1E inserts a horizontal propagation instruction after the vector instruction for the statement "A" to propagate the value of the vectorized version of "r" from elements where the predicate for the statement "A" (e.g., "pA") is TRUE to successive elements where the predicate "pA" is FALSE. (See block 1930 of FIG. 19B; lines 2064 of FIG. 20B). The example selector 185E of FIG. 1E inserts a "SelectLast" instruction after the "VPL" to select the last element of the vector "vr" and broadcasts it to all the elements of the vector "vr" for use in the next vector iteration. (See block 1932 of FIG. 19B; line 2066 of FIG. 20B). The tangible machine readable instructions 1900 and 2000 then cause the vectorization system 110E of FIG. 1E to cease operating.

Figure 21A:
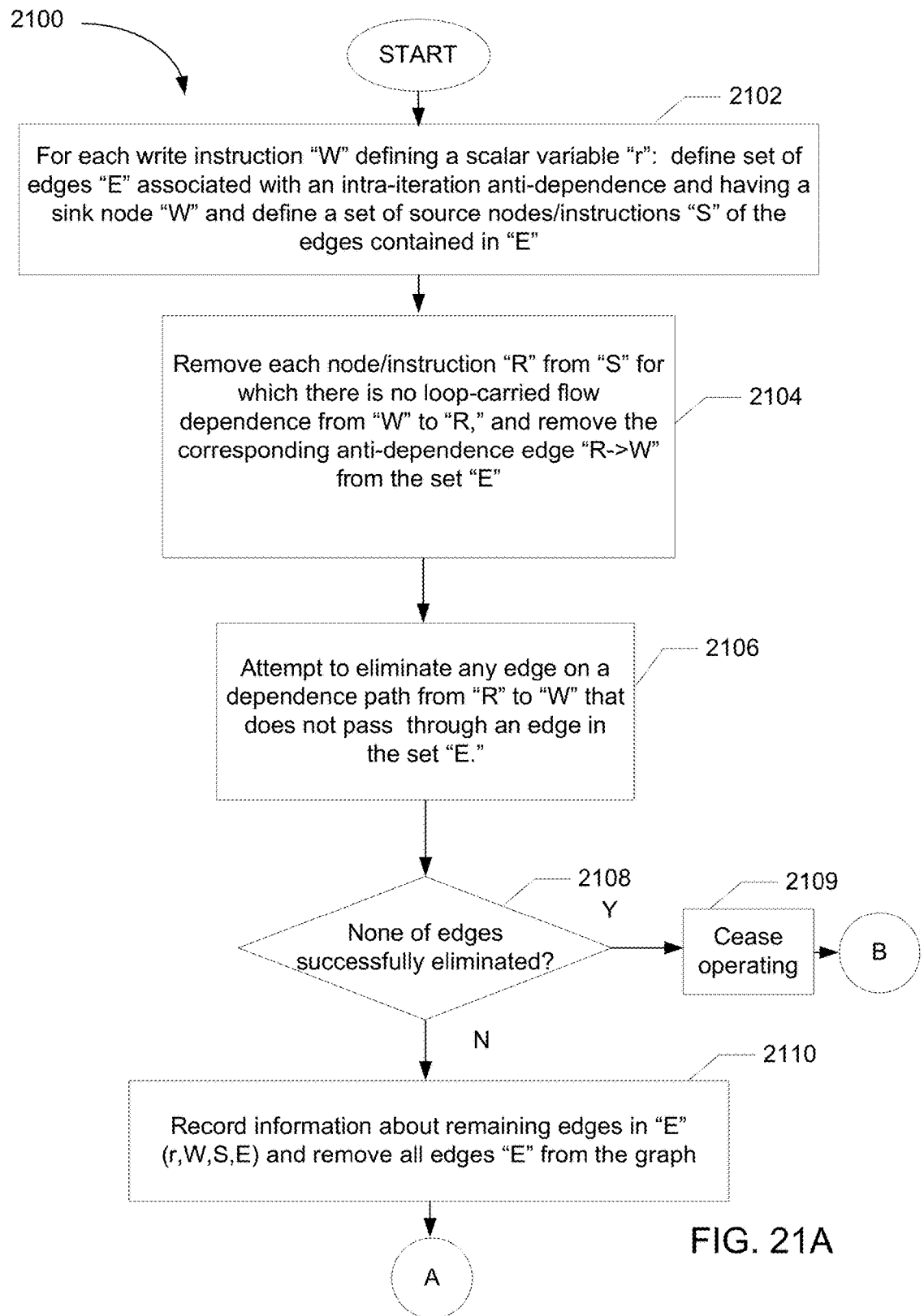
FIGS. 21A and 21B illustrate an example flowchart representing example machine readable instructions executed by the example vectorization system of FIG. 1F to vectorize a computer program loop having loop-carried dependences arising from scalar references.
Figure 21B:
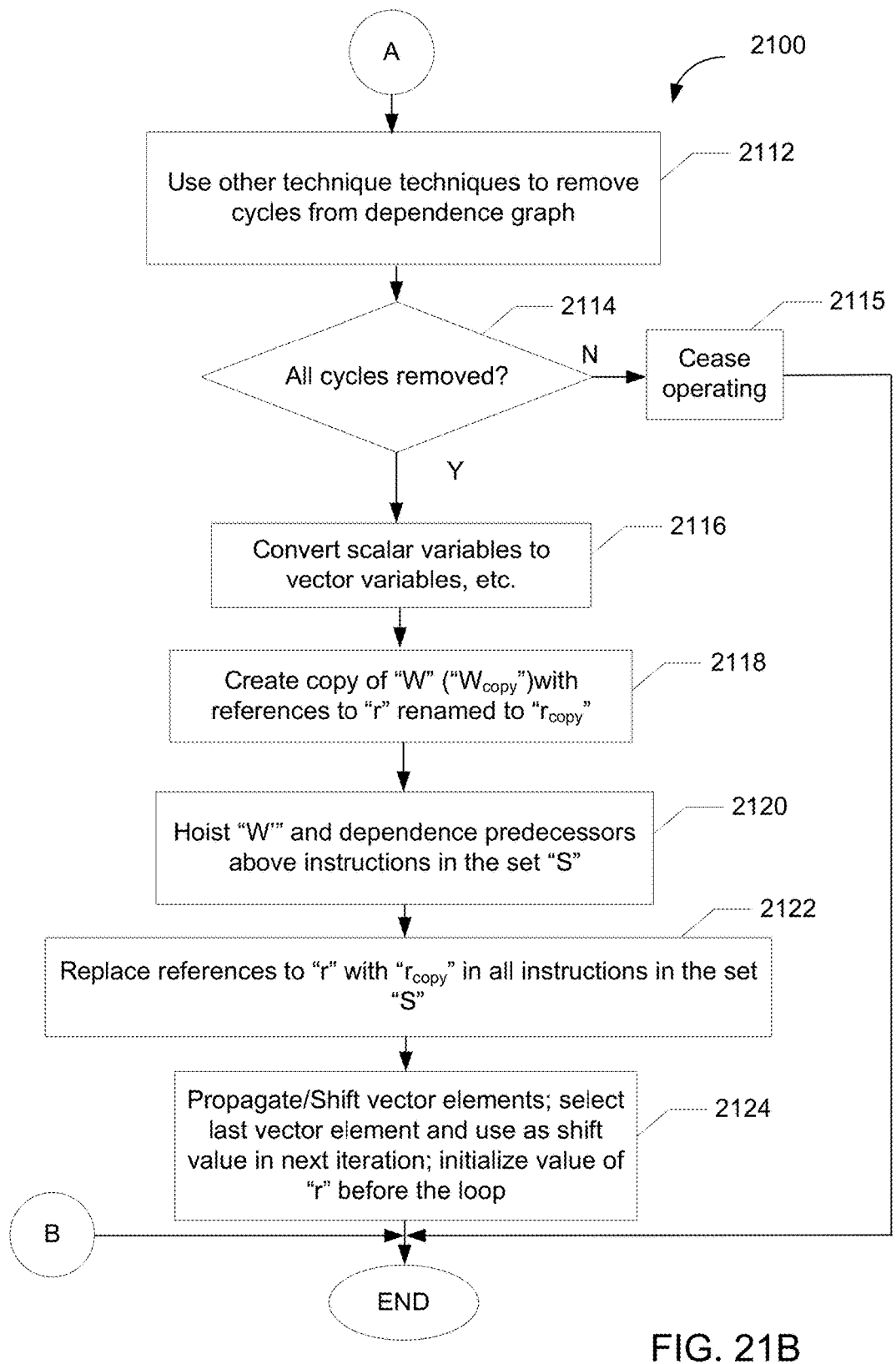

Example machine readable instructions 2100 & 2200 that may be executed to implement the vectorization system 110F of FIG. 1F are represented by the flowcharts 2100 of FIGS. 21A-21B and the pseudo code 2200 illustrated in FIGS. 22A and 22B. The example machine readable instructions 2100 and 2200 may be executed at intervals (e.g., predetermined intervals), based on an occurrence of an event (e.g., a predetermined event), etc., or any combination thereof.

Example operations performed by the example vectorization system 110F of FIG. 1F are designed to vectorize a loop having loop-carried dependences arising from references to a scalar variable within the loop. In some examples, the example graph generatoR135F of FIG. 1F and example graph analyzeR140F of FIG. 1F have operated to generate and analyze the dependence graph before the instructions 2100 and 2200 begin and cause the example edge remover to 145F of FIG. 1F to create and populate a set of edges "E" containing intra-iteration anti-dependence edges having a sink "W." The edge removeR145F of FIG. 1F also creates and populates a set of nodes "S" containing the source nodes, "R," for each of the edges contained in "E." (See block 2102 of FIG. 21A; lines 2208-2212 of FIG. 22A). The example edge removeR145F creates the sets "E" and "S" for each write statement "W" that defines a scalar variable "r" in the loop being vectorized.

For each node "R" in the set "S" for which there is no loop-carried flow dependence edge from the corresponding "W" node to the "R" node, the example edge remover 145F removes the read instruction "R" from the set "S and the corresponding edge "E" (R->W) from the set of edges "E." (See block 2104 of FIG. 21A; lines 2214-2218 of FIG. 22A).

For each node "R" in the set "S," the example edge removeR145F of FIG. 1F attempts to use partial vectorization to eliminate an edge on any dependence path from the node "R" to the node "W" that does not pass through an edge in the set "E." (See block 2106 of FIG. 21A; lines 2224-2230 of FIG. 22A). If none of the edges on such a path/cycle can be eliminated (see block 2108 of FIG. 21A, 2230), the edge removeR145F causes the vectorization system 110F to cease operating. (See block 1209 of FIG. 21A; line 2232 of FIG. 22A). In some examples, the edge removeR145F causes also indicates that vectorization has failed by returning a "FAILED TO VECTORIZE" message. (See line 2232 of FIG. 22A).

Where the set of edges "E" is not empty, the example edge removeR145F of FIG. 1F records information about each remaining edge in "E" (e.g., {r, W, S, E}) onto a stack. (See block 2110 of FIG. 21A; line 2240, 2242 of FIG. 22A) In some examples, the information is recorded by being pushed onto a stack referred to as "PropagateShiftCodeGeneration," and the edge removeR145F then removes all edges "E" from the corresponding dependence graph/list of edges created by the graph analyzeR140F of FIG. 1F. In some examples, the edge removeR145F attempts to process any remaining edges associated with cycles remaining in the scalar computer program loop using an applicable technique (including any of the techniques disclosed herein) that will permit vectorization of the loop. (See block 2212 of FIG. 21B; line 2250-2252 of FIG. 22A). If any cycles remain, the loop cannot be vectorized. (See block 2115 of FIG. 21B).

Next, provided that the dependence graph associated with the loop does not contain any cycles, the example code converteR170F of FIG. 1F proceeds to convert the scalar loop being processed to a vector loop by, for example, replacing the scalar variables with vector variables, replacing the conditions with predicates, etc. (See block 2116 of FIG. 21B; lines 2254-2258 of FIG. 22B). In some examples, for each (r, W, S, E) in the "PropagateShiftCodeGeneration" stack, the example copieR165F creates a copy of the write statement "W," referred to as "$W_{copy}$," in which any references to "r" have been renamed by the renaming tool 180F as "$r_{copy}$." (See block 2118 of FIG. 21B; line 2260-2262 of FIG. 22B). In addition, the example copieR175F of FIG. 1F hoists the copy of the write statement $W_{copy}$ and its dependence predecessors above all instructions represented by the set "S" (see block 2120 of FIG. 21B; line 2264 of FIG. 22B) and the renaming tool 180F of FIG. 1F replaces all references to "r" with references to "$r_{copy}$" in all of the instructions contained in the set "S." (See block 2122 of FIG. 21B; line 2266 of FIG. 22B). In addition, the example propagator/shifteR185F of FIG. 1F causes the values of the renamed vector "$r_{copy}$" to be propagated/shifted based on the predicate controlling the vector "r" in the scalar version of the loop. (See block 2124 of FIG. 21B; lines 2268, 2270 of FIG. 22B). In some examples, the example propagator/shifteR185F performs the vector propagation/shift operation by inserting an instruction "$r_{copy}$=PropagateShift(lr, $r_{copy}$, p)" after the instruction "$W_{copy}$" where p is the predicate mask used in "$W_{copy}$." The selectoR187F of FIG. 1F inserts an instruction "lr=SelectLastElement (r, p)" causing the value of "r" calculated in the last iteration of the vector to be shifted into "$r_{copy}$" in the next iteration. The selectoR187F of FIG. 1F also initializes the value of the "r" before the loop is entered. (See block 2124 of FIG. 21B; lines 2272-2274 of FIG. 22B). The example machine readable instructions 2100 and 2200 then cause the code generatoR120F of FIG. 1F to cease operating.

Figure 23:
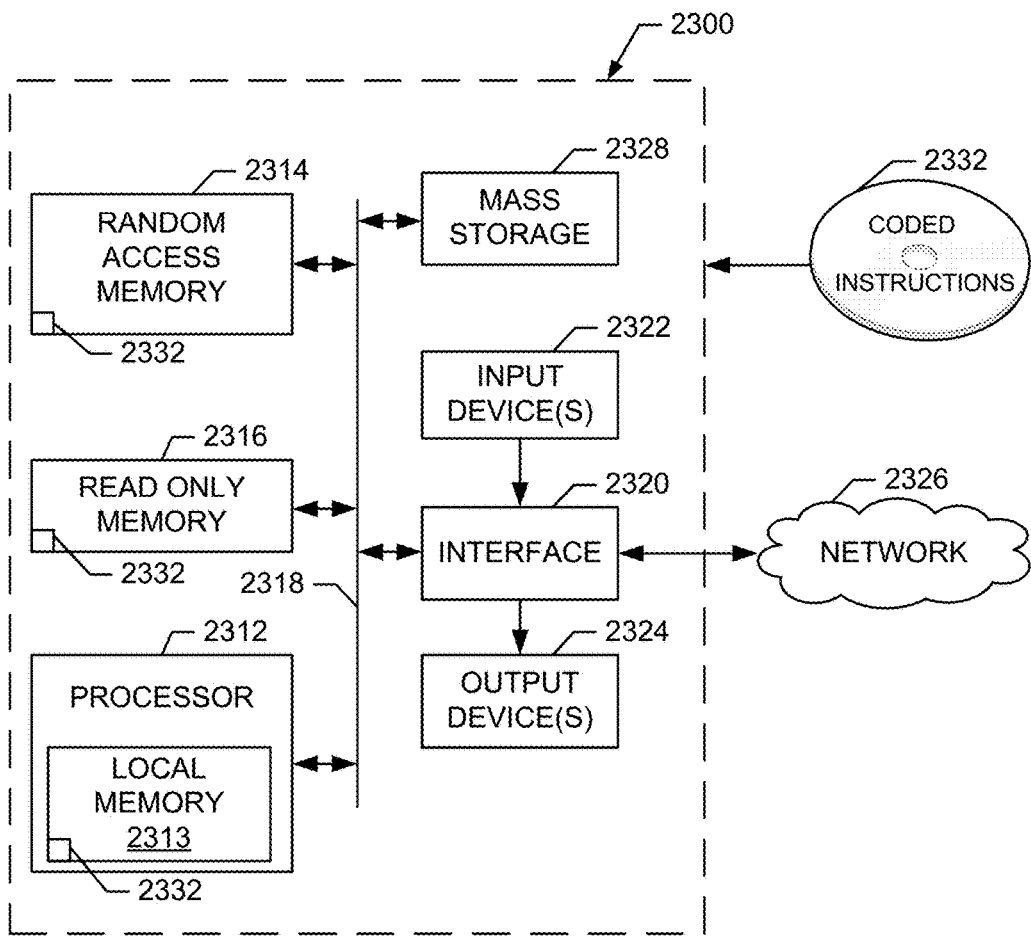
FIG. 23 is a block diagram of an example processing system that may execute the example machine readable instructions of FIGS. 13, 14A-14B, 15A-15C, 16A-16B, 17A-17B, 18A-18B, 19A-19B, 20A-20B, 21A-21B, and 22A-22B to implement the example vectorization systems of FIGS. 1A, 1B, 1C, 1D, 1E and 1F.

FIG. 23 is a block diagram of an example processor platform 2300 capable of executing the instructions of FIGS. 13, 14A-1B, 15A-15C, 16A-16C, 17A-17B, 18A-18B, 19A-19B, 20A, 20B, 21A-21B and 22A-22B to implement the apparatus of FIGS. 1A, 1B, 1C, 1D, 1E, 1F. The processor platform 2300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 2300 of the illustrated example includes a processoR2312. The processoR2312 of the illustrated example is hardware. For example, the processoR2312 can be implemented by one or more integrated circuits, logic circuits, microprocessors or controllers from any desired family or manufacturer.

The processoR2312 of the illustrated example includes a local memory 2313 (e.g., a cache). The processoR2312 of the illustrated example is in communication with a main memory including a volatile memory 2314 and a non-volatile memory 2316 via a bus 2318. The volatile memory 2314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2316 may be implemented by flash memory and/or any other desired type of memory device. Access to the main memory 2314, 2316 is controlled by a memory controller.

The processor platform 2300 of the illustrated example also includes an interface circuit 2320. The interface circuit 2320 may be implemented by any type of interface standard, such as an Ethernet interface, a universal serial bus (USB), and/or a PCI express interface.

In the illustrated example, one or more input devices 2322 are connected to the interface circuit 2320. The input device(s) 2322 permit(s) a user to enter data and commands into the processoR2312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2324 are also connected to the interface circuit 2320 of the illustrated example. The output devices 2324 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2320 of the illustrated example, thus, typically includes a graphics driver card, a graphics driver chip or a graphics driver processor.

The interface circuit 2320 of the illustrated example also includes a communication device such as a transmitter, a receiver, a transceiver, a modem and/or network interface card to facilitate exchange of data with external machines (e.g., computing devices of any kind) via a network 2326

(e.g., an Ethernet connection, a digital subscriber line (DSL), a telephone line, coaxial cable, a cellular telephone system, etc.).

The processor platform 2300 of the illustrated example also includes one or more mass storage devices 2328 for storing software and/or data. Examples of such mass storage devices 2328 include floppy disk drives, hard drive disks, compact disk drives, Blu-ray disk drives, RAID systems, and digital versatile disk (DVD) drives.

The coded instructions 2332 of FIGS. 13, 14A-1B, 15A-15C, 16A-16C, 17A-17B, 18A-18B, 19A-19B, 20A, 20B, 21A-21B and 22A-22B may be stored in the mass storage device 2328, in the volatile memory 2314, in the non-volatile memory 2316, and/or on a removable tangible computer readable storage medium such as a CD or DVD.

From the foregoing, it will be appreciated that the above disclosed methods, apparatus and articles of manufacture permit the vectorization of scalar computer program loops having loop-carried dependences thereby eliminating the need to perform such vectorization manually. Further, the above disclosed methods, apparatus and articles of manufacture use computer program code, applications and/or services, including computer code associated with computer languages available in architectures having hardware/software that support speculative vectorization of loops with runtime data dependences, (e.g., Macroscalar™ or similar architectures). to perform such vectorization. The above disclosed methods, apparatus and articles of manufacture also permit the identification of run-time loop dependences and the elimination of such dependences to enable vectorization of the scalar computer program loops.

An example method disclosed herein includes generating a first predicate set associated with a first scalar computer program instruction where the first predicate set contains predicates that cause a scalar variable to be defined in the scalar computer program at or before the first scalar computer program instruction. The example also includes generating a second predicate set associated with the first scalar computer program instruction where the second predicate set contain predicates that cause the scalar variable to be used in the scalar computer program loop after the first scalar computer program instruction. Some example methods also include determining whether the second predicate set is a subset of the first predicate set and propagating a value in an element of a vector to a subsequent element of the vector in response to determining that the second predicate set is not a subset of the first predicate set. In some such example methods, the vector is formed by converting the scalar variable to a vector variable.

Some example methods further include adding a first predicate controlling execution of the first scalar computer program instruction to the first predicate set and initializing the second predicate set as an empty set. Some example methods additionally include adding a second predicate controlling execution of a second scalar computer program instruction to the second predicate set.

Some example methods include determining whether an edge between the first scalar computer program instruction and a second computer program instruction is a loop-carried lexically backward anti-dependence edge on the scalar variable. A second predicate controlling execution of the second scalar computer program instruction is added to the second predicate set, if the edge is determined to be a loop-carried lexically backward anti-dependence edge on the scalar variable.

Some example methods also include adding a second predicate controlling execution of a second scalar computer program instruction to the first predicate set. Example methods can also include determining whether an edge between the first scalar computer program instruction and a second computer program instruction is an output dependence edge on the scalar variable. In some example methods a second predicate controlling execution of the second scalar computer program instruction is added to the first predicate set, if the edge is determined to be an output dependence edge. In some examples, a propagation instruction is used to propagate the value. Some example methods include converting a scalar instruction that corresponds to the first scalar computer program instruction into a vector computer program instruction and inserting the propagation instruction after the vector computer program instruction.

In some example methods, the propagated value is a first value and the element is a first element, and the methods also include selecting, in a first iteration, a second value from a second element in the vector, and populating, in a second iteration, all elements of the vector with the selected, second value. In some example methods, the second element is the last element in the vector. In some examples, the value is propagated based on the first predicate.

Some example systems disclosed herein include a predicate set generator to generate a first predicate set associated with a first scalar computer program instruction where the first predicate set contains predicates that cause a scalar variable to be defined at or before the first scalar computer program instruction. The predicate set generator is also to generate a second predicate set associated with the first scalar computer program instruction. The second predicate set contains predicates that cause the scalar variable to be used after the first scalar computer program instruction. Some example systems also include a propagator to determine whether the second predicate set is a subset of the first predicate set and to propagate a value in an element of a vector to a subsequent element of the vector in response to determining that the second predicate set is not a subset of the first predicate set. The vector is formed by converting the scalar variable to a vector variable.

In some example systems, the predicate set generator also adds a first predicate controlling execution of the first scalar computer program instruction to the first predicate set; and initializes the second predicate set as an empty set. Some example systems also include an edge remover to add a second predicate controlling execution of a second scalar computer program instruction to the second predicate set. In some example systems the edge remover is to determine whether an edge between the first scalar computer program instruction and a second computer program instruction is a loop-carried lexically backward anti-dependence edge on the scalar variable. If the edge is determined to be a loop-carried lexically backward anti-dependence edge on the scalar variable, the edge remover adds a second predicate controlling execution of the second scalar computer program instruction to the second predicate set. In some examples, the edge remover is to add a second predicate controlling execution of a second scalar computer program instruction to the first predicate set.

In some example systems include an edge remover to determine whether an edge between the first scalar computer program instruction and a second computer program instruction is an output dependence edge on the scalar variable. The edge remover adds a second predicate controlling execution of the second scalar computer program instruction to the first predicate set, if the edge is determined to be an output dependence edge.

In some example systems, the propagator propagates the value using a propagation instruction and the propagator inserts the propagation instruction after a vector instruction formed by converting the first scalar computer program instruction into the vector instruction. In some examples, propagate value is a first value and the element is a first element and the system also includes a selector to select, in first iteration, a second value from a second element in the vector and a broadcaster to populate, in a second iteration, all elements of the vector with the selected value. In some examples, the second element is the last element in the vector.

Some example tangible machine readable storage mediums disclosed herein include machine readable instructions that cause a machine to generate a first predicate set associated with a first scalar computer program instruction. The first predicate set is to contain predicates that cause a scalar variable to be defined at or before the first scalar computer program instruction. The instructions also cause the machine to generate a second predicate set associated with the first scalar computer program instruction. The second predicate set is to contain predicates that cause the scalar variable to be used after the first scalar computer program instruction. In some examples, the instructions further cause the machine to determine whether the second predicate set is a subset of the first predicate set. In response to determining that the second predicate set is not a subset of the first predicate set, the instructions cause the machine to propagate a value in an element of a vector to a subsequent element of the vector in response. In some examples, the vector is formed by converting the scalar variable to a vector variable.

In some example disclosed herein, the instructions also cause the machine to add a first predicate controlling execution of the first scalar computer program instruction to the first predicate set and to initialize the second predicate set as an empty set. The instructions further cause the machine to add a second predicate controlling execution of a second scalar computer program instruction to the second predicate set. In some examples, instructions also cause the machine to determine whether an edge between the first scalar computer program instruction and a second computer program instruction is a loop-carried lexically backward anti-dependence edge on the scalar variable. The instructions cause the machine to add a second predicate controlling execution of the second scalar computer program instruction to the second predicate set, if the edge is determined to be a loop-carried lexically backward anti-dependence edge on the scalar variable.

In some examples, the instructions also cause the machine to add a second predicate controlling execution of a second scalar computer program instruction to the first predicate set. The instructions can also cause the machine to determine whether an edge between the first scalar computer program instruction and a second computer program instruction is an output dependence edge on the scalar variable and to add a second predicate controlling execution of the second scalar computer program instruction to the first predicate set, if the edge is determined to be an output dependence edge.

In some examples, the instructions cause the machine to use a propagation instruction to propagate the value, to convert a scalar instruction that corresponds to the first scalar computer program instruction into a vector computer program instruction, and to insert the propagation instruction after the vector computer program instruction.

In some examples, the propagated value is a first value and the element is a first element, and the instructions further cause the machine to select a second value from a second element in the vector, the second value being selected in a first iteration, and populate, in a second iteration, all elements of the vector with the selected second value. The second element is the last element in the vector. In some examples, the value is propagated based on the first predicate.

Some example methods disclosed herein include, in response to receiving a scalar computer program loop, replacing a scalar recurrence operation in the scalar computer program loop with a first vector summing operation and a first vector recurrence operation. The first vector summing operation is to generate a first running sum and the first vector recurrence operation is to generate a first vector. The first vector recurrence operation being based on the scalar recurrence operation. Some example methods also include inserting a renaming operation to rename the first vector, inserting a second vector summing operation to generate a second running sum, and inserting a second vector recurrence operation to generate a second vector based on the renamed first vector.

In some example methods, the first vector recurrence operation defines the first vector as being based on the first vector and the first running sum and the second vector recurrence operation defines the renamed first vector as being based on the renamed first vector and the second running sum. Some example methods also include replacing references to the first vector in a read operation with references to the renamed vector where the read operation reads the renamed vector.

In some example methods, the second vector recurrence operation is inserted before the read operation. In some examples, the scalar recurrence operation is based on an addend, the first running sum is a first summing vector, and the second running sum is a second summing vector. Each vector element of the first summing vector contains a running sum of addend values gathered up to a current iteration and each vector element in the second summing vector contains a running sum of addend values gathered up to a preceding iteration.

Some example methods include, in a current vector iteration, selecting a value in a last element of the first vector and in a subsequent iteration, populating the elements of the first vector with the selected value. Some example methods also include identifying a dependence edge in the scalar computer program loop from a read operation to the scalar recurrence operation where the scalar recurrence operation is a write operation. Additionally, the example methods include adding the dependence edge to a set of dependence edges to be removed from a list of edges associated with the scalar computer program loop if the write operation is in a set of scalar recurrence operations associated with the scalar computer program loop and the read operation is not in the set of recurrence operations.

In some example methods, the scalar recurrence operation is a first scalar recurrence operation, and the methods further include identifying a dependence edge in the scalar computer program loop from the first scalar recurrence operation to a second scalar recurrence operation, where the first and second scalar recurrence operations are write operations.

Some example systems disclosed herein include a recurrence adder to replace a scalar recurrence operation in the scalar computer program loop with a first vector summing operation and a first vector recurrence operation. The first vector summing operation is to generate a first running sum and the first vector recurrence operation is to generate a first vector. The scalar recurrence operation is converted to form the first vector recurrence operation. In some example the recurrence adder also inserts a second vector summing operation to generate a second running sum and inserts a second vector recurrence operation to generate a second vector. Some example systems also include a renaming tool to rename the first vector where the second vector recurrence operation is based on the renamed first vector.

In some example systems, the first vector recurrence operation defines the first vector as being based on the first vector and the first running sum and the second vector recurrence operation defines the renamed first vector as being based on the renamed first vector and the second running sum. In some such example systems, the recurrence adder inserts the second summing vector operation and the second vector recurrence operation before a vector read operation and replace references to the first vector in the vector read operation with references to the renamed vector. The vector read operation reads the renamed vector.

In some example systems, the scalar recurrence operation is based on an addend, the first running sum is a first summing vector, and the second running sum is a second summing vector. Each vector element of the first summing vector contains a running sum of addend values gathered up to a current iteration and each vector element in the second summing vector contains a running sum of addend values gathered up to a preceding iteration.

Some example systems include an edge remover to identify a dependence edge in the scalar computer program loop from a read operation to the scalar recurrence operation where the scalar recurrence operation is a write operation. In some examples, the edge remover is also to add the dependence edge to a set of dependence edges associated with the scalar computer program loop, if the write operation is in a set of scalar recurrence operations associated with the scalar computer program loop and the read operation is not in the set of recurrence operations. In some examples the edge remover applies a partial vectorization technique to break a cycle in the scalar computer program loop. If the partial vectorization technique is not successful in breaking the cycle, the edge remover removes the dependence edge from the set of dependence edges and removes the write operation from the set of scalar recurrence operations.

In some example systems, the scalar recurrence operation is a first scalar recurrence operation, and the system also includes an edge remover to identify a dependence edge in the scalar computer program loop from a first write instruction to a second write instruction. The edge remover removes the dependence edge from a list of dependence edges associated with the scalar computer program loop if the first and second write instructions are both contained in a set of recurrence operations associated with the scalar computer program loop.

Some example tangible machine readable storage mediums disclosed herein include machine readable instructions that cause a machine to, in response to receiving a scalar computer program loop, replace a scalar recurrence operation in the scalar computer program loop with a first vector summing operation and a first vector recurrence operation. The first vector summing operation is to generate a first running sum and the first vector recurrence operation is to generate a first vector. The first vector recurrence operation is based on the scalar recurrence operation. The instructions also cause the machine to insert a second vector summing operation. The second vector summing operation is to generate a second running sum. In some examples, the instructions further cause the machine to insert a second vector recurrence operation to generate a second vector and to rename the first vector, the second vector recurrence operation being based on the renamed first vector.

In some examples, the first vector recurrence operation defines the first vector as being based on the first vector and the first running sum, the second vector recurrence operation defines the renamed first vector as being based on the renamed first vector and the second running sum, and the second summing vector operation and the second vector recurrence operation are inserted before a vector read operation that reads the renamed vector. In some examples, references to the first vector in the vector read operation are replaced with references to the renamed vector. In some examples, the scalar recurrence operation is based on an addend, the first running sum is a first summing vector, and the second running sum is a second summing vector. Each vector element of the first summing vector contains a running sum of addend values gathered up to a current iteration and each vector element in the second summing vector contains a running sum of addend values gathered up to a preceding iteration.

In some examples, the instructions further to cause the machine to identify a dependence edge in the scalar computer program loop from a read operation to the scalar recurrence operation where the scalar recurrence operation being a write operation. If the write operation is in a set of scalar recurrence operations associated with the scalar computer program loop and the read operation is not in the set of scalar recurrence operations, the instructions cause the machine to add the dependence edge to a set of dependence edges associated with the scalar computer program loop. The instructions cause the machine to apply a partial vectorization technique to remove a cycle in the scalar computer program loop. If the partial vectorization technique is not successful in breaking the cycle, the instructions cause the machine to remove the dependence edge from the set of dependence edges and to remove the write operation from the set of scalar recurrence operations.

Some example instructions cause the machine to identify a dependence edge in the scalar computer program loop from a first write instruction to a second write instruction. If the first and second write instructions are both contained in a set of scalar recurrence operations associated with the scalar computer program loop, the instructions cause the machine to remove the dependence edge from a list of dependence edges scalar computer program loop.

One example method disclosed herein includes, at runtime, identifying a first loop iteration that cannot be executed in parallel with a second loop iteration due to a set of conflicting scalar loop operations, the first loop iteration being executed after the second loop iteration. The method also includes sectioning a vector loop into vector partitions including a first vector partition, the first vector partition to execute consecutive loop iterations in parallel, the consecutive loop iterations to start at the earlier loop iteration and to end before the conflict loop iteration.

In some example methods, the consecutive loop iterations are a first set of consecutive loop iterations, and the vector partitions include a second vector partition to execute a second set of consecutive loop iterations in parallel. The second set of consecutive loop iterations start at the first loop iteration and end before a third loop iteration. In some example methods, a first number of consecutive loop iterations included in the first set of consecutive loop iterations is different than a second number of consecutive loop iterations included in the second set of consecutive loop iterations. In some example methods, sectioning the vector loop into vector partitions includes generating a vector partitioning loop, the vector partitioning loop being executed based on a predicate. In some example methods, first loop iteration is identified before the vector partitioning loop is entered and in some example methods, sectioning the vector loop is performed in an inner loop that is executed within an outer loop. In some example methods, the conflicting operations access a same memory location.

In some example methods the conflicting operations include a first conditionally executed statement and a second conditionally executed statement and the first and second conditionally executed statements cause a cross-iteration dependence. Some example methods further include compensating for a memory flow dependence between a first operation and a second operation by placing a set of program instructions associated with first operation and the second operation into the vector partitioning loop.

One example system disclosed herein include a conflict checker to identify, at runtime, a first loop iteration that cannot be executed in parallel with a second loop iteration due to the conflicting operations where the first loop iteration being executed before the second loop iteration. The system also includes a partitioner to section a vector loop into vector partitions including a first vector partition. The first vector partition is to execute consecutive loop iterations in parallel and the consecutive loop iterations start at the second loop iteration and end before the first loop iteration. In some example systems, the consecutive loop iterations are a first set of consecutive loop iterations, and the vector partitions further include a second vector partition to execute a second set of consecutive loop iterations in parallel. The second set of consecutive loop iterations start at the first loop iteration and end before a third loop iteration. In some example systems, a first number of consecutive loop iterations included in the first set of consecutive loop iterations is different than a second number of consecutive loop iterations included in the second set of consecutive loop iterations.

In some example systems, the partitioner sections the vector loop into vector partitions by generating a vector partitioning loop, the vector partitioning loop being executed based on a predicate. In some example systems, the conflict checker identifies the first conflict loop iteration before the vector partitioning loop is entered. In some examples, the partitioner sections the vector loop within an inner loop that is executed within an outer loop.

In some example systems, the conflicting operations access a same memory location and in some example systems the conflicting operations include a first conditionally executed statement and a second conditionally executed statement where the first and second conditionally executed statements causing a cross-iteration dependence. In some examples, the conflicting operations include a first operation and a second operation that cause a memory flow dependence.

In some examples, the partitioner sections the vector loop by generating a vector partitioning loop, and the conflicting operations include a first scalar operation performed by a first scalar instruction and a second scalar operation performed by a second scalar instruction. In some such examples, the sectioning performed by the partitioner compensates for a memory flow dependence between the first scalar instruction and the second scalar instruction by placing a set of vector computer program instructions associated with the first scalar instruction and the second scalar instruction into the vector partitioning loop.

Some example tangible machine readable storage mediums disclosed herein include machine readable instructions that cause a machine to, at runtime, identify a first loop iteration that cannot be executed in parallel with a second loop iteration due to a set of conflicting scalar loop operations. The first loop iteration is executed after the second loop iteration. The instructions also cause the machine to section a vector loop into vector partitions including a first vector partition that executes consecutive loop iterations in parallel starting at the second loop iteration and ending before the first loop iteration. In some examples, the consecutive loop iterations are a first set of consecutive loop iterations, and the vector partitions include a second vector partition to execute a second set of consecutive loop iterations in parallel starting at the first loop iteration and ending before a third loop iteration.

In some examples, a first number of consecutive loop iterations included in the first set of consecutive loop iterations is different than a second number of consecutive loop iterations included in the second set of consecutive loop iterations. In some examples, sectioning the vector loop into vector partitions includes generating a vector partitioning loop that is executed based on a predicate. In some examples, the first loop iteration is identified before the vector partitioning loop is entered and in some examples, the vector loop is sectioned in an inner loop that is executed within an outer loop. In some examples, the conflicting operations access a same memory location.

In some examples, the conflicting operations include a first conditionally executed statement and a second conditionally executed statement that causes a cross-iteration dependence. In some examples the instructions further cause the machine to compensate for a memory flow dependence between a first scalar operation and a second scalar operation by placing a set of program instructions associated with first scalar operation and the second scalar operation into the vector partitioning loop.

Some example methods disclosed herein include, in response to receiving a scalar computer program loop having a scalar variable referenced in a first scalar operation and referenced in a second scalar operation that lexically precedes the first scalar operation, renaming a first vector based on the scalar variable to form a second vector. The method also includes replacing references to the first vector in a copy of a first vector operation based on the first scalar operation with references to the second vector and replacing references to the first vector in a second vector operation based on the second scalar operation with references to the second vector. The method further includes placing the copy of the first vector operation at a location in the vector computer program loop that lexically precedes the second vector operation and inserting a third vector operation into the vector computer program loop. The third vector operation propagates values in vector elements of the second vector based on a predicate vector.

In some example methods the location in the vector computer program loop is a first location and the third vector operation is inserted at a second location where the first location lexically precedes the second location. In some example methods the predicate vector is based on a condition that controls execution of the first scalar operation in the scalar computer program loop. In some examples, the third vector operation propagates the values in vector elements of the second vector based on the predicate vector.

Some example methods also include identifying a set of edges that are each associated with an intra-iteration anti-dependence in the scalar computer program loop and that each have the first operation as the sink node. Some example methods further include identifying a set of source nodes that each correspond to an edge in the set of edges and determining whether there is a flow dependence from the first scalar operation to the second scalar operation. If there is not a flow dependence from the first scalar operation to the second operation, the method includes removing a first edge between the second scalar operation and the first scalar operation from the set of edges and removing a first source node corresponding to the second scalar operation from the set of source nodes. In some examples, the method also includes selecting, in a first iteration, a value from a last element of the first vector, and populating, in a second iteration, all elements of the first vector with the selected vector value.

Some example systems disclosed herein include a copier to generate a copy of a first vector operation in response to receiving a scalar computer program loop having a scalar variable referenced in a first scalar operation and referenced in a second scalar operation that lexically precedes the first scalar operation. The first vector operation is based on the first scalar operation. The copier also inserts the copy of the first vector operation into the vector computer program loop at a location that lexically precedes a second vector operation based on the second scalar operation. A renaming tool renames a first vector based on the scalar variable to form a second vector and replaces references to the first vector in the copy of the first vector operation with references to the second vector. The renaming tool also replaces references to the first vector in a second vector operation based on the second scalar operation with references to the second vector. Some example systems also include a propagator to insert a third vector operation into the vector computer program loop. The third vector operation propagates values in vector elements of the second vector based on a predicate vector. In some examples, the location in the vector computer program loop is a first location and the propagator inserts the third vector operation at a second location where the first location lexically precedes the second location.

In some examples system, the predicate vector is based on a condition that controls execution of the first scalar operation in the scalar computer program loop. And in some example systems, the third vector operation propagates the values in vector elements of the second vector based on the predicate vector.

Some example systems also include an edge remover to identify a set of edges that are each associated with an intra-iteration anti-dependence in the scalar computer program loop and that each have the first operation as a sink node. The example edge remover also identifies a set of source nodes that each correspond to an edge in the set of edges and determines whether there is a flow dependence from the first scalar operation to the second scalar operation. If the edge remover determines that there is not a flow dependence from the first scalar operation to the second scalar operation, the edge remover removes a first edge between the second scalar operation and the first scalar operation from the set of edges and removes a first source node corresponding to the second scalar operation from the set of source nodes.

Some example systems also include a selector to select, in a first iteration, a value from a last element of the first vector and a broadcaster to populate, in a second iteration, all elements of the first vector with the selected value.

Some example tangible machine readable storage mediums disclosed herein include machine readable instructions that cause a machine to, in response to receiving a scalar computer program loop having a scalar variable referenced in a first scalar operation and referenced in a second scalar operation that lexically precedes the first scalar operation, rename a first vector form a second vector, the first being based on the scalar variable. The instructions also cause the machine to replace references to the first vector in a copy of a first vector operation with references to the second vector and to replace references to the first vector in a second vector operation with references to the second vector where the first vector operation is based on the first scalar operation and the second vector operation is based on the second scalar operation. The instructions also cause the machine to place the copy of the first vector operation at a location in the vector computer program loop that lexically precedes the second vector operation and to insert a third vector operation into the vector computer program loop, the third vector operation propagating values in vector elements of the second vector based on a predicate vector.

In some examples, the location in the vector computer program loop is a first location and the third vector operation is inserted at a second location where the first location lexically precedes the second location. In some examples, the predicate vector is based on a condition that controls execution of the first scalar operation in the scalar computer program loop and, in some examples, the third vector operation propagates the values in vector elements of the second vector based on the predicate vector.

In some examples, the instructions further cause the machine to identify a set of edges that are each associated with an intra-iteration anti-dependence in the scalar computer program loop and that each have the first operation as the sink node. The instructions also cause the machine to identify a set of source nodes that each correspond to an edge in the set of edges. The instructions further cause the machine to determine whether there is a flow dependence from the first scalar operation to the second scalar operation, and if it is determined that there is not a flow dependence from the first scalar operation to the second operation, remove a first edge between the second scalar operation and the first scalar operation from the set of edges and remove a first source node corresponding to the second scalar operation from the set of source nodes. In some examples, the instructions further cause the machine to select, in a first iteration, a value from a last element of the first vector, and populate, in a second iteration, all elements of the first vector with the selected vector value.

In some examples, the loop-dependence/edge processing techniques employed by one or more of the example analyzers 115A, 115B, 115C, 115D, 115E, 115F are employed by any of the other example analyzers to process a loop dependence/edge as appropriate to the type of loop dependence/edge.

Finally, although certain example methods, apparatus and articles of manufacture have been described herein, the scope of coverage of this patent is not limited thereto. On the contrary, this patent covers all methods, apparatus and articles of manufacture fairly falling within the scope of the claims of the patent either literally or under the doctrine of equivalents.

What is claimed is:

1. A method to convert a scalar computer program loop having loop-carried dependences to a vector computer program loop, the method comprising:
    detecting an edge between a first instruction and a second instruction dependent on one another, the detecting of the edge based on a dependence graph representing a scalar computer program loop;
    inserting the first instruction from the scalar computer program loop into a vector partitioning loop;

identifying, by executing a third instruction with one or more processors, a first loop iteration that cannot be executed in parallel with a second loop iteration due to a cross-iteration dependency associated with the first instruction in the vector partitioning loop, the first loop iteration being executed after the second loop iteration; and sectioning, by executing a fourth instruction with the one or more processors, within the vector partitioning loop, a vector loop into vector partitions including a first vector partition, the first vector partition to execute consecutive loop iterations in parallel, the consecutive loop iterations to start at the second loop iteration and to end before the first loop iteration.

2. The method defined in claim 1, wherein the consecutive loop iterations are a first set of consecutive loop iterations, and the vector partitions include a second vector partition to execute a second set of consecutive loop iterations in parallel, the second set of consecutive loop iterations to start at the first loop iteration and to end before a third loop iteration.

3. The method defined in claim 2, wherein a first number of consecutive loop iterations included in the first set of consecutive loop iterations is different than a second number of consecutive loop iterations included in the second set of consecutive loop iterations.

4. The method defined in claim 1, further including generating the vector partitioning loop, the vector partitioning loop being executed based on a predicate.

5. The method defined in claim 4, wherein the first loop iteration is identified before the vector partitioning loop is entered.

6. The method as defined in claim 1, wherein the sectioning of the vector loop is performed in an inner loop including the vector partitioning loop, the inner loop being executed within an outer loop, the outer loop to execute a number of times based on a vector length associated with system hardware, the inner loop to execute a variable number of times based on a number of cross-iteration dependencies identified.

7. The method as defined in claim 1, wherein the first instruction and the second instruction access a same memory location.

8. The method defined in claim 1, wherein the first instruction and the second instruction include a first conditionally executed statement and a second conditionally executed statement.

9. The method defined in claim 1, further including compensating for a memory flow dependence between a first instruction and a second instruction by placing a set of program instructions including the first instruction and the second instruction into the vector partitioning loop.

10. A system to convert a scalar computer program loop having loop-carried dependences into a vector computer program loop, the system comprising:
a conflict identifier to detect an edge between a first instruction and a second instruction dependent on one another, the detecting of the edge based on a dependence graph representing a scalar computer program loop;
a partitioner to insert the instruction from the scalar computer program loop into a vector partitioning loop;
a conflict checker to identify a first loop iteration that cannot be executed in parallel with a second loop iteration due to a cross-iteration dependency associated with the first instruction in the vector partitioning loop, the first loop iteration being executed before the second loop iteration; and
the partitioner to section, within the vector partitioning loop, a vector loop into vector partitions including a first vector partition, the first vector partition to execute consecutive loop iterations in parallel, the consecutive loop iterations to start at the second loop iteration and to end before the first loop iteration.

11. The system defined in claim 10, wherein the consecutive loop iterations are a first set of consecutive loop iterations, and the vector partitions further include a second vector partition to execute a second set of consecutive loop iterations in parallel, the second set of consecutive loop iterations to start at the first loop iteration and to end before a third loop iteration.

12. The system defined in claim 11, wherein a first number of consecutive loop iterations included in the first set of consecutive loop iterations is different than a second number of consecutive loop iterations included in the second set of consecutive loop iterations.

13. The system defined in claim 10, wherein the partitioner is to generate the vector partitioning loop, the vector partitioning loop being executed based on a predicate.

14. The system defined in claim 13, wherein the conflict checker is to identify the first loop iteration before the vector partitioning loop is entered.

15. The system defined in claim 10, wherein the partitioner is to section the vector loop within an inner loop, the inner loop being executed within an outer loop, the outer loop to execute a number of times based on a vector length associated with system hardware, the inner loop to execute a variable number of times based on a number of cross-iteration dependencies.

16. The system defined in claim 10, wherein the first instruction and the second instruction access a same memory location.

17. The system defined in claim 10, wherein the first instruction and the second instruction include a first conditionally executed statement and a second conditionally executed statement.

18. The system defined in claim 10, wherein the partitioner is to section the vector loop by compensating for a memory flow dependence between the first instruction and the second instruction by placing a set of vector computer program instructions associated with the first instruction and the second instruction into the vector partitioning loop.

19. A tangible machine readable storage medium comprising machine readable instructions which, when executed, cause a machine to at least:
detect an edge between a first instruction and a second instruction dependent on one another, the detecting of the edge based on a dependence graph representing a scalar computer program loop;
insert the first instruction from the scalar computer program loop into a vector partitioning loop;
identify a first loop iteration that cannot be executed in parallel with a second loop iteration due to a cross-iteration dependency associated with the first instruction in the vector partitioning loop, the first loop iteration being executed after the second loop iteration; and
section, within the vector partitioning loop, a vector loop into vector partitions including a first vector partition, the first vector partition to execute consecutive loop iterations in parallel, the consecutive loop iterations to start at the second loop iteration and to end before the first loop iteration.

20. The tangible machine readable storage medium defined in claim 19, wherein the consecutive loop iterations are a first set of consecutive loop iterations, and the vector partitions include a second vector partition to execute a second set of consecutive loop iterations in parallel, the second set of consecutive loop iterations to start at the first loop iteration and to end before a third loop iteration.

21. The tangible machine readable storage medium defined in claim 20, wherein a first number of consecutive loop iterations included in the first set of consecutive loop iterations is different than a second number of consecutive loop iterations included in the second set of consecutive loop iterations.

22. The tangible machine readable storage medium defined in claim 19, wherein the machine readable instructions are further to cause the machine to generate the vector partitioning loop, the vector partitioning loop being executed based on a predicate.

23. The tangible machine readable storage medium defined in claim 19, wherein the first loop iteration is identified before the vector partitioning loop is entered.

24. The tangible machine readable storage medium defined in claim 19, wherein the vector loop is sectioned in an inner loop including the vector partitioning loop, the inner loop being executed within an outer loop, the outer loop to execute a number of times based on a vector length associated with system hardware, the inner loop to execute a variable number of times based on a number of cross-iteration dependencies identified.

25. The tangible machine readable storage medium defined in claim 19, wherein the first instruction and the second instruction access a same memory location.

26. The tangible machine readable storage medium defined in claim 19, wherein the first instruction and the second instruction include a first conditionally executed statement and a second conditionally executed statement.

27. The tangible machine readable storage medium defined in claim 22, wherein the machine readable instructions are further to cause the machine to compensate for a memory flow dependence between the first instruction and the second instruction by placing a set of program instructions including the first instruction and the second instruction into the vector partitioning loop.

28. The method of claim 1, wherein the edge is at least one of a memory flow edge, an anti-dependence edge, or an output dependence edge.

29. The method of claim 1, wherein the third instruction is included in an outer loop, the first instruction and the second instruction to be included in an inner loop including the vector partitioning loop.

* * * * *